(12) United States Patent
Kusmierek

(10) Patent No.: US 12,197,024 B2
(45) Date of Patent: Jan. 14, 2025

(54) CABLE SEAL AND STRAIN RELIEF ASSEMBLY

(71) Applicant: CORNING RESEARCH & DEVELOPMENT CORPORATION, Corning, NY (US)

(72) Inventor: Marcin Kusmierek, Lodz (PL)

(73) Assignee: Corning Research & Development Corporation, Corning, NY (US)

( * ) Notice: Subject to any disclaimer, the term of this patent is extended or adjusted under 35 U.S.C. 154(b) by 325 days.

(21) Appl. No.: 17/681,942

(22) Filed: Feb. 28, 2022

(65) Prior Publication Data

US 2022/0244480 A1 Aug. 4, 2022

Related U.S. Application Data

(63) Continuation of application No. PCT/US2020/047088, filed on Aug. 20, 2020.

(60) Provisional application No. 62/896,752, filed on Sep. 6, 2019.

(51) Int. Cl.
G02B 6/44 (2006.01)

(52) U.S. Cl.
CPC ................... *G02B 6/4444* (2013.01)

(58) Field of Classification Search
CPC ............................ G02B 6/4444; H01R 13/113
See application file for complete search history.

(56) References Cited

U.S. PATENT DOCUMENTS

| 4,346,258 A * | 8/1982 | Kunze ................. H02G 15/013 |
| | | 174/DIG. 8 |
| 6,795,632 B1 | 9/2004 | Knapp et al. |
| 7,477,829 B2 | 1/2009 | Kaplan |
| 8,772,641 B2 | 7/2014 | Badura et al. |
| (Continued) | | |

FOREIGN PATENT DOCUMENTS

| CA | 3076298 A1 | 5/2020 |
| DE | 102011111399 B4 | 5/2018 |
| (Continued) | | |

OTHER PUBLICATIONS

International Search Report and Written Opinion of the International Searching Authority; PCT/US2020/047122 Mailed Nov. 10, 2020; 12 Pages; European Patent Office.
(Continued)

*Primary Examiner* — Eric Wong

(57) ABSTRACT

A fiber optic assembly is provided including a cable port seal including a first sealing component, a first and second compression element configured to compress the first sealing component in a first direction, a second sealing component, and a cap configured to compress the first and second sealing component in a second direction. The compression in the first direction and second direction provides a seal around a cable. The fiber optic assembly also includes a strain relief including a body defining a sidewall, a passthrough disposed in the body from a first end to a second end, and a slot enabling a fiber optic cable to be inserted into the passthrough. The strain relief also includes a plurality of hooks disposed on an exterior surface of the sidewall and configured to resist movement of a strength member of the cable, when the strength member is wrapped around the body.

22 Claims, 52 Drawing Sheets

(56) References Cited

U.S. PATENT DOCUMENTS

| | | | |
|---|---|---|---|
| 9,110,267 | B2 | 8/2015 | Fabrykowski et al. |
| 9,696,511 | B2 | 7/2017 | Michiels et al. |
| 11,073,673 | B2 | 7/2021 | Jaksons et al. |
| 11,314,030 | B2 | 4/2022 | Schurmans et al. |
| 11,899,261 | B2 * | 2/2024 | Kubiak .............. G02B 6/4477 |
| 2004/0135737 | A1 | 7/2004 | Finona et al. |
| 2006/0222304 | A1 * | 10/2006 | Olson ............... G02B 6/4428 385/115 |
| 2010/0092174 | A1 | 4/2010 | Brown et al. |
| 2013/0287360 | A1 | 10/2013 | Beamon et al. |
| 2016/0134092 | A1 | 5/2016 | Bonvallat et al. |
| 2016/0216470 | A1 * | 7/2016 | Michiels ............ G02B 6/4444 |
| 2018/0162691 | A1 | 6/2018 | Herkel et al. |
| 2018/0248350 | A1 | 8/2018 | Coenegracht et al. |
| 2019/0044277 | A1 * | 2/2019 | Mellott ............. H01R 13/113 |
| 2020/0064579 | A1 | 2/2020 | Allen et al. |
| 2021/0373272 | A1 | 12/2021 | Blackwell et al. |
| 2022/0413247 | A1 | 12/2022 | Cousineau et al. |

FOREIGN PATENT DOCUMENTS

| | | | |
|---|---|---|---|
| EP | 2426539 | A1 | 3/2012 |
| EP | 2570832 | A1 | 3/2013 |
| EP | 2570833 | A1 | 3/2013 |
| EP | 2579078 | A1 | 4/2013 |
| EP | 2989494 | A1 | 3/2016 |
| EP | 2558895 | B1 | 4/2019 |
| EP | 3916455 | A1 | 12/2021 |
| WO | 2012/074684 | A2 | 6/2012 |
| WO | 2013/092220 | A2 | 6/2013 |
| WO | 2014/173439 | A1 | 10/2014 |
| WO | 2015/028428 | A1 | 3/2015 |
| WO | 2015/167904 | A1 | 11/2015 |
| WO | 2018/162691 | A1 | 9/2018 |
| WO | 2019/160995 | A1 | 8/2019 |
| WO | 2021/045908 | A1 | 3/2021 |
| WO | 2021/045909 | A1 | 3/2021 |

OTHER PUBLICATIONS

International Search Report and Written Opinion of the International Searching Authority; PCT/US2020/047088; mailed on Nov. 2, 2020, 10 pages; European Patent Office.

International Search Report and Written Opinion of the International Searching Authority; PCT/US2021/037533; dated Sep. 15, 2021; 13 pages; European Patent Office.

International Search Report and Written Opinion of the International Searching Authority; PCT/US2021/037534; dated Sep. 20, 2019; 15 pages; European Patent Office.

* cited by examiner

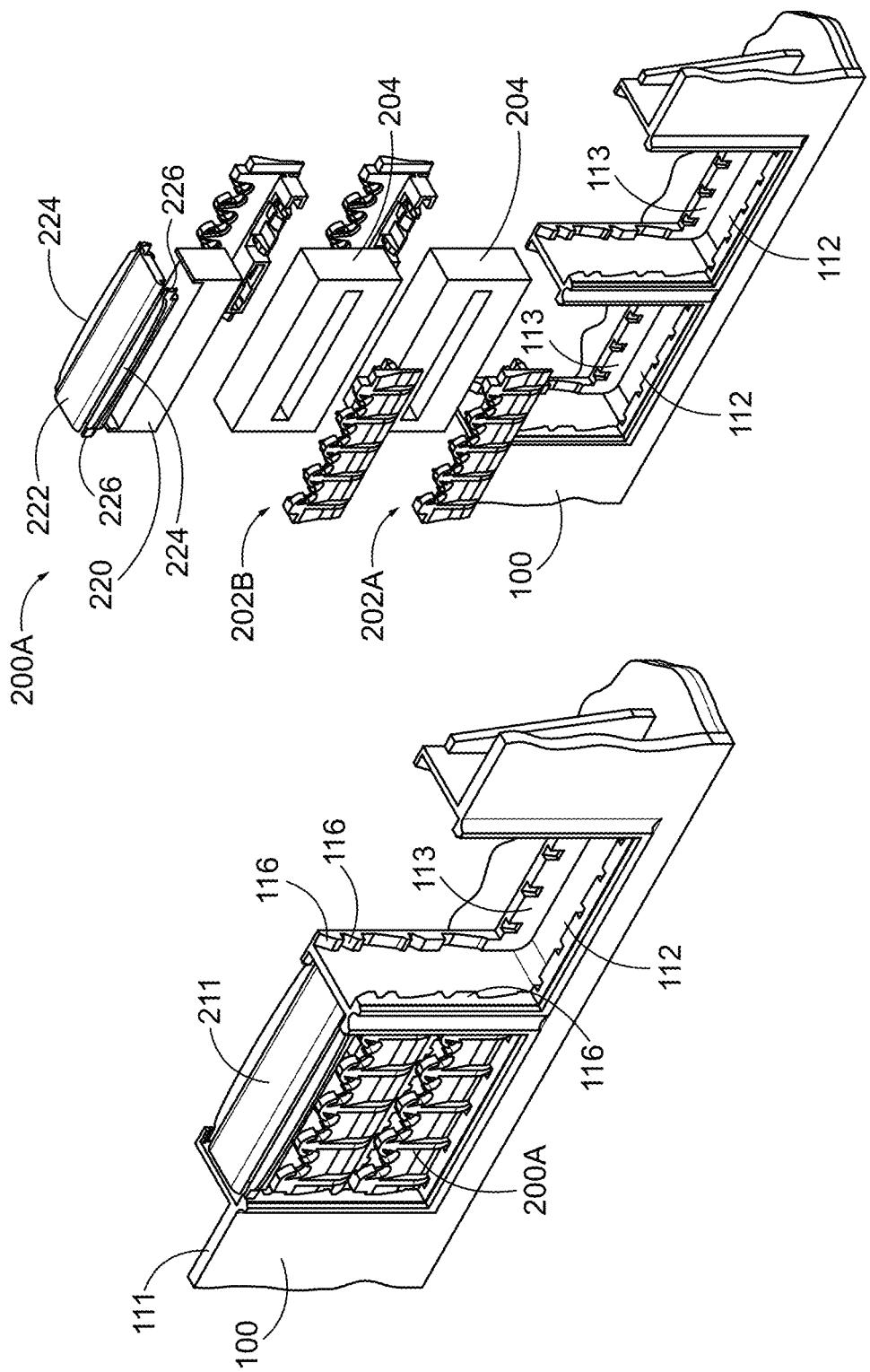

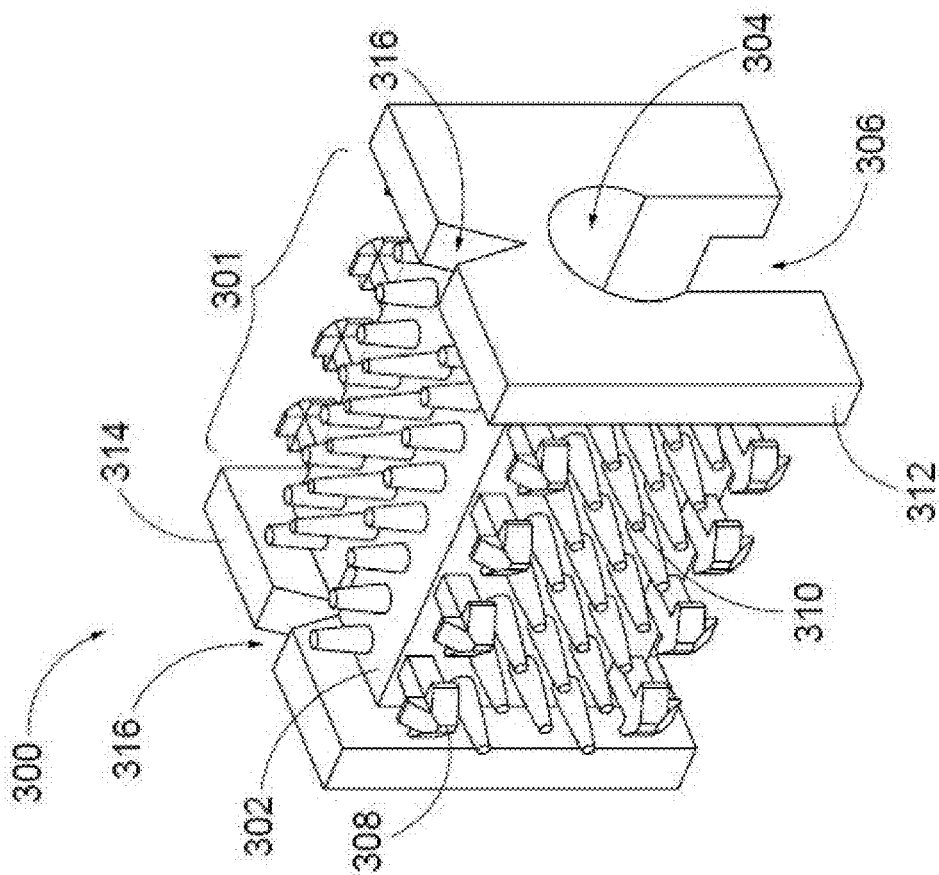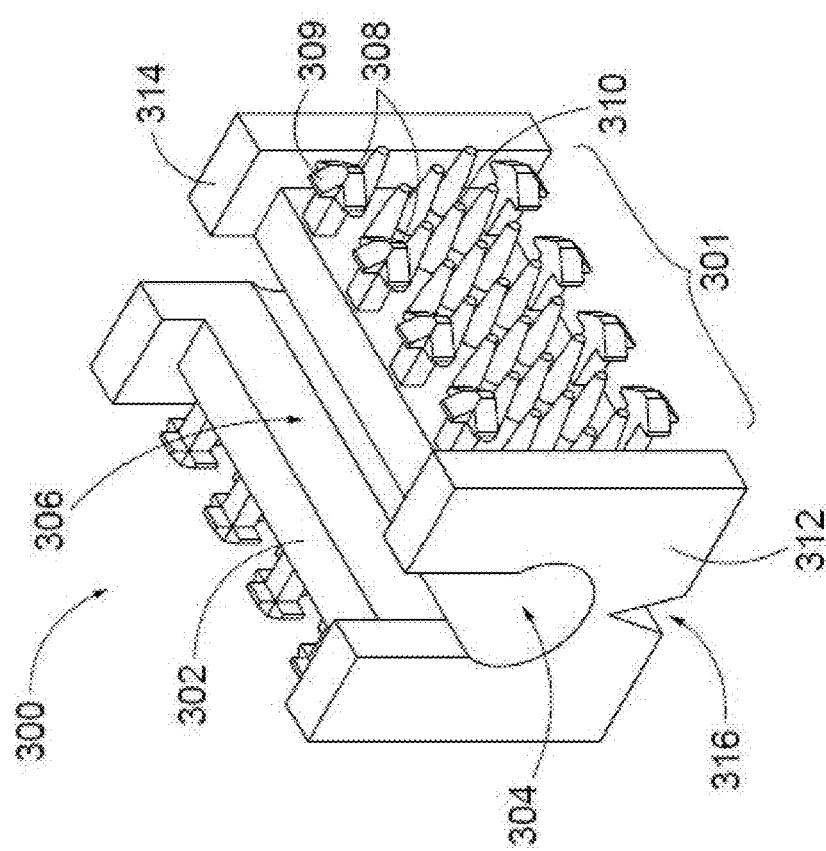
FIG. 23B
FIG. 23A

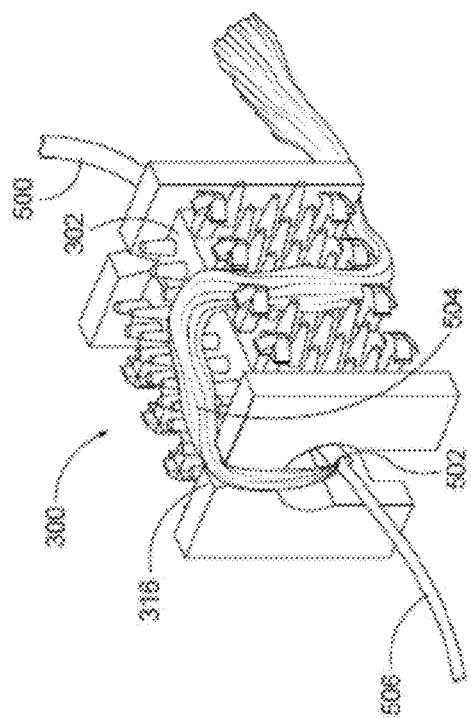
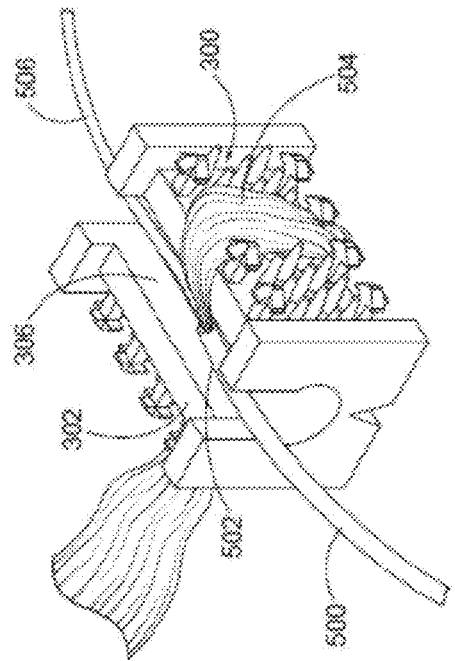
FIG. 25A
FIG. 25B

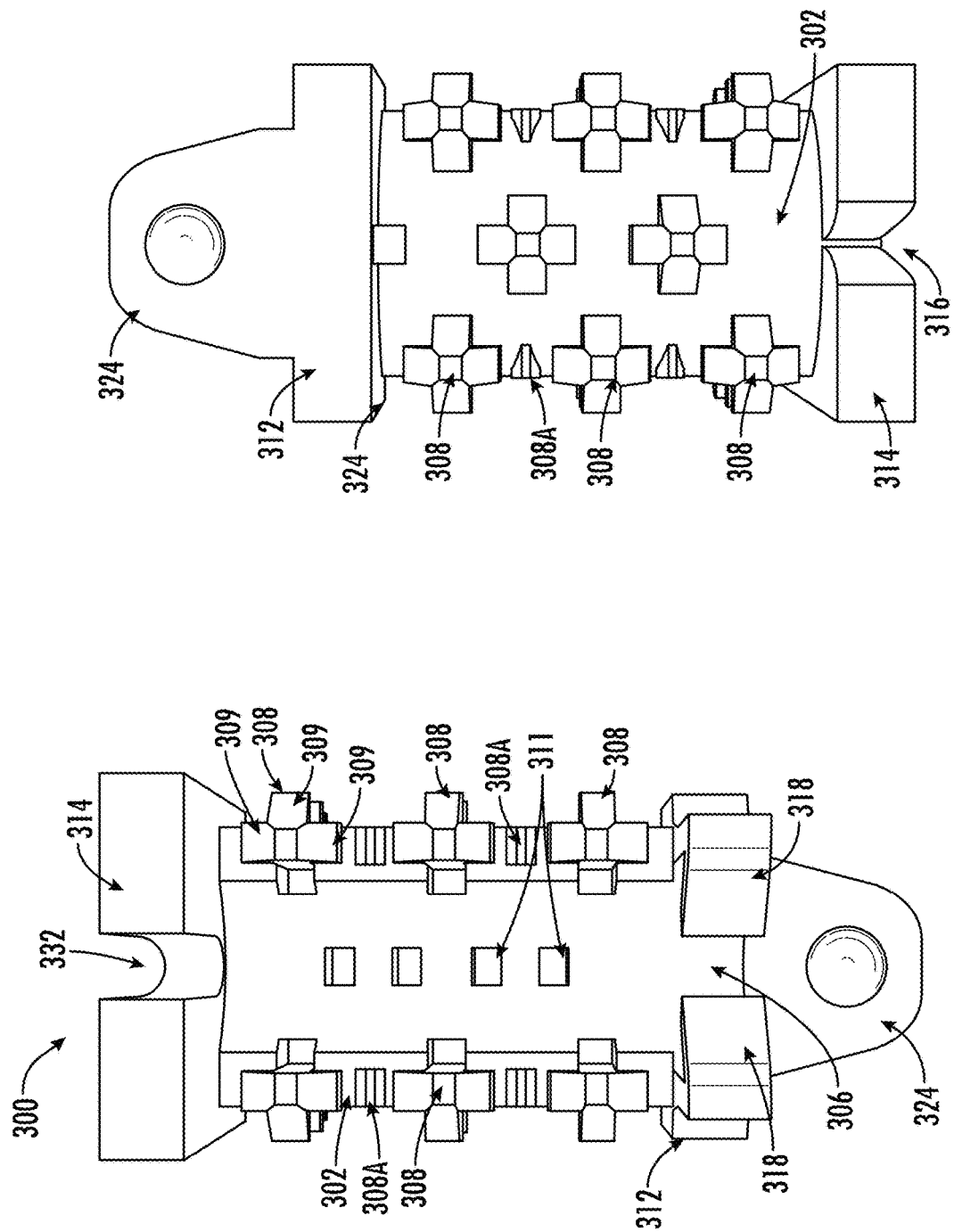

CABLE SEAL AND STRAIN RELIEF ASSEMBLY

PRIORITY APPLICATION

This application is a continuation of International Application No. PCT/US20/47088, filed on Aug. 20, 2020, which claims the benefit of priority to U.S. Application No. 62/896,752, filed on Sep. 6, 2019, both applications being incorporated herein by reference.

FIELD

This disclosure generally pertains to cable routing, and more particularly to a cable seal and strain relief system.

BACKGROUND

In fiber optic networks, fiber optic cables may be connected to various fiber optic assemblies (e.g., hardware, housings, enclosures, etc.). The fiber optic cables may require a strain relief at the various fiber optic assemblies to limit or prevent axial torsion of the fiber optic cable. Additionally, when the fiber optic assemblies are exposed to potentially harsh environments, e.g. outdoor assemblies, the fiber optic assemblies may include a seal configured to protect the internal components of the fiber optic assemblies and limit entrance of water and/or debris.

Generally, a strain relief for fiber optic cable is provided by attaching a strength member of the fiber optic cable, such as aramid yarn, e.g. Kevlar®, to the fiber optic assembly. One method of attaching the aramid yarn is to clamp the aramid yarn between a plastic element and another element, such as a cable tie or metal plate. Another method of attaching the aramid yarn is to braid the aramid yarn around a plastic feature or itself to create a knot. In some cases, both methods may be utilized, such as by braiding, e.g. knotting, the aramid yarn and then clamping or affixing, the aramid yarn. The elements used for braiding and clamping the aramid yarn may be small and, therefore, difficult to handle or use. Further, the methods themselves may require significant manual dexterity to braid and/or clamp the aramid yarn.

One common method of sealing of a fiber optic assembly relies on cable grommets or glands that are fit over a jacket of the fiber optic cable and fit into a cable port. Another method includes compressing cables between elastic materials, such as gels or rubber. Still further methods utilize a vertical slit foam cube, into which cables are slid into the slit from the top of the foam cube. Each of these methods has a limited range of fiber optic cable dimeters that can be serviced by a given seal. This may be especially true of gel or rubber compression seals, that may form a gap on either side of a fiber optic cable if the cable is too large for the given seal. Some cable seals, such as grommets and cable glands may require the cable to be pulled through the seal, which may increase installation time and complexity. Vertical cut foam cube seals may be highly sensitive to misalignment in installation, which may result in improper cable sealing and entrance of water or debris into the fiber optic cable assembly.

SUMMARY

In an example embodiment, a cable port seal and strain relief assembly is provided. The strain relief may include a body defining a sidewall, a cable passthrough disposed in the body from a first end to a second end, and a cable slot disposed through sidewall enabling a fiber optic cable to be inserted into the cable passthrough therethrough. A plurality of hooks may be disposed on an exterior surface of the sidewall. The hooks may be configured to resist movement of a strength member, e.g. aramid yarn, of the fiber optic cable, when the strength member is wrapped around the body. A strain relief receiver may be provided in connection with a fiber optic housing of a fiber optic assembly. The strain relief receiver may be configured to retain the cable strain relief in a mounted position relative to the fiber optic housing, when the cable strain relief is installed thereon.

In an additional embodiment, a strain relief is provided including a body defining a sidewall, a cable passthrough disposed in the body from a first end of the body to a second end of the body, and a cable slot disposed through the sidewall enabling a fiber optic cable to be inserted into the cable passthrough. A cable tie feature may be disposed on an exterior surface of the sidewall. A cable tie may be configured to resist movement of the fiber optic cable relative to the body, when the cable tie is wrapped around the body, and the cable tie feature resists movement of the cable tie relative to the body. A strain relief receiver may be provided in connection with a fiber optic housing of a fiber optic assembly. The strain relief receiver may be configured to retain the cable strain relief in a mounted position relative to the fiber optic housing, when the cable strain relief is installed thereon.

Each of the strain reliefs may be attached to the fiber optic cable outside of the of the fiber optic assembly and simply pushed into the strain relief receiver. This greatly reduces the complexity and required dexterity of installation, which may, in turn, increase the speed of installation.

In still a further embodiment, a cable strain relief is provided for fiber optic cable bundles. The strain relief may include a base and a restraint projection extending outward from the base. The restraint projection is configured to receive the plurality of fiber optic cables banded at a first location and a second location, the first location disposed at a leading edge and the second location disposed at a trailing edge of the restraint projection, such that a first portion of the plurality of fiber optic cables is disposed at a first face and a second portion of the plurality of fiber optic cables is disposed at a second face the restraint projection resists lateral movement of the plurality of fiber optic cables relative to the base. Instead of the typical strain relief method of cable tying the fiber optic cable to the housing, the fiber optic cables are banded together, with a cable tie or other suitable band. The bands may be applied to the plurality of fiber optic cables, e.g. the cable bundle outside of the fiber optic assembly and toollessly connected to the strain relief by slipping the cable bundle onto the restraint projection. This method may reduce the complexity and required dexterity of installation, which may, in turn, increase the speed of installation.

The fiber optic housing may also include a cable port configured for one or more fiber optic cables to pass therethrough and the cable port seal may be disposed in the fiber optic port. The cable port seal may include a first and second sealing component formed of a deformable material. In some embodiments, the sealing component may be a single component including through apertures. The cable port seal may also include a first and second compression elements configured to compress the first sealing component in a first direction and a cap configured to compress the first and second sealing component in a second direction, the second direction being perpendicular to the first direction. In some embodiments, the first and second compression elements also provide the compressive force in the second direction. The compression in the first and second directions may provide an environmental seal around a fiber optic cable, when the fiber optic cable is installed between the sealing components.

In some example embodiments, the fiber optic cable may be a plurality of individual fiber optic cables sealed between the first and second sealing component. In other embodiments, the fiber optic cable may include a plurality of fiber optic cables in a cable bundle or a large diameter fiber optic cable, e.g. a drop cable, sealed by the sealing components.

In an example embodiment, additional sealing components may be utilized, forming identical seal segments. Fiber optic cables may be sealed between each seal segment. In some embodiments, the cable port may include a capture feature configured to engage a locking feature disposed on the first and second compression element, thereby limiting or preventing movement of the first and second compression element, e.g. seal segment, out of the cable port. The first and second sealing components may include a sidewall that is pivotable, such that the sidewalls may be pivoted toward each other to disengage the locking feature from the capture feature, enabling removal of the seal segment.

Additional features and advantages will be set forth in the detailed description which follows, and in part will be apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

FIG. 4 illustrates a perspective view of an example individual cable port seal according to an example embodiment;

FIG. 5 illustrates an exploded view of an example individual cable port seal according to an example embodiment;

FIGS. 23A and 23B illustrate top and bottom perspective views of an example strain relief according to an example embodiment;

FIGS. 24-26 illustrate an example method of attaching a fiber optic cable to an example strain relief according to an example embodiment;

FIG. 48 illustrates an example top view of the strain relief of FIG. 45 according to an example embodiment;

FIG. 49 illustrates an example bottom view of the strain relief of FIG. 45 according to an example embodiment;

Figure 1:
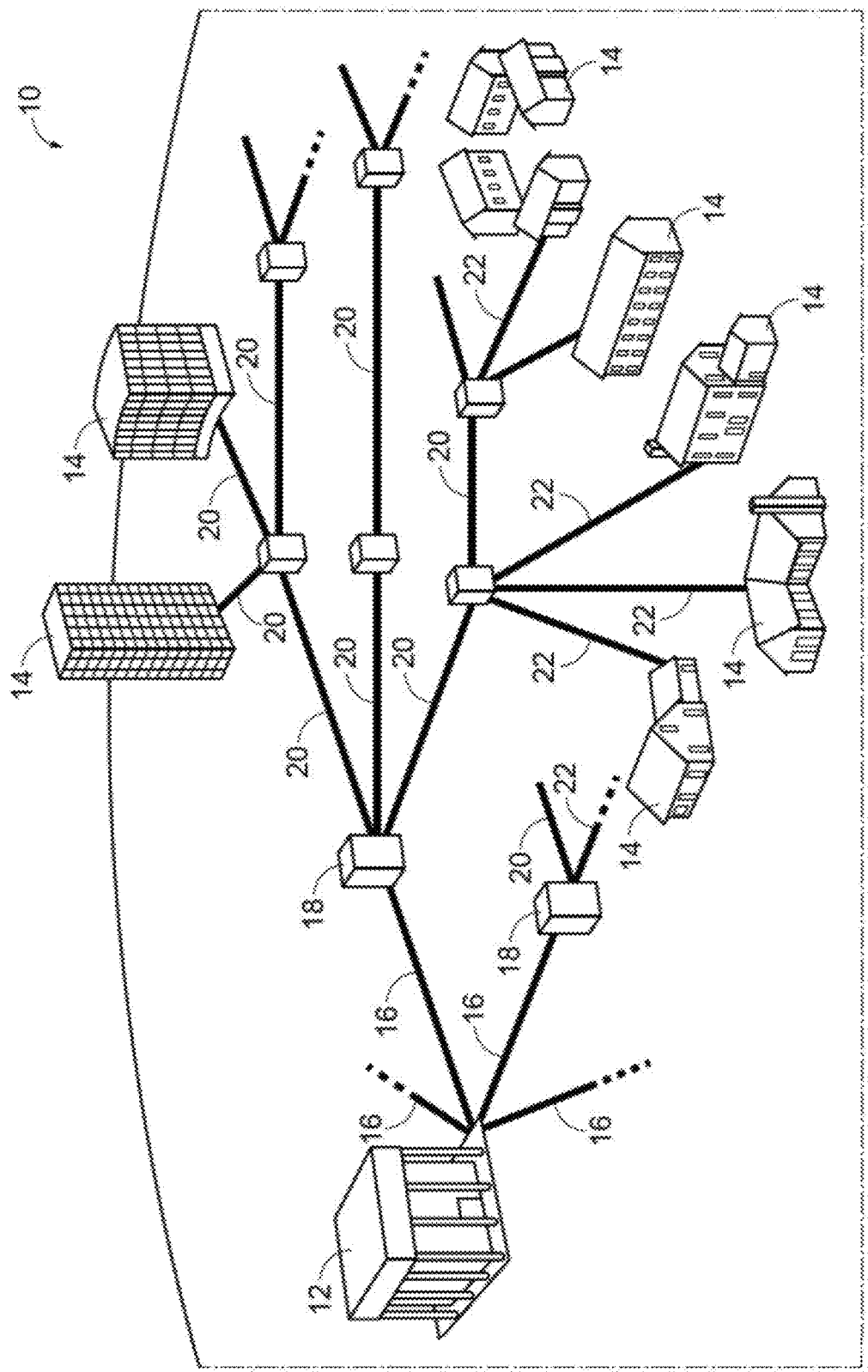
FIG. 1 is a schematic diagram of an exemplary FTTx network according to an example embodiment.

The embodiments set forth in the drawings are illustrative in nature and not intended to be limiting of the scope of the detailed description or claims. Whenever possible, the same reference numeral will be used throughout the drawings to refer to the same or like features. The drawings are not necessarily to scale for ease of illustration an explanation.

DETAILED DESCRIPTION

Optical fibers are useful in a wide variety of applications, including the telecommunications industry for voice, video, and data transmissions. The benefits of optical fiber are well known and include higher signal-to-noise ratios and increased bandwidth compared to conventional copper-based transmission technologies. To meet modern demands for increased bandwidth and improved performance, telecommunication networks are increasingly providing optical fiber connectivity closer to end subscribers. These initiatives include fiber-to-the-node (FTTN), fiber-to-the-premises (FTTP), fiber-to-the-home (FTTH), and the like (generally described as FTTx).

In an FTTx network, fiber optic cables are used to carry optical signals to various distribution points and, in some cases, all the way to end subscribers. For example, FIG. 1 is a schematic diagram of an exemplary FTTx network 10 that distributes optical signals generated at a switching point 12 (e.g., a central office of a network provider) to subscriber premises 14. Optical line terminals (OLTs; not shown) at the switching point 12 convert electrical signals to optical signals. Fiber optic feeder cables 16 then carry the optical signals to various local convergence points 18, which act as locations for splicing and making cross-connections and interconnections. The local convergence points 18 often include splitters to enable any given optical fiber in the fiber optic feeder cable 16 to serve multiple subscriber premises 14. As a result, the optical signals are "branched out" from the optical fibers of the fiber optic feeder cables 16 to optical fibers of distribution cables 20 that exit the local convergence points 18.

At network access points closer to the subscriber premises 14, some or all of the optical fibers in the distribution cables 20 may be accessed to connect to one or more subscriber premises 14. Drop cables 22 extend from the network access points to the subscriber premises 14, which may be single-dwelling units (SDU), multi-dwelling units (MDU), businesses, and/or other facilities or buildings. A SDU or MDU terminal may be disposed at the subscriber premises 14. A conversion of optical signals back to electrical signals may occur at the network access points or at the subscriber premises 14.

There are many different network architectures, and the various tasks required to distribute optical signals (e.g., splitting, splicing, routing, connecting subscribers) can occur at several locations. Regardless of whether a location is considered a switching point, local convergence point, network access point, subscriber premise, or something else, fiber optic equipment is used to house components that carry out one or more of the tasks. The fiber optic equipment may be assemblies that include connectors, splitters, splices, or the like. The term "fiber optic assembly" will be used in this disclosure to generically refer to such equipment (or at least portions thereof). In some instances such equipment is located at a terminal at the subscriber premises 14 in an FTTx network, although this disclosure is not limited to any particular intended use. Further, although an FTTx network 10 is shown in FIG. 1, the same considerations apply with respect to other types of telecommunication networks or environments, such data centers and other enterprise network environments.

Figure 2A:
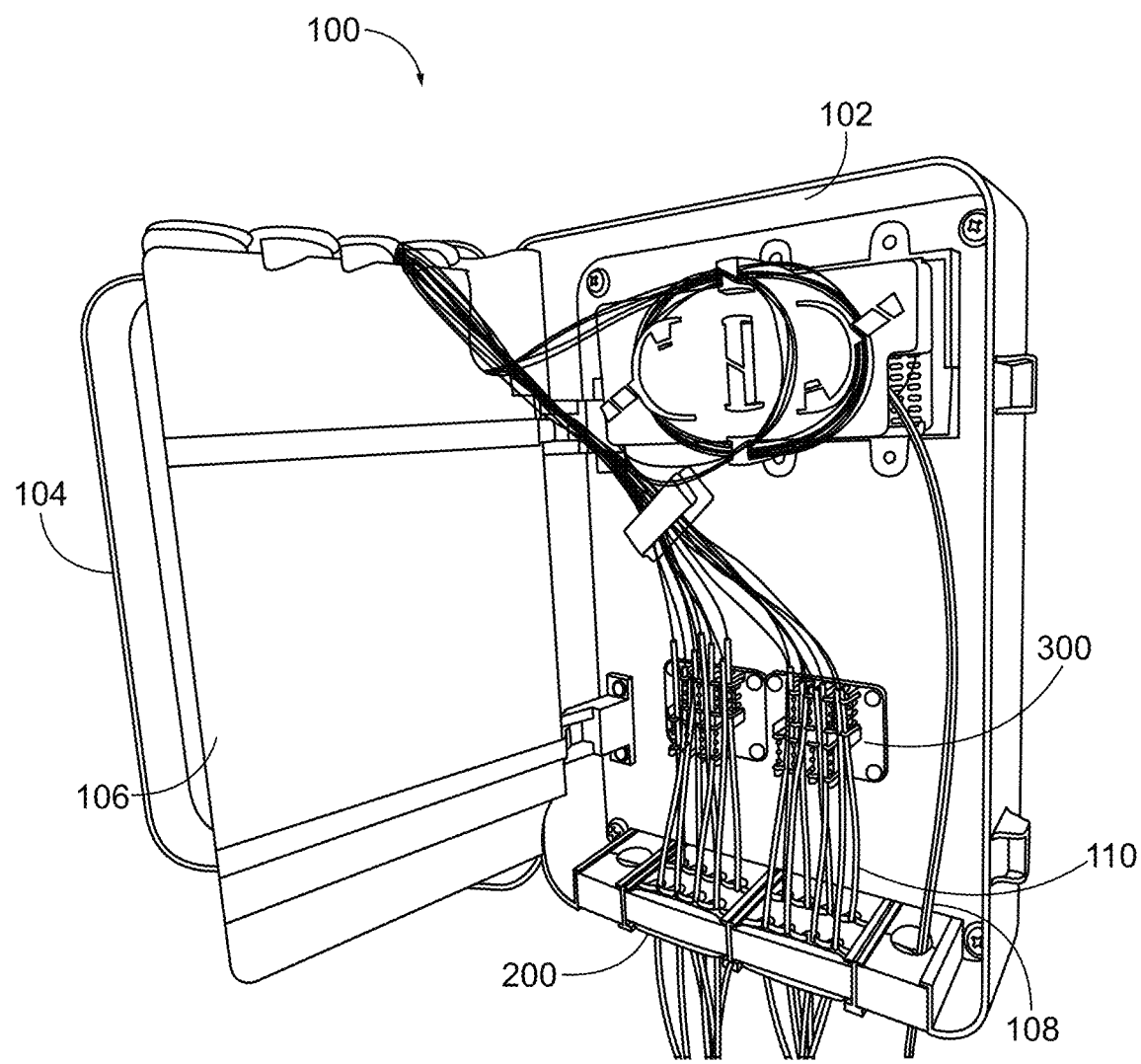
FIG. 2A illustrates an example multi-dwelling unit (MDU) terminal including a cable seal and strain relief assembly according to an example embodiment.

FIG. 2A illustrates an example fiber optic assembly 100. In the provided example, the fiber optic assembly 100 is an multiple dwelling unit (MDU) terminal, that may be deployed at a subscriber premises 14. The fiber optic assembly 100 may include a housing having a back or base portion 102 and a cover portion 104. The base portion 102 and cover portion 104 may define an interior volume in which one or more fiber optic components may be disposed and protected from the external environment. In some example embodiments, the base portion 102 and the cover portion 104 may be connected by a hinge to enable access to the interior volume of the fiber optic assembly 100. The fiber optic assembly 100 may include one or more input cables 108 and may include one or more output cables 110.

The fiber optic assembly 100 may include a cable seal and strain relief assembly to provide an environmental seal for the housing and limit axial torsion applied to the input cables 108 or output cables 110, as discussed below in reference to FIGS. 3-60. The cable seal and strain relief assembly may include a cable port seal 200 and a cable strain relief 300. Although discussed herein as an assembly, the cable port seal 200 may be utilized with other strain relief solutions. Likewise, the cable strain relief 300 may be utilized with other methods of environmentally sealing the fiber optic assembly 100. Additionally, the MDU provided in FIG. 2A is merely for illustrative purposes, the cable port seal and/or the cable strain reliefs described herein may be utilized in any fiber optic assembly, including local convergence points (LCP), SDU terminals, or the like.

Figure 2B:
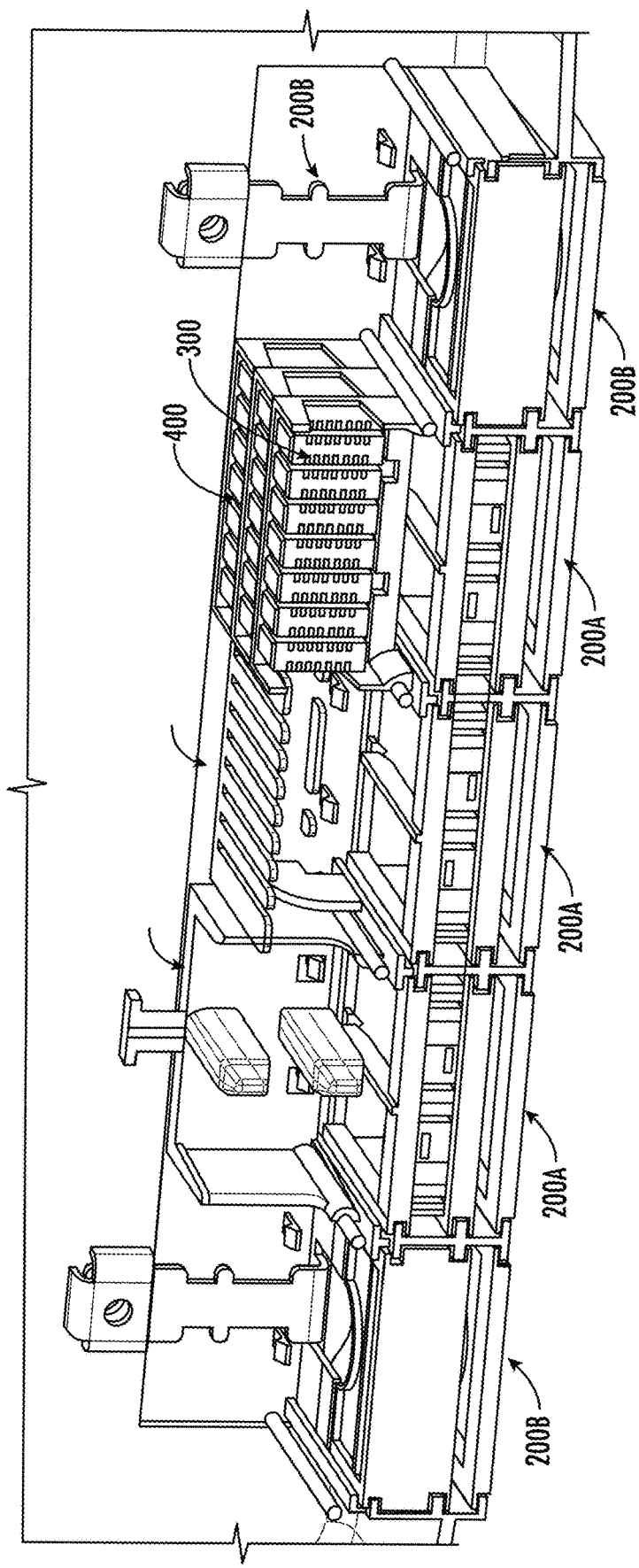
FIG. 2B illustrates an example modular cable port seal and strain relief assembly according to an example embodiment.

FIG. 2B illustrates a perspective view of a modular cable port seal and strain relief system. The cable port seals 200A and 200B, described below, may be interchanged based on the intended application to accommodate drop cables, cable bundles, a plurality of fiber optic cables, or individual fiber optic cables. Similarly, strain reliefs 300, 600, 700 may also be interchanged based on the size, type, or number of fiber optic cables including a fiber optic cable strain relief 300 that is held in a strain relief receiver 400, a pressure fit strain relief 600, and/or a cable bundle strain relief 700. The pressure fit strain relief 600 may include a plurality of fingers, or a comb, and a fiber optical cable may be pushed into the comb at the distal ends of the fingers and resist axial movement, due to pressure exerted on the fiber optic cable by the fingers. In an example embodiment, the fingers may be about 2 mm apart. The pressure fit strain relief 600 may be advantageous when a Pixian, or butterfly, cable is utilized. The fiber optic cable strain relief 300 and the cable bundle strain relief 700 are discussed in further detail below.

Figure 3:
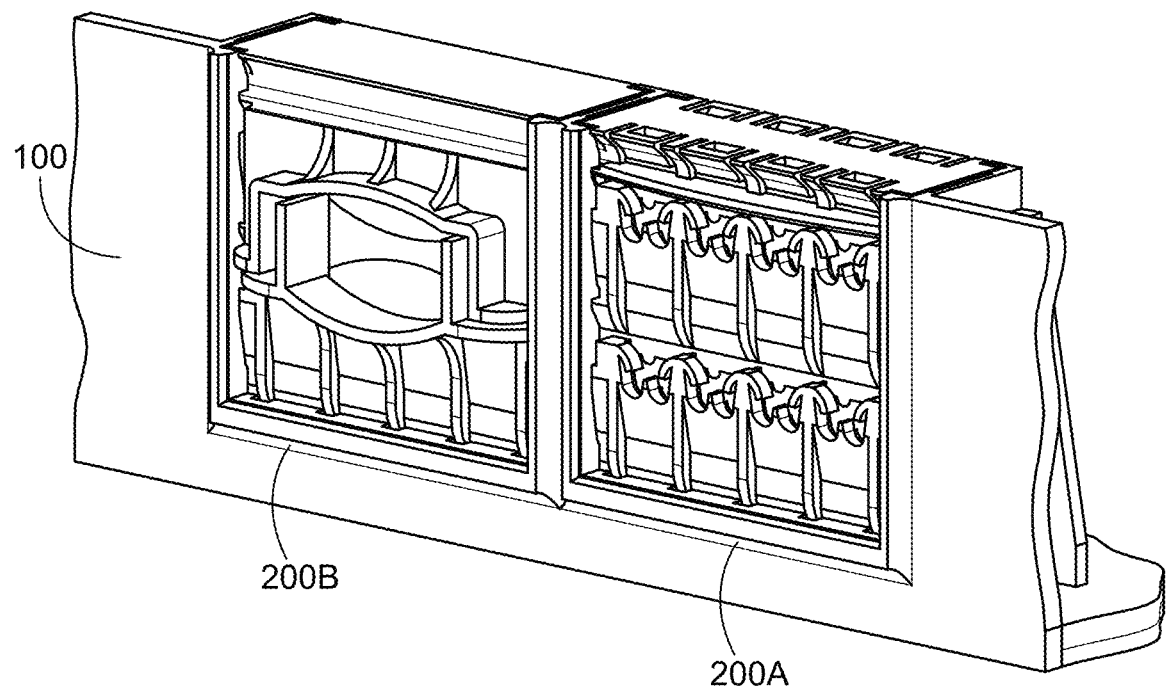
FIG. 3 illustrates and example bundle cable port seal and an example individual cable port seal according to an example embodiment.

FIG. 3 illustrates example cable port seals according to two example embodiments. The cable port seal 200 may be an individual cable port seal 200A may be configured to enable a plurality of individual fiber optic cables to pass from the exterior to the interior of the fiber optic assembly 100. Alternatively, the cable port seal 200 may be a bundle cable port seal 200B configured to enable a plurality of cables arranged in a cable bundle or a larger diameter cable, such as a drop cable to pass from the exterior to the interior of the fiber optic assembly 100. An example individual cable port seal 200A is described below in reference to FIGS. 4-16. An example bundle cable port seal 200B is described below in reference to FIGS. 17-21. Although, a single cable bundle is described below in reference to the bundle cable port seal, one of ordinary skill in the art would immediately appreciate that a bundle cable port seal may configured to enable a plurality of cable bundles to pass from the exterior to the interior of the fiber optic assembly 100.

FIGS. 4 and 5 illustrate an assembled view and an exploded view of an example individual cable port seal 200A, respectively. The fiber optic assembly 100 may have a cable port 112, e.g. a fiber optic cable port, disposed in a sidewall of the housing. A cable port seal 200 may be inserted into the cable port 112 to seal the cable port 112, and thereby the internal volume from the external environment. In some example embodiments, the housing may have a seating or sealing surface 111 disposed at an edge of the base portion 102 and/or cover portion 104. The cable port seal 200A may include a seating or sealing surface 211 configured to continue the seating or sealing surface 111 over the area of the cable port 112, when the cable port seal 200A is installed therein. Additionally or alternatively, the cable port 112 may include a channel 113 disposed about a periphery of the cable port 112 configured to receive the cable port seal 200 therein. In an example embodiment, the channel 113 may be generally U-shaped.

Figure 6:
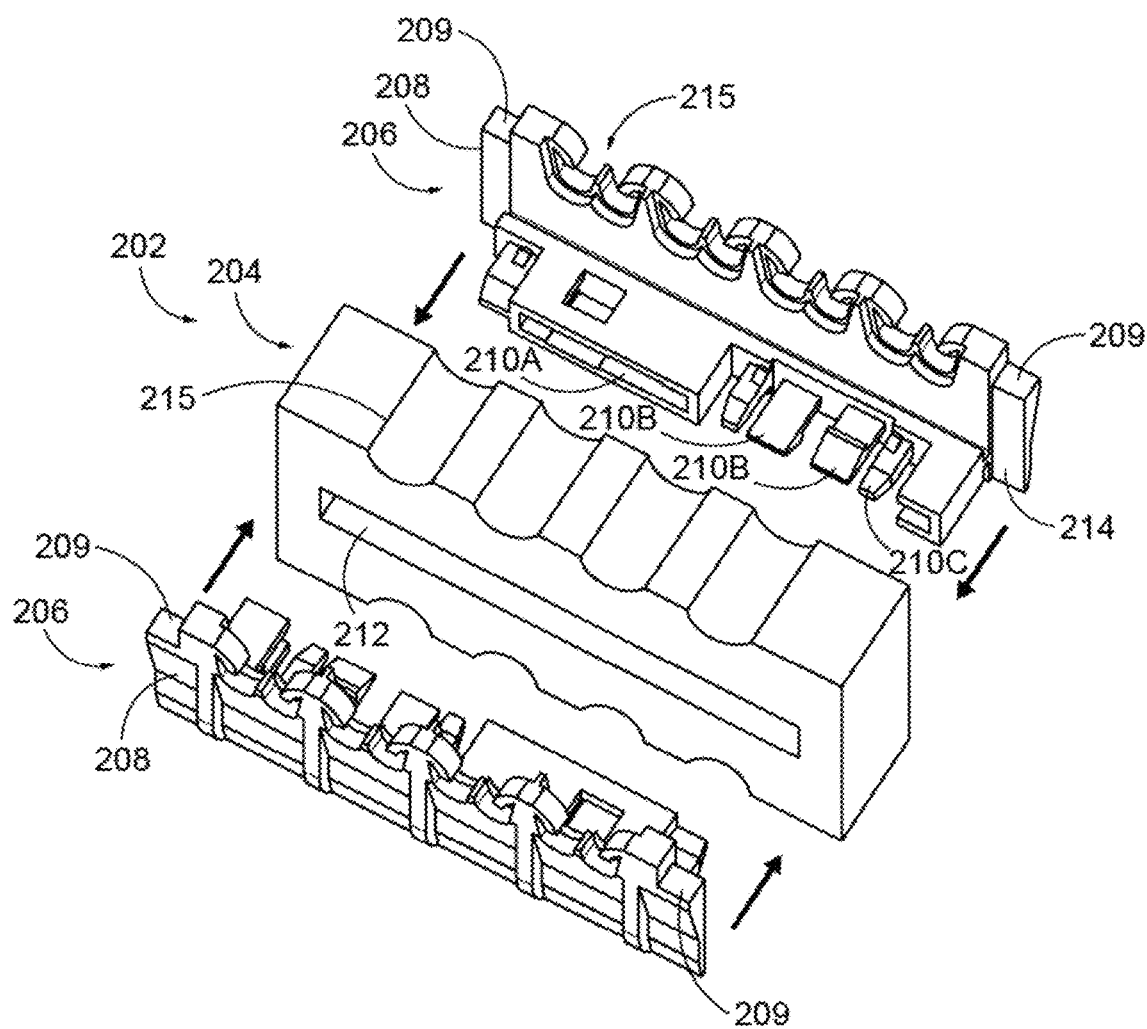
FIG. 6 illustrates an exploded view of an example seal segment of an individual cable port seal according to an example embodiment.

The individual cable port seal 200A may include one or more seal segments 202A, 202B. As depicted in FIG. 6, each seal segment 202 includes a sealing component 204 formed of a deformable material and a first and second compression element 206 configured to compress the sealing component in a first direction. The deformable material may comprise rubber, a foam, a foam rubber, or other deformable materials suitable to enable a seal around a fiber optic cable. In an example embodiment, the deformable material may be ethylene propylene diene monomer (EPDM) rubber, e.g. EPDM sponge rubber. The EPDM rubber may be closed or semi-closed cell.

The first and second compression elements 206 may include a sidewall 208 configured to compress the sealing component 204 therebetween. Each of the first and second compression elements 206 may include a connection features 210 configured to couple the first and second compression elements 206 to one another. For example, the connection features 210 may be tab and slot connectors (as shown), snap fit connectors, or other suitable connector to couple the first and second compression elements 206. In some example embodiments, the first and second compression elements 206 may be substantially the same, thereby reducing the number of different parts for manufacturing. In such an example, the first and second compression element 206 may include connection features 210 that correspond to each other when oriented toward the opposite. In the example depicted in FIG. 6 the first and second compression elements 206 include a slot 210A disposed in a first position and a pair of opposing tabs 210B disposed in a second position. When the first and second compression elements 206 are oriented with the connection features 210 facing inward, the slots 201A are aligned with the tabs 201B of the opposing compression element 206. Additionally or alternatively, the second position may also include one or more alignment features 201C configured to align the tabs 210B with the slots 210A.

In some example embodiments, the sealing component 204 may include a pocket aperture 212 disposed through the sealing component 204. The connection features 210 may be configured to pass through the pocket aperture 212 when coupled to each other. In an example embodiment, the dimensions of the pocket aperture 212 may be smaller than the outer dimensions of the connection features 210, such that the sealing component 204 forms a seal about the connection features 210, when the compression elements 206 are coupled therethrough.

Figure 7:
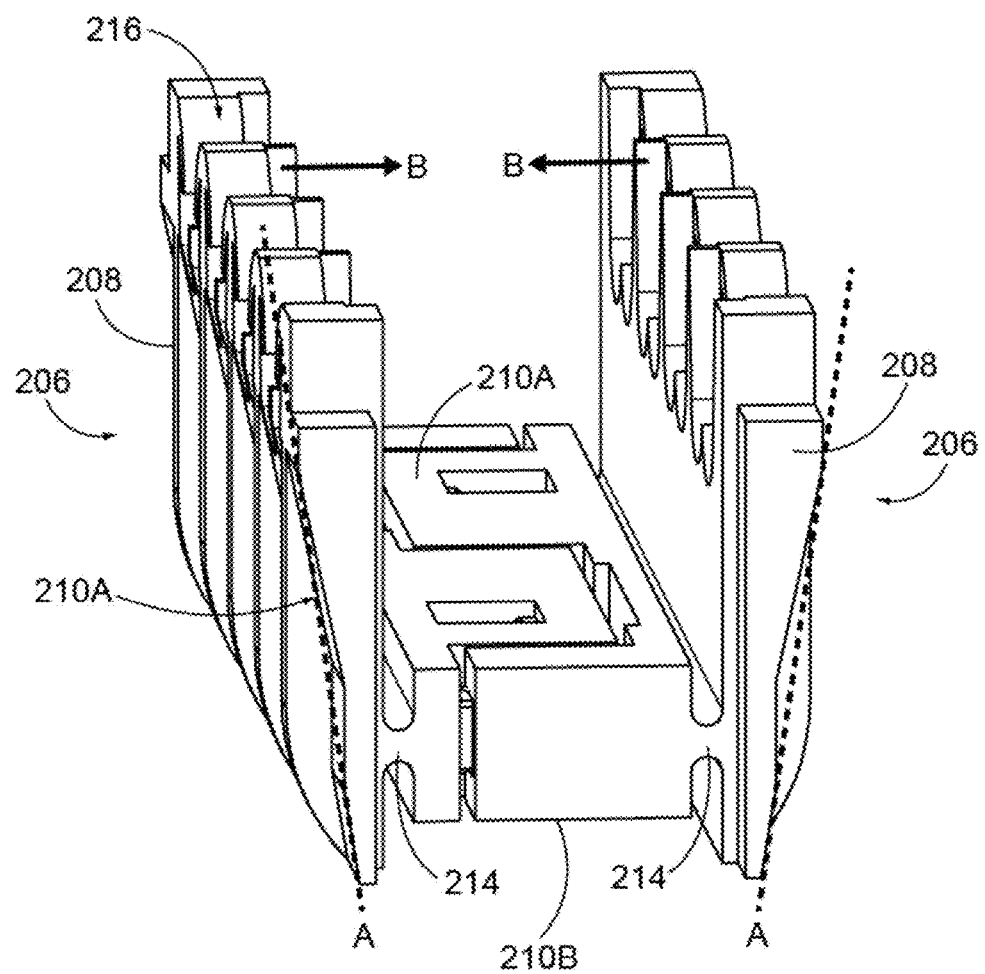
FIG. 7 illustrates a perspective view of an example first and second compression element according to an example embodiment.

In an example embodiment, the compression elements 206 may include a pivot 214 disposed between the connection features 210 and the sidewall 208. As shown in FIG. 7, the pivot 214 may enable deflection of the sidewall 208 toward and away from the sealing component 204. In an example embodiment, the compression elements 206 may be formed from a molded material, such as injection molded plastic. The pivot 214 may be a relatively thin extrusion of material between the sidewall 208 and the connection features 210. In a neutral position, the sidewalls 208 of the compression elements 206 may have a generally V-Shaped, or wedge shaped, cross-sectional geometry when coupled together, as illustrated by lines A. The sidewalls 208 may be deflected inward about the pivot 214, by an inward compressive force, e.g. a pinching force, being applied toward each other in direction B.

Turning back to FIGS. 4-6, the sidewalls 208 of the compression elements 206 may include one or more locking features 209 configured to engage a corresponding capture feature 116 disposed in the cable port 112, such that the capture feature 116 resists movement of the compression elements 206, and thereby seal segments 202, out of the cable port 112. In an example embodiment, the capture features 116 may include an indent in the channel 113 of the cable port 112. The locking feature 209 may include a substantially flat top surface disposed at least one end of the sidewalls 208. The substantially flat top surface may engage the indent of the capture feature 116 to resist movement out of the cable port 112. The compression elements 206 may be pinched, as discussed above, to move the sidewalls 208 and therefore locking feature 209 about the pivot 214 to a release position, in which the locking features 209 are not aligned with the capture features 116 enabling the seal segment 202 to be removed from the cable port 112. In an example embodiment, the channel 113 include a segment guide that applies force to the locking features 209 as the seal segments 202 are inserted, to move the locking features 209 to the release position as the locking features 209 pass the capture features 116. When the locking features 209 pass the capture features 116, the sidewalls 208 may return to a neutral position, in which the locking features 209 are engaged with the capture features 116. In other words, the locking features 209 are configured to snap fit as the seal segments 202 are inserted into the cable port 112 past the capture features 116.

In some example embodiments, the sealing component 204 may include one or more cable alignment channels 215. The cable alignment channels 215 may provide a shallow trough to assist in aligning a fiber optic cable across the sealing component 204. Similarly, the compression elements 206 may include one or more cable guide apertures 216 configured to align the fiber optic cables across the sealing component 204. In an example embodiment, the cable guide apertures 216 include an opening configured to receive the fiber optic cable in a first direction and resist the fiber optic cable in a second direction. For example, the cable guide apertures 216 may include one or more barbs positioned to enable the fiber optic cable to pass into the cable guide aperture 216 and resist the removal therefrom.

Returning to FIGS. 4 and 5, one or more seal segments 202 may be inserted into the cable port 112. A second sealing component 220 and cap 222 may be inserted on top of the seal segments 202. The cap 222 may be substantially planar and include one or more user interface elements 224. The user interface elements 224 may include locking features 226 substantially similar to the locking features 209 discussed above in regard to the sidewalls 208. The locking features 226 may be disposed at one or more ends of a user interface element 224. A deflection element may be disposed between the planar cap 222 and the user interface element 224, such as a U-shaped extrusion. The U-shaped extrusion may enable the user interface element 224 and thereby the locking features 226 to deflect inward to a release position.

The cap 222 may compress the second sealing component 220 against the upper surface of the sealing component 204 of the second seal segment 202B in a second direction, when installed in the cable port 112. The second compression direction may be substantially perpendicular to the direction of the compressive force applied by the first and second compression elements 206. The bottom surface of the sealing component 204 of the second seal segment 202B may be compressed against the upper surface of the first seal segment 202A, in a manner similar to the second sealing component 220 and the sealing component 204 of the second seal segment 202B. Further, the compression of the sealing components 204 of the first and second seal segments 202A, 202B and the second sealing component 220, in both the first and second direction, may cause the sealing components 204 of the first and second seal segments 202A, 202B to expand outward in the cable port 112 filling the channel 113 and creating an environmental seal. In some embodiments, the environmental seal may be rated to international, or ingress, protection (IP) rating 55 or better.

Figure 8:
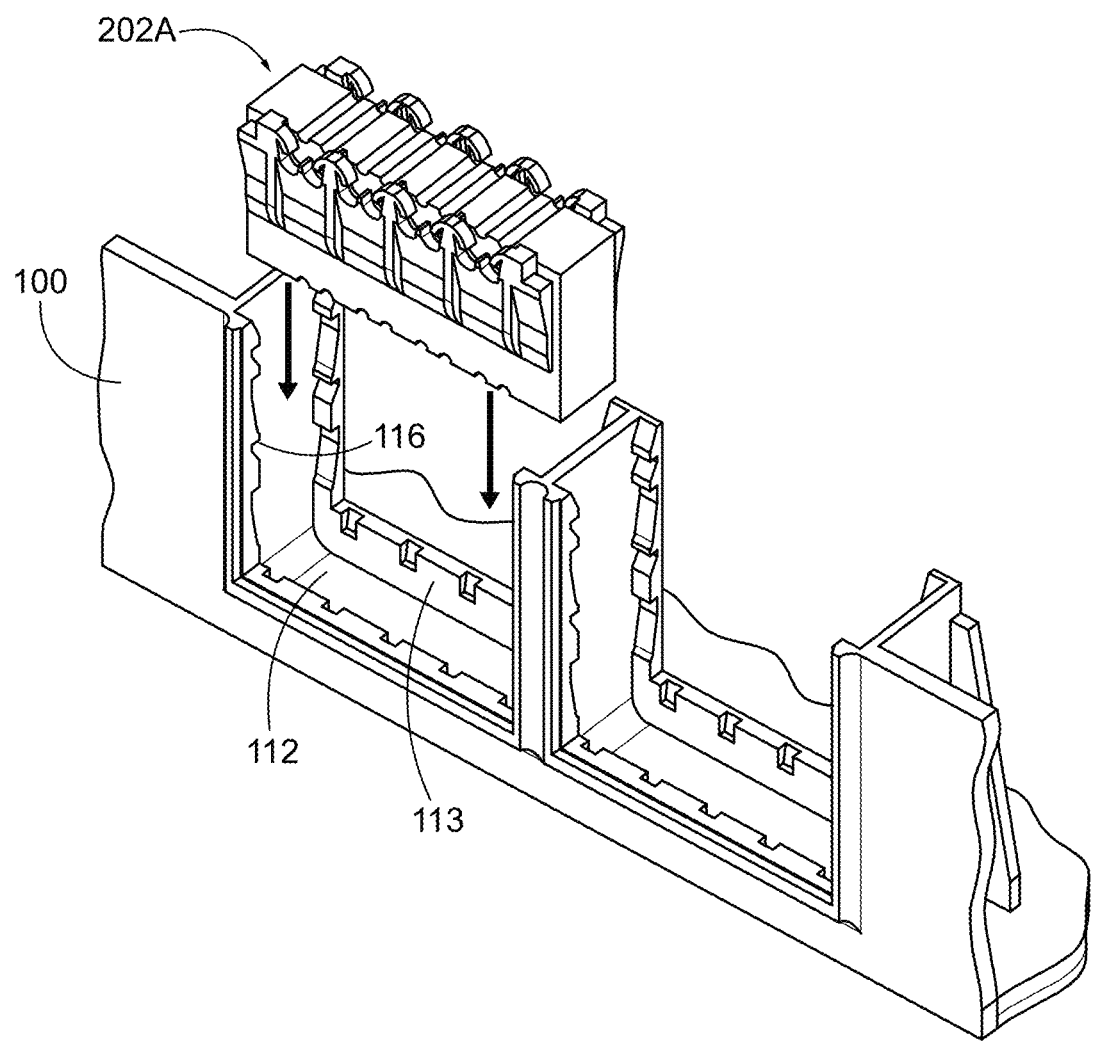
FIGS. 8-11 illustrate assembly of an individual cable port seal according to an example embodiment.
Figure 9:
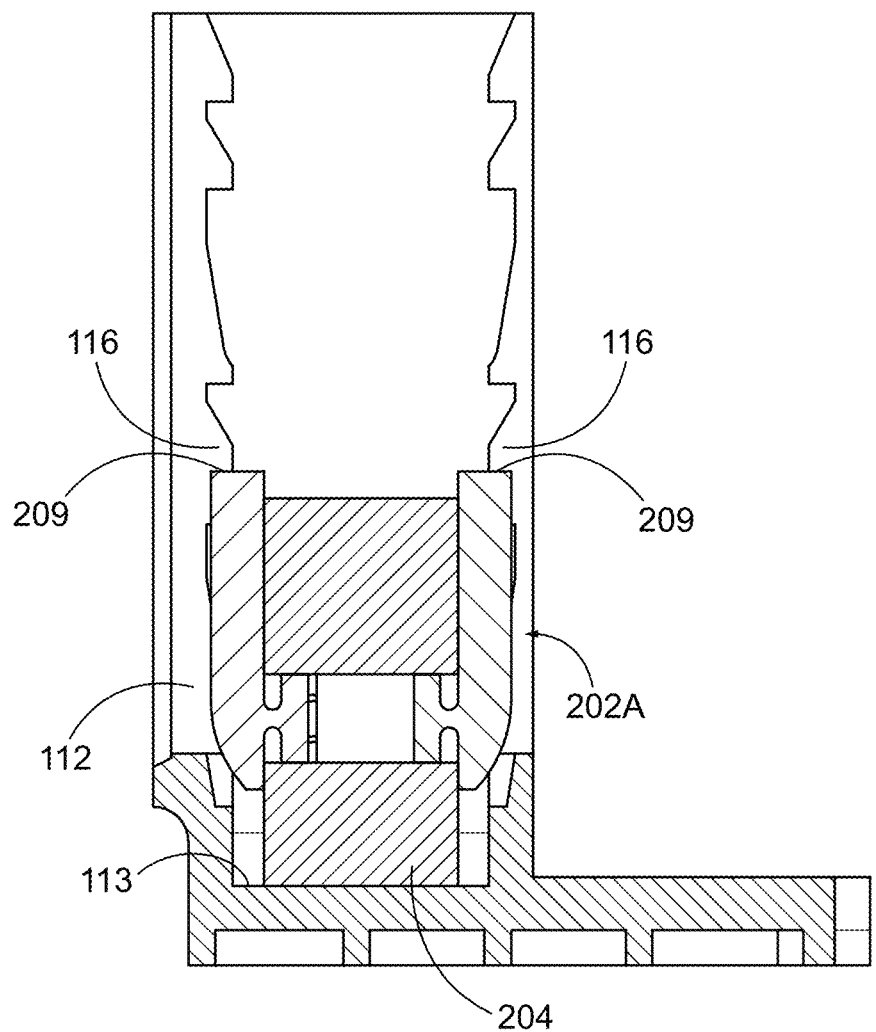
Figure 10B:
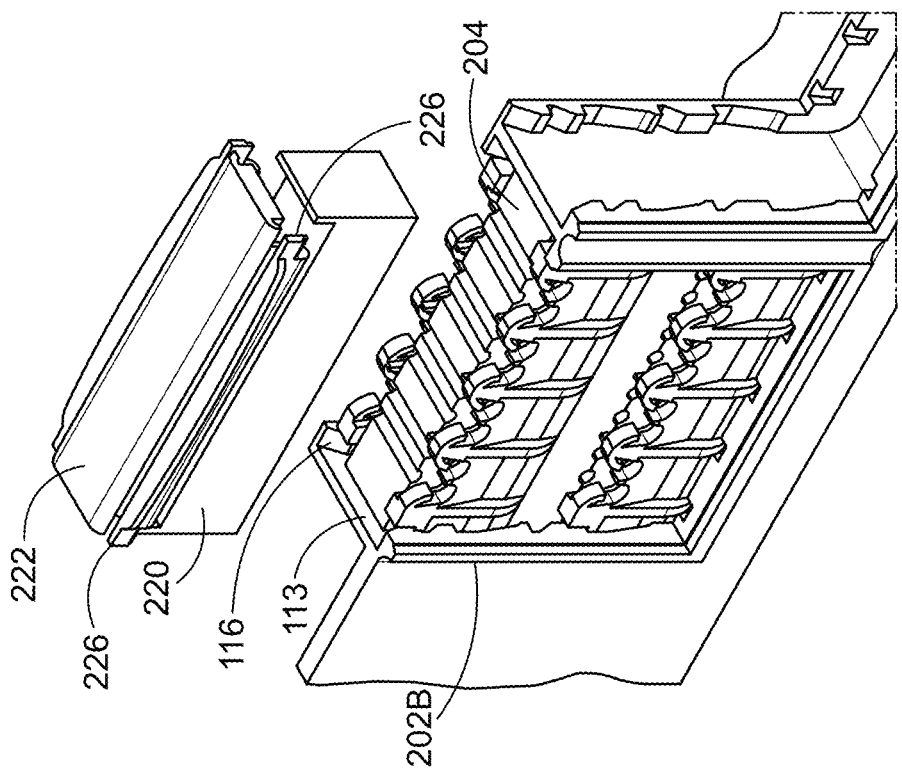
Figure 10A:
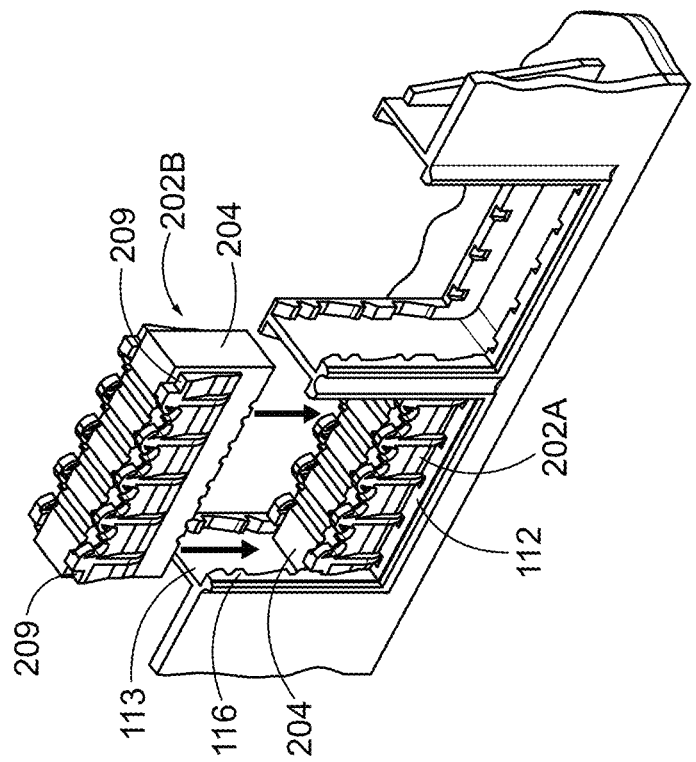
Figure 11:
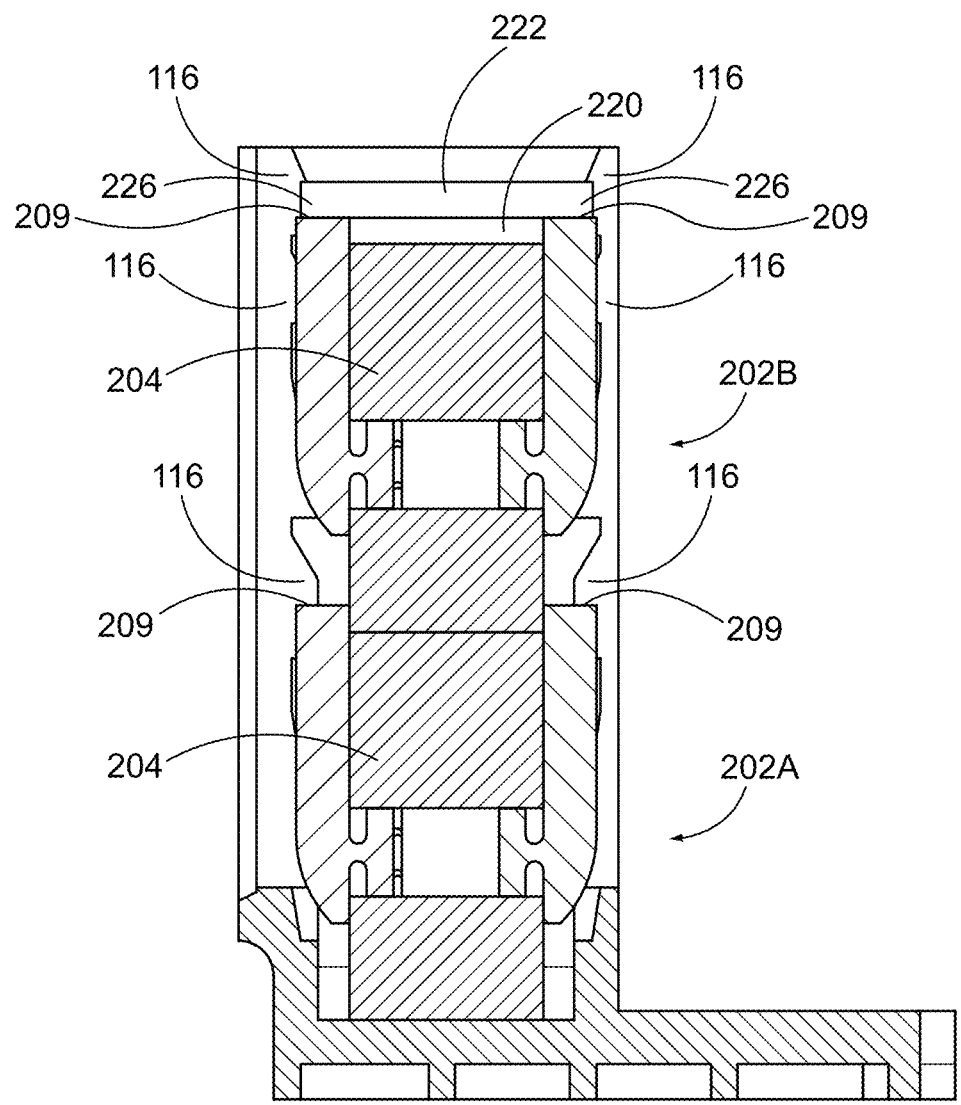

FIG. 8 illustrates a first seal segment 202A being inserted into a cable port 112. More particularly, the first seal segment 202A is being inserted into a channel 113 disposed in the cable port 112. At FIG. 9, the first seal segment 202A has been inserted into the channel 113 until the locking features 209 engage the capture features 116. In this position the sealing component 204 of the first seal segment 202A is in contact with the bottom of the channel 113. In FIG. 10A, the process is repeated by inserting the second seal segment 202B into to the channel 113. The locking features 209 of the second seal segment 202B engage the corresponding capture features 116 in the channel 113, seating the bottom surface of the sealing component 204 of the second seal segment 202B on the upper surface of the sealing component 204 of the first seal segment 202A thereby compressing the seal segments 202A, 202B against each other and the channel 113. In FIG. 10B, a second sealing component 220 and a cap 222 may be inserted into the channel 113. The locking features 226 of the cap 222 may engage the capture features 116. The cap 222 may compress the bottom surface of the second sealing component 220 into the upper surface of the sealing component 204 of the second seal segment 202B, as illustrated in FIG. 11. The compression in the first direction, applied by the compression elements 206 to their respective sealing components 204 and the compression in the second direction, perpendicular to the first direction, applied by the seal segments 202A, 202B and cap 222 installation causes an environmental seal between the seal segments 202A, 202B and second sealing component 220. The compression in the first and second direction also provides an environmental seal between the seal segments 202A, 202B, second sealing component 220, and cap 222 and the cable port 112.

Figure 12:
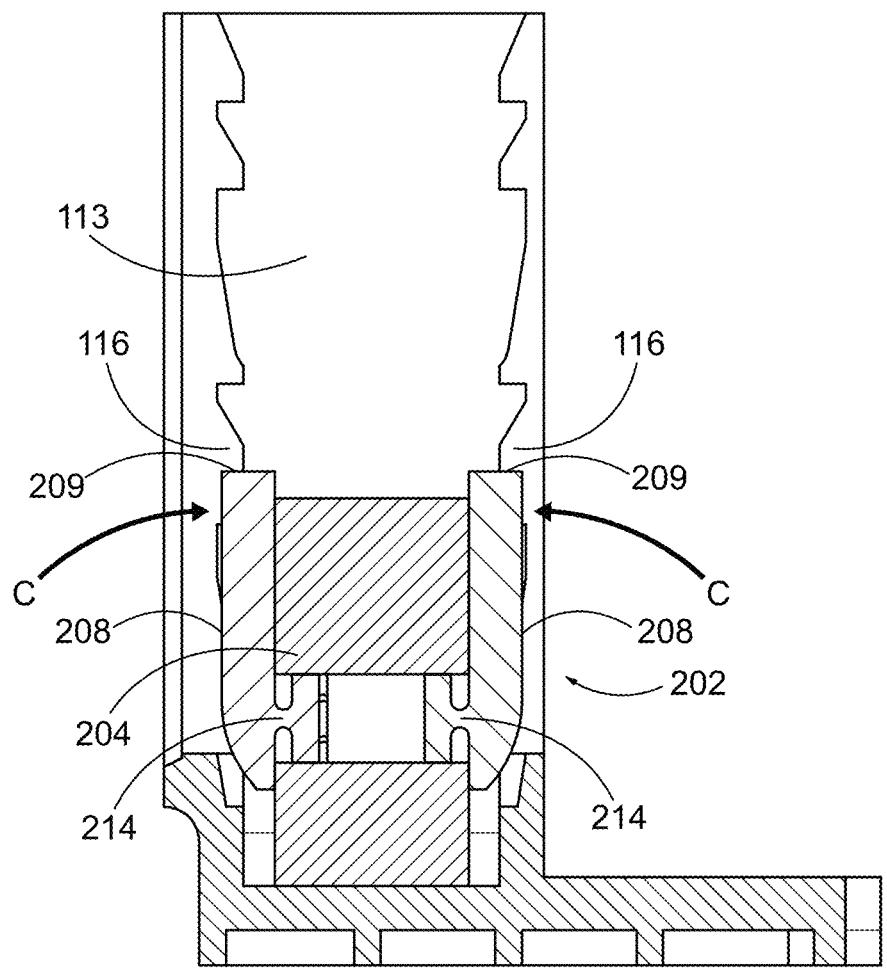
FIGS. 12 and 13 illustrate removal of a seal segment of the individual cable port seal according to an example embodiment.
Figure 13:
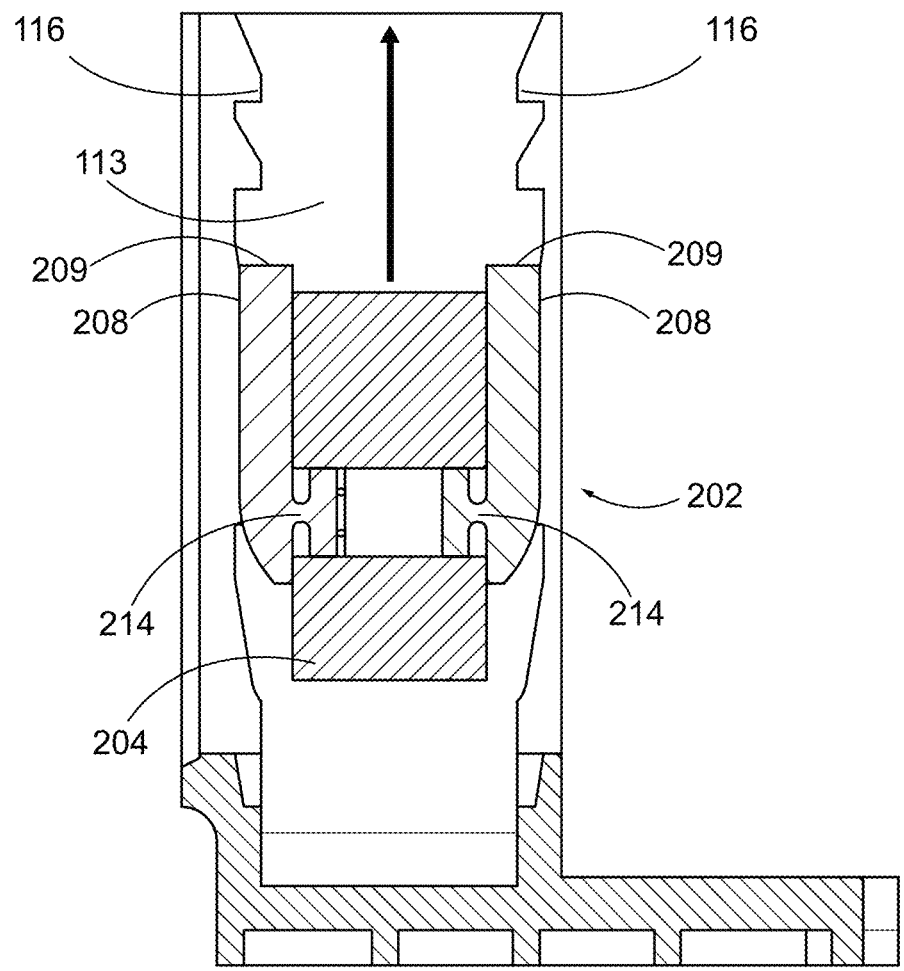

FIGS. 12 and 13 illustrate removal of a seal segment 202A according to an example embodiment. A compressive force may be applied to either side of the seal segment 202 as illustrated by arrows C. The compressive force, e.g. pinch force, may cause the sidewalls 208 and associated locking features 209 to move to the release position about the pivot 214. The locking features 209 may disengage the capture features 116 in the release position, thereby allowing the seal segment 202 to be removed from the channel 113, as illustrated by arrow D.

Figure 14:
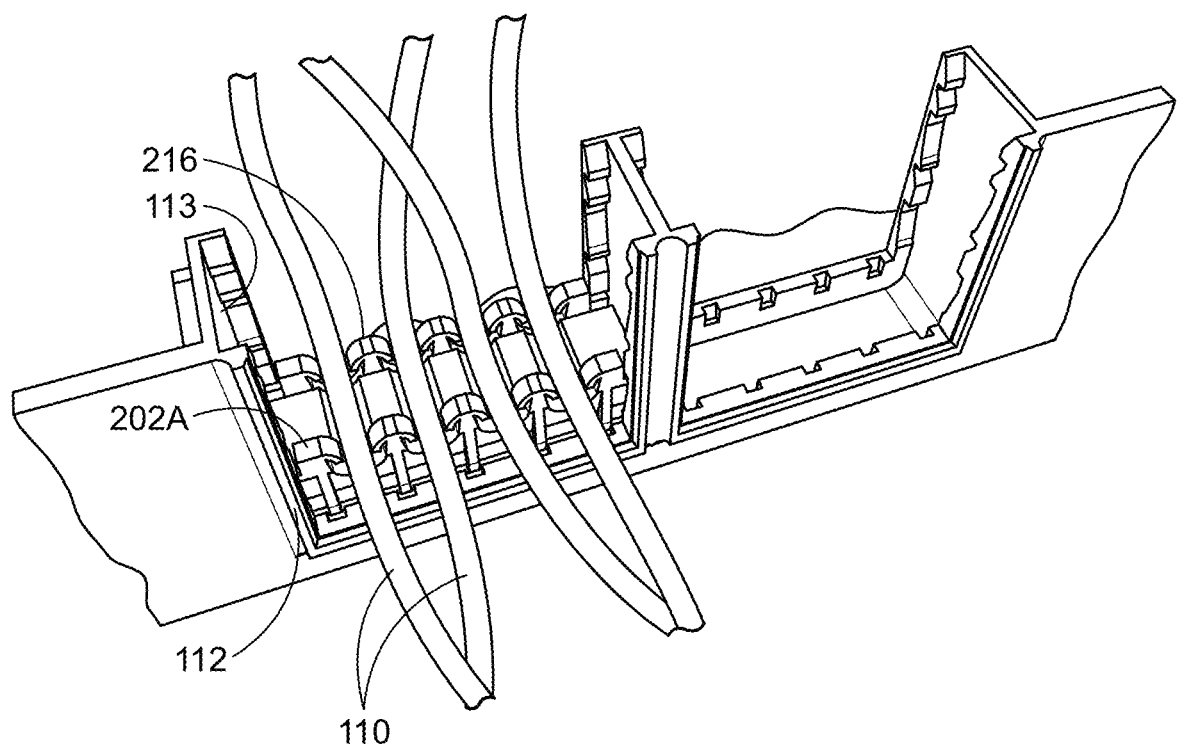
FIGS. 14-16 illustrate an assembly of a illustrate assembly of an individual cable port seal including a plurality of individual fiber optic cables according to an example embodiment.
Figure 15:
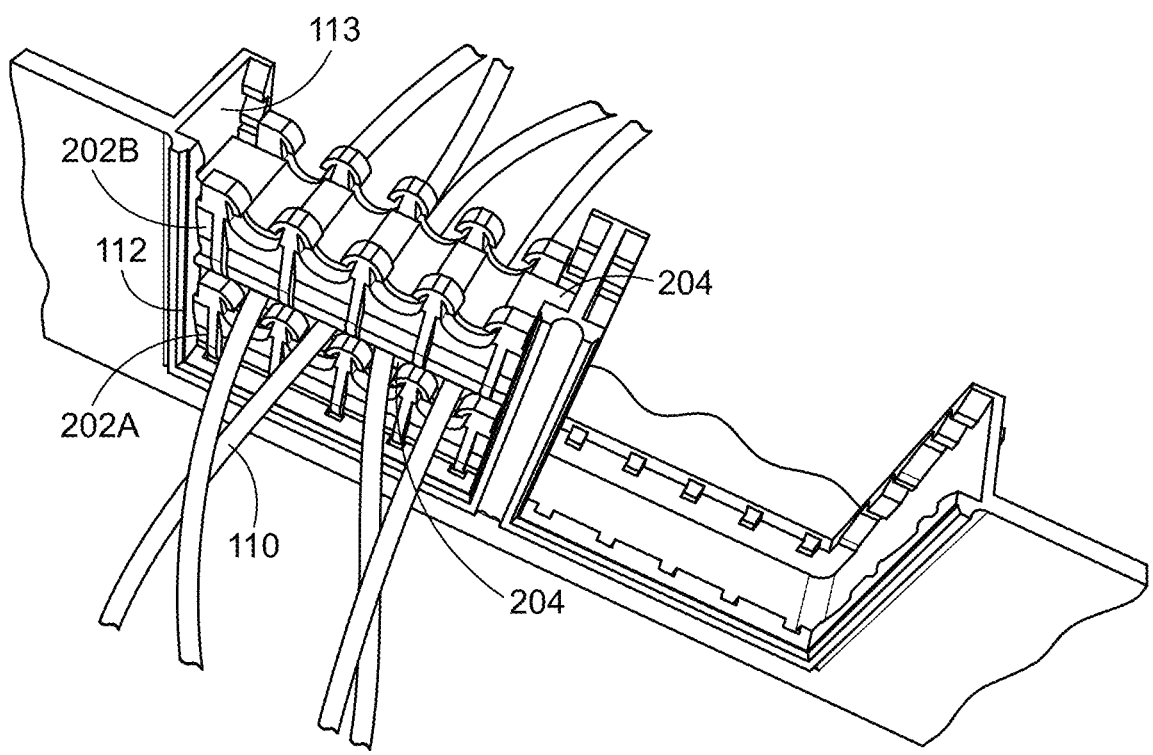
Figure 16:
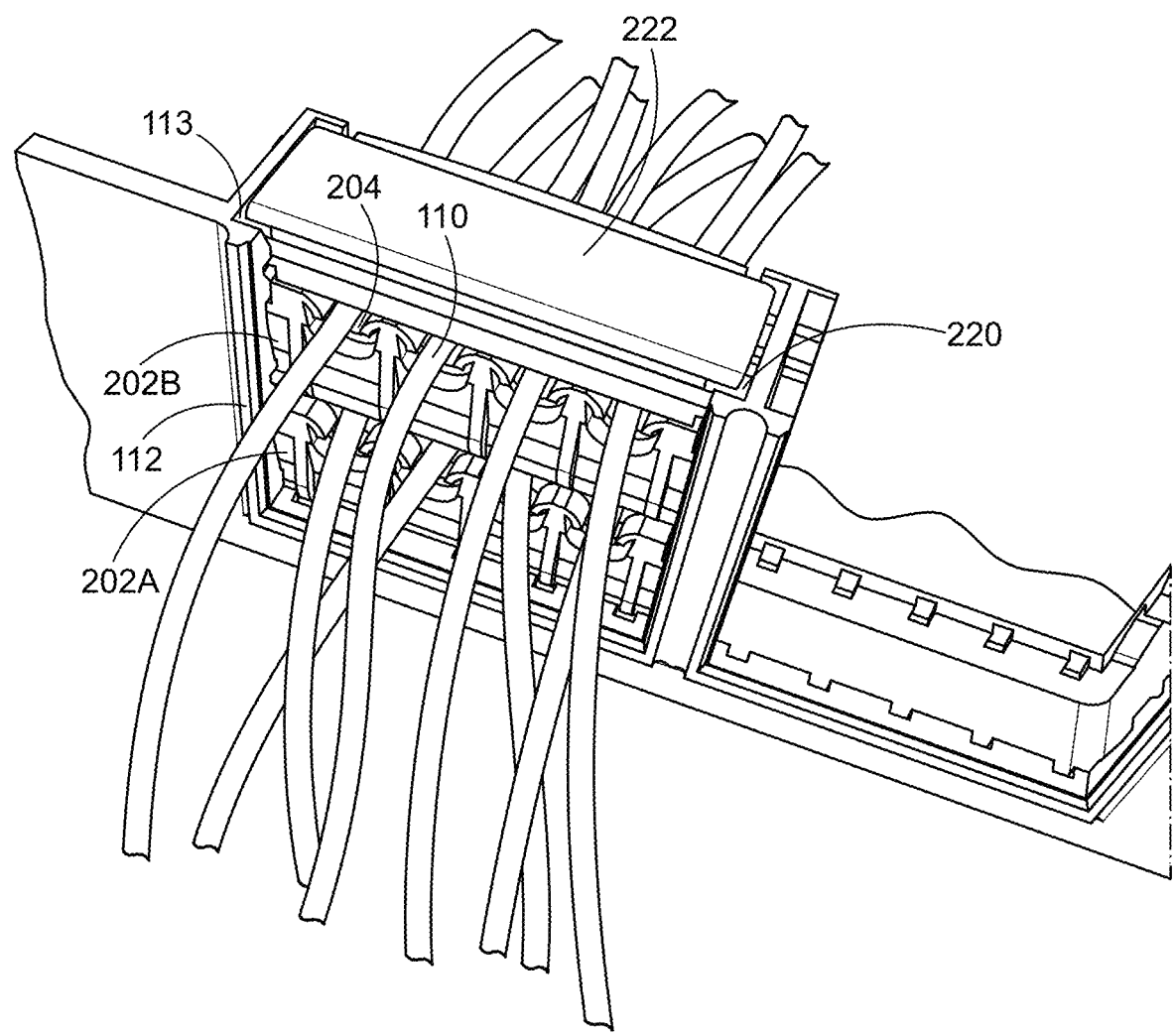

FIG. 14 illustrates a group of individual fiber optic cables 110 installed in to cable guide apertures 216 of a first seal segment 202A, which is turn installed in a channel 113 of a cable port 112. FIG. 15 illustrates a second seal segment 202B installed in the channel 113. The second seal segment 202B applies a compressive force to the sealing component 204 of the second seal segment 202B and the sealing component 204 of the first seal segment 202A. The compressive force causes deformation of the sealing components 204 around the fiber optic cable 110 generating an environmental seal. The sealing components 204 may be configured to deform round a range of cable diameters, such as 2 mm-25 mm, and/or cable types, such as round, squared, butterfly (e.g., "Pixian"), or the like, to generate the environmental seal. FIG. 16 illustrates a second group of individual fiber optic cables 110 installed in to cable guide apertures 216 of a second seal segment 202B and the second sealing component 220 and cap 222 installed in the channel 113. The cap 222 applies a compressive force between the sealing component 204 of the second seal segment 202B and the second sealing component 220. The compressive force causes deformation of the sealing component 204 and the second sealing component 220 around the second group of fiber optic cables 110 generating an environmental seal.

Figure 18:
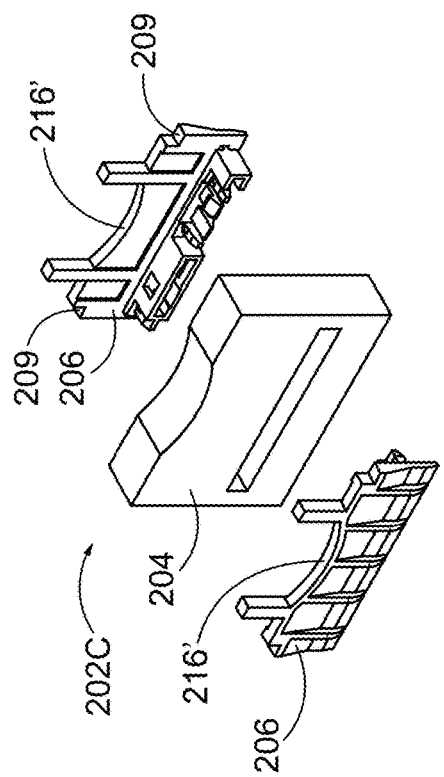
FIG. 18 illustrates an exploded view of an example seal segment for a bundle cable port seal according to an example embodiment.
Figure 17:
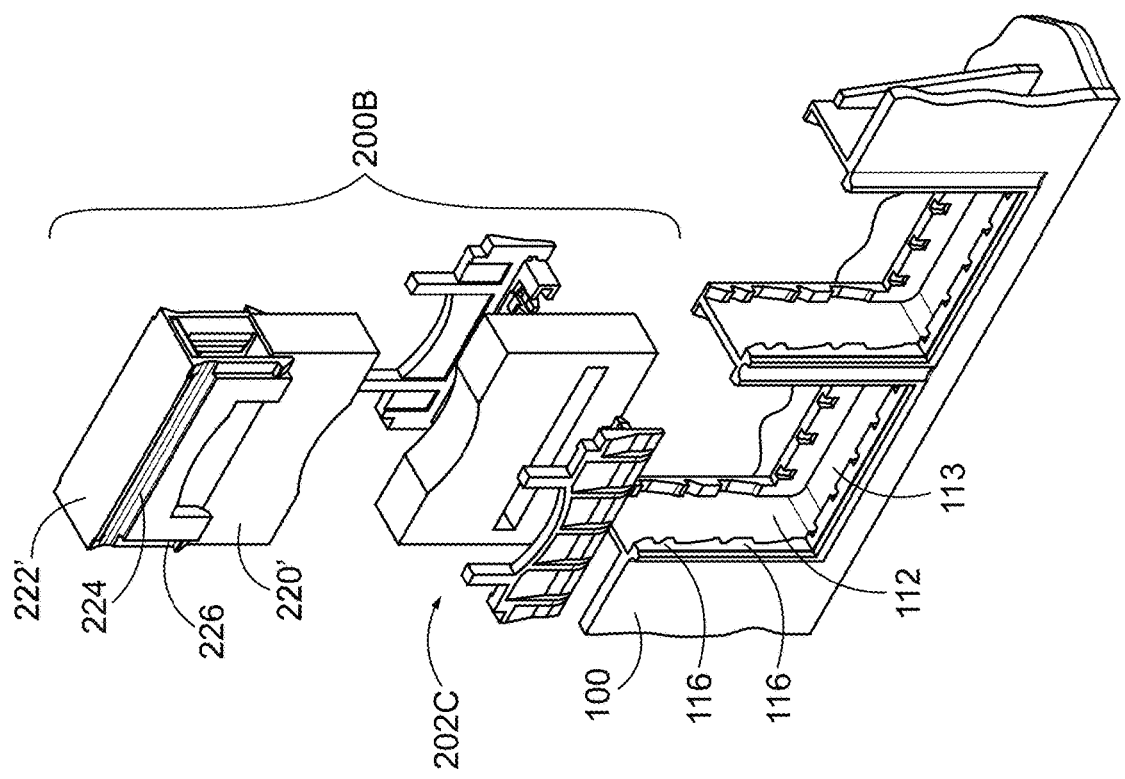
FIG. 17 illustrates an exploded view of an example bundle cable port seal according to an example embodiment.

FIGS. 17 and 18 illustrate an example bundle cable port seal 200B. The bundle cable port seal 200B may be substantially similar to the individual cable port seal 200A, discussed above, with some accommodations for a larger diameter cable, such as a drop cable, or bundle of cables. In an example embodiment, the bundle cable port seal 200B may include a single seal segment 202C. The seal segment 202C may include a sealing component 204 with a larger volume enabling increased deformation around a drop cable or bundle of cables. Similarly, the volume of the second sealing component 220 may also be increased in a manner similar to the sealing component 204 of the seal segment 202C. In some example embodiment, the cable guide apertures 216' of the compression elements 206 may be of a larger diameter to align the drop cable of bundle of cables.

In some example embodiments, the locking features 209 associated with the cap 222' and/or the user interface elements 224 may be elongated in the direction of the channel 113 to enable the locking features 226 to engage capture features 116 deeper into the channel 113. For example, the seal segment 202C may be configured such that the locking features 209 of the seal segment 202C engage the capture features 116 of the cable port 112 that are utilized by the first seal segment 202A of the individual cable port seal 200A. The elongated locking features 226 for the cap 222' of the bundle cable port seal 200B may be configured to engage the capture features 116 utilized by the second seal segment 202B in the individual cable port seal 200A.

Figure 19:
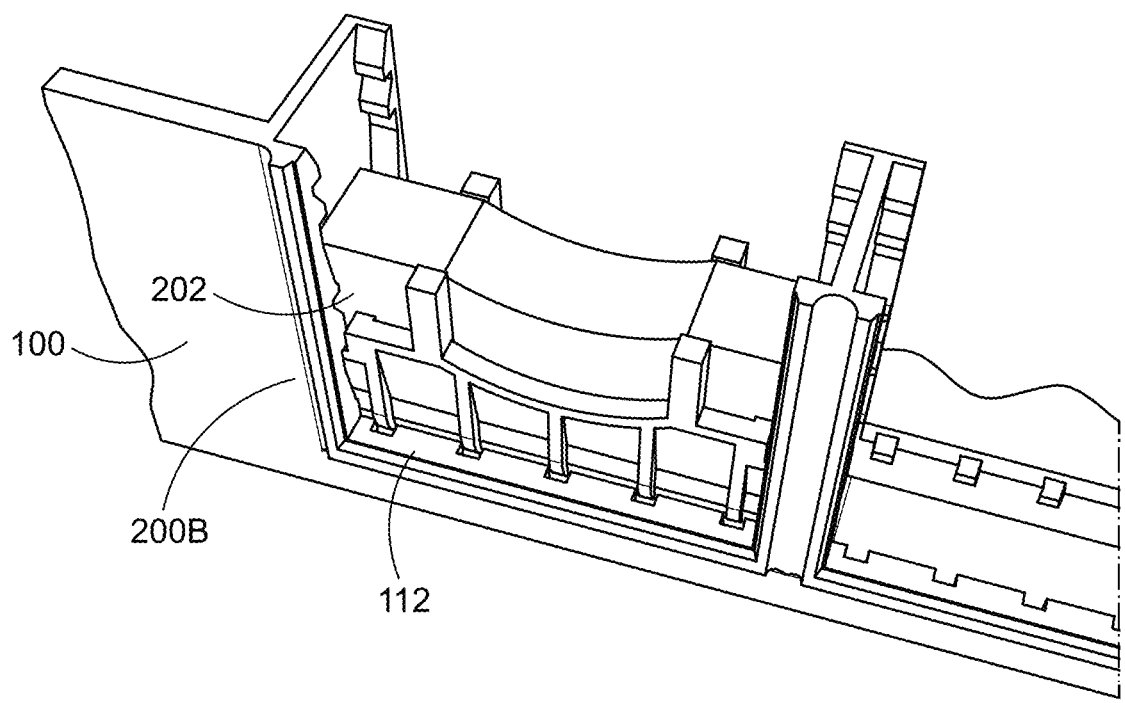
FIGS. 19-21 illustrate an assembly of a illustrate assembly of an individual cable port seal including a plurality of bundled fiber optic cables according to an example embodiment.
Figure 20:
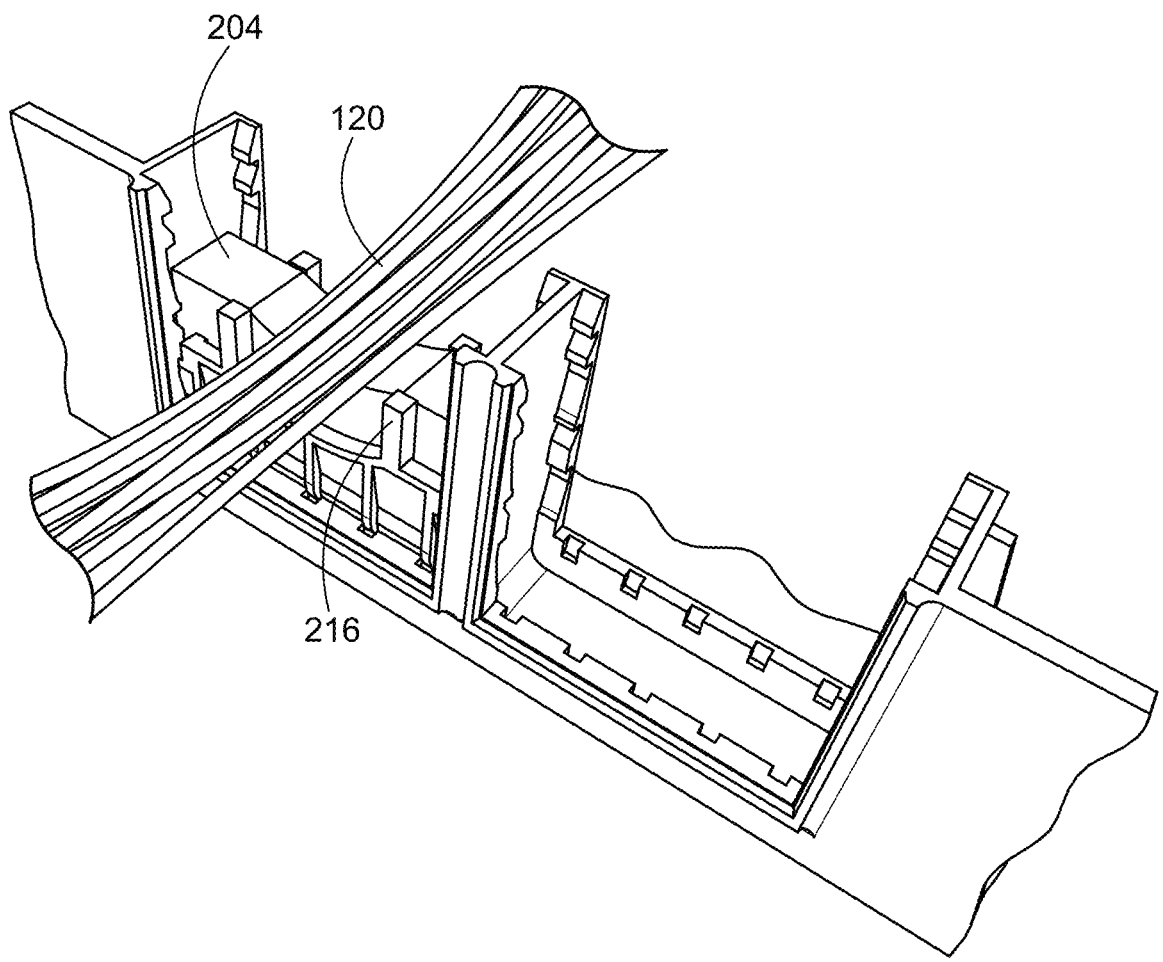
Figure 21:
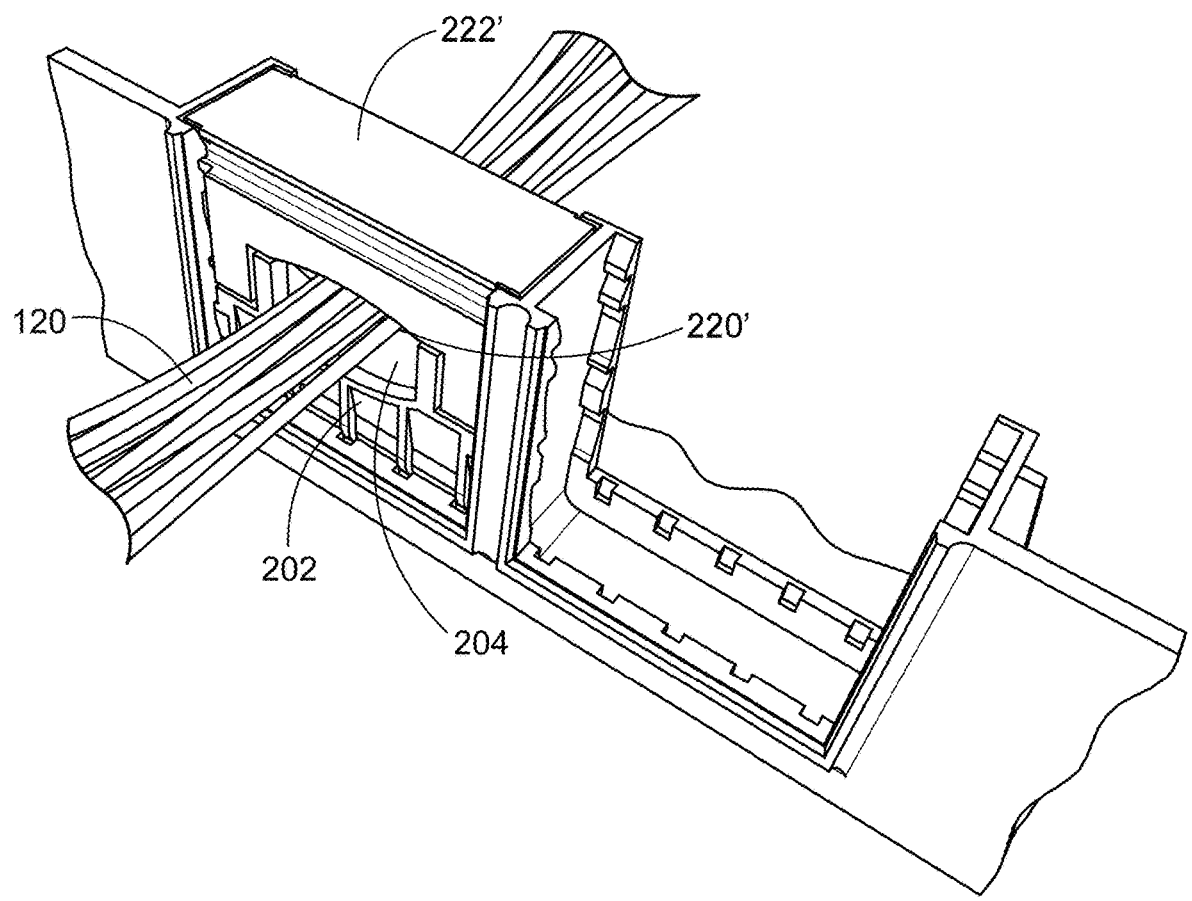

FIG. 19 illustrates a seal segment 202C of a bundle cable port seal 200B inserted into a cable port 112. In FIG. 20 a bundle of fiber optic cables 120 is placed in the cable guide aperture 216' across the sealing component 204. In FIG. 21, the second sealing component 220 and cap 222' are installed in the cable port 112. The cap 222' applies a compressive force to the second sealing component 220 and the sealing component 204 of the seal segment 202, such that each deforms around the bundle of fiber optic cables 120 to generate an environmental seal around the bundle of fiber optic cables.

Figure 22A:
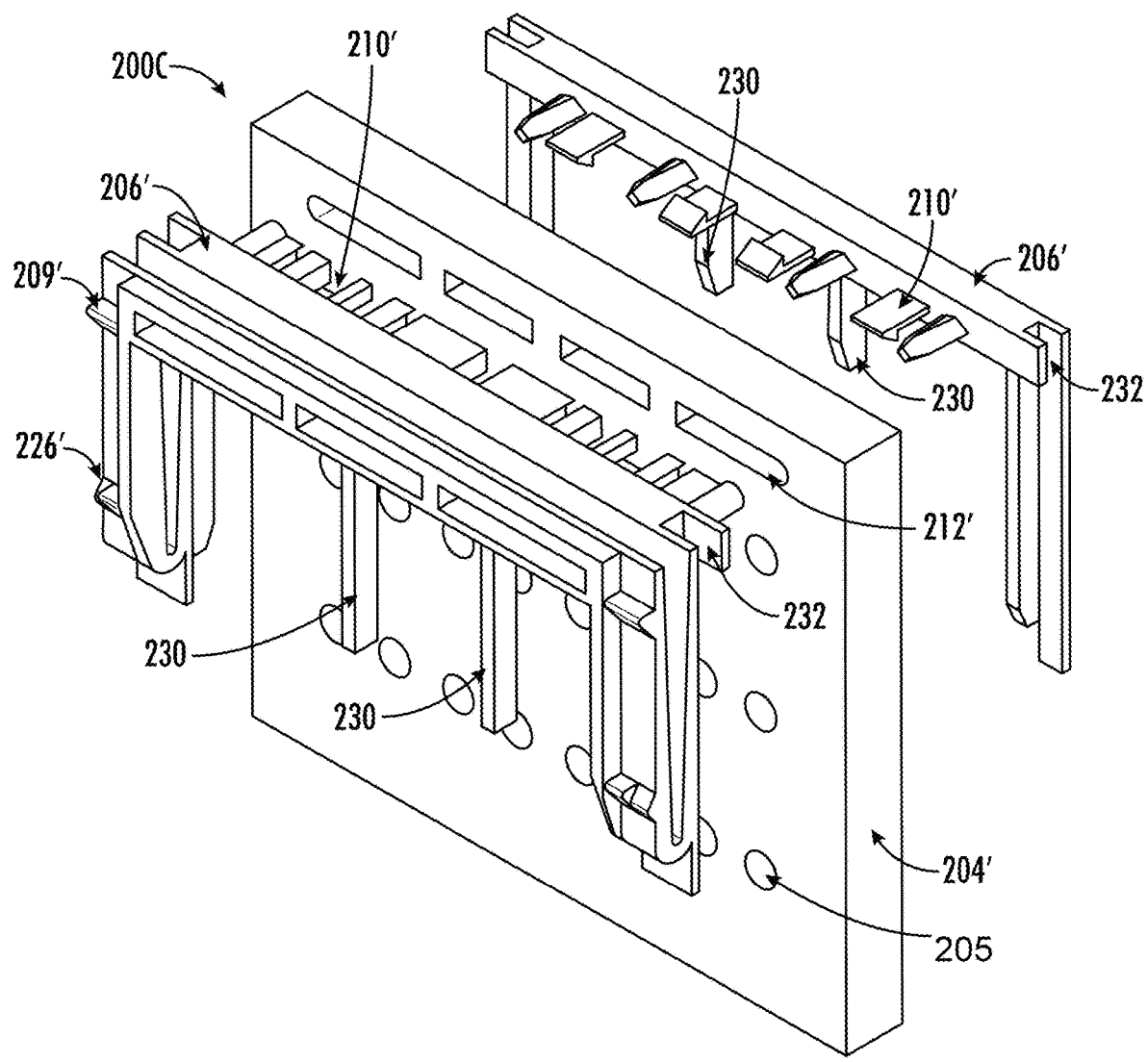
FIG. 22A illustrates an exploded perspective view of a cable port seal configured to receive a plurality of fiber optic cables according to an example embodiment.
Figure 22B:
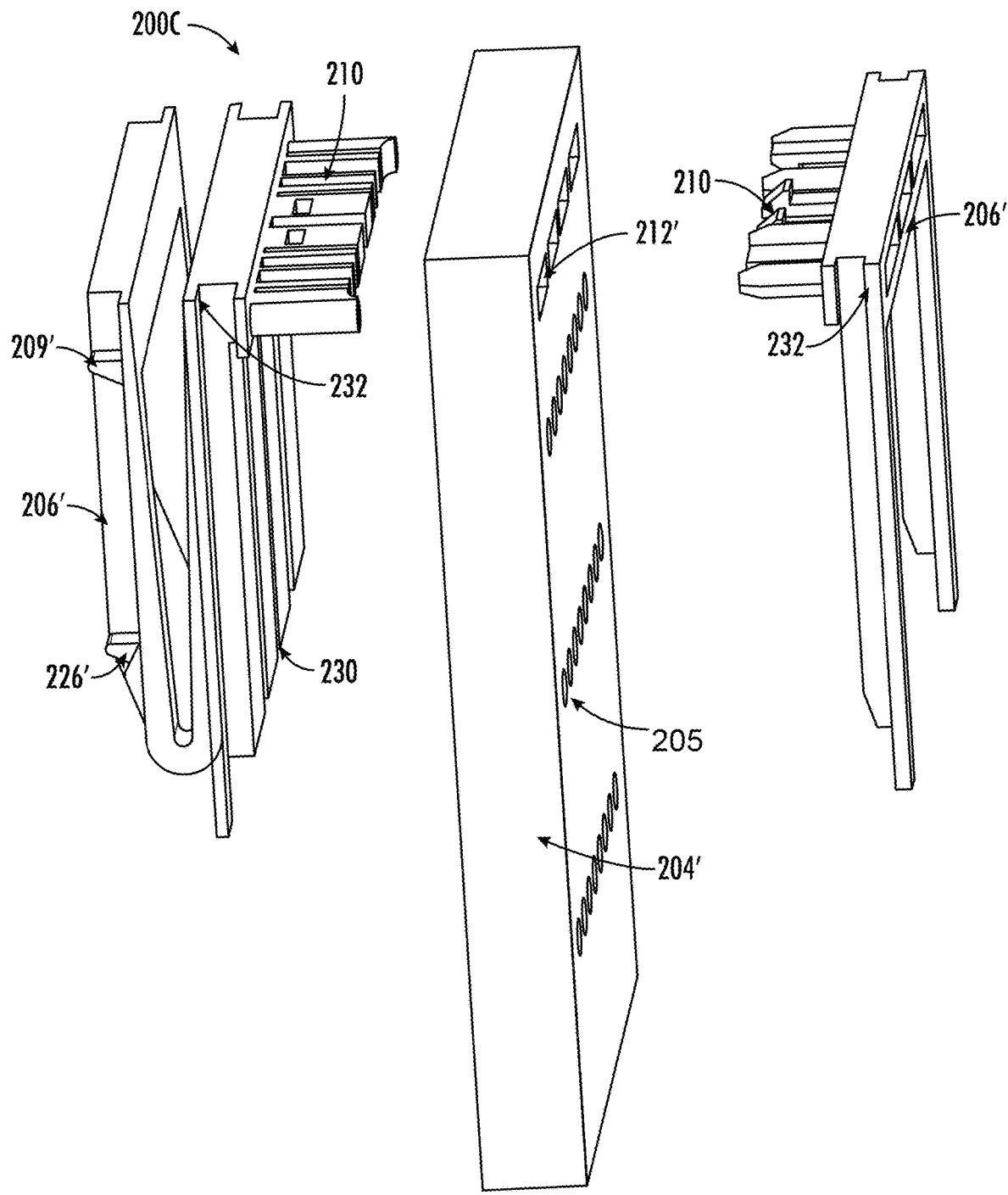
FIG. 22B illustrates an exploded side view of the cable port seal if FIG. 22A according to an example embodiment.
Figure 29:
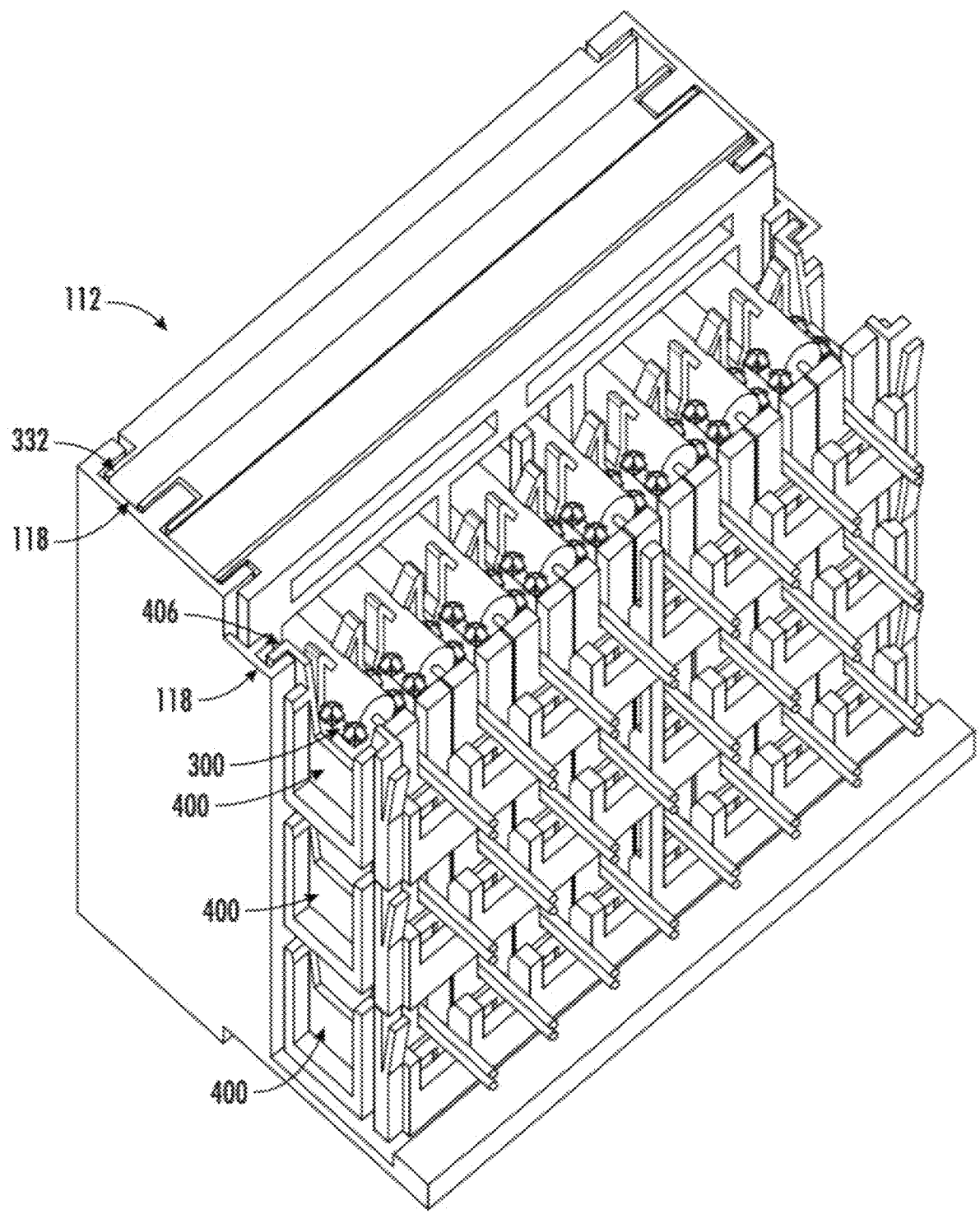
FIG. 29 illustrates a plurality of strain reliefs stacked and engaged with a cable port according to an example embodiment.

FIGS. 22A and 22B illustrate a cable port seal 200C configured to receive a plurality of fiber optic cables similar to the individual cable port seal 200A. However, the cable port seal 200C includes a monolithic sealing component 204'. The sealing component 204' may include a plurality of cable apertures 205, through which one or more fiber optic cables may be passed. Additionally, the sealing component 204' may include one or more pocket apertures 212'. The pocket apertures 212' may be disposed proximate to the top edge, e.g. the portion facing out of the channel 113, of the sealing component 204'. The cap 222 may not be necessary in this configuration, as the connection features 210' of the compression elements apply compressive force in the second direction to the monolithic sealing component 204', while the compression elements 206' apply the compressive force in the first direction. In some example embodiments, the compression elements 206 may include sidewall fingers 230 instead of the full sidewalls, discussed above in reference to the individual cable port seal 200A. The sidewall fingers 230 may enable a greater range of cable diameters and placement configurations. Similar to the cap 222' of the bundle cable port seal 200B, one or both of the compression elements 206' may include locking features 209' and/or deep locking features 226' configured to engage the capture features 116 of the cable port 112. In an example embodiment, the compression elements 206' may include one or more guide features 332 configured to engage one or more guide features 118 disposed on the cable port 112. For example, the guide features 332, 118 may include channels and/or rails that are complementary, such as depicted in FIG. 29.

The cable port seals, as described above, provides a space efficient segmented seal utilizing snap fits and no tools. The segments enable a large range of cable diameters, including both individual cables and cable bundles, and types, including round and butterfly. Seal segments are placed in to guide channels, and fiber optic cables between, or through, seal segments. Snap fits on the guide channel and seal segments and/or caps lock into place with no tools. The snap fit provides a small tolerance stack chain providing superior and uniform compression to sealing components. To remove, or add an additional, fiber cable the segments can simply be squeezed to release the snap fit and removed. Additionally, the symmetrical design of the cable port seal components reduces the number of parts and installation complexity.

Turning now to the strain relief portion of the cable port seal and strain relief assembly, FIGS. 23A and 23B illustrate top and bottom perspective views of an example strain relief 300 for fiber optic cable according to an example embodiment. The strain relief 300 may include a body 301 including a sidewall 302, a cable passthrough 304, and a cable slot 306. The sidewall 302 may be substantially rectangular shaped as depicted in FIGS. 23A and 23B, may be substantially arc shaped as depicted in FIG. 29, or any other suitable shape. The cable passthrough 304 may be an aperture disposed in the body 301 from a first end to a second end that may enable a fiber optic cable to pass from the first end to the second end of the body 301. The cable slot 306 may be a gap in the sidewall 302 extending from a first end to a second end of the body 301, such that a fiber optic cable may be inserted therethrough without feeding the fiber optic cable through the cable passthrough 304 from the first end to the second end.

In an example embodiment, the strain relief 300 may include one or more hooks 308 disposed on an exterior surface of the sidewall 302 and extending therefrom. As described in further detail below in reference to FIGS. 24-26, the hooks 308 are configured to resist movement of a strength member of a fiber optic cable, when the strength member is wrapped around the body 301. The strength member of the fiber optic cable may be a aramid yarn layer, such as Kevlar®, configured to limit axial torsion applied to the optical fiber. The hooks 308 may function in a manner similar to hook and loop fasteners, e.g. Velcro, when the strength member is wrapped around the body 301. The hooks 308 may include a projection coupled to the sidewall 302 at a first projection end and one or more barbs 309 extending radially from the projection at a second projection end. The barbs 309 may form a cross pattern having two sets of opposing barbs 309, form a cross pattern having one barb disposed perpendicularly to a set of opposing barbs 309, form a star pattern with three, five, or other number of barbs extending at regular intervals, or other suitable configuration. In some example embodiments, the strain relief 300 may also include one or more pins 310 extending from the sidewall 302. The pins 310 may be configured to resist movement of the strength member toward either the first or second end of the body 301, e.g. sliding.

In some example embodiments, the strain relief 300 may include a first end plate 312 disposed at the first end of the body 301 and a second end plate 314 disposed at the second end of the body 301. The first end plate 312 and second end plate 314 configured to be received by a strain relief receiver, such as the strain relief receiver 400 depicted in FIGS. 27A and 27B. The strain relief receiver 400 may be configured to retain the strain relief 300 in a mounted position relative to the fiber optic assembly 100, when the cable strain relief 300 is installed on the fiber optic assembly 100. The strain relief receiver 400 may be disposed in the interior volume of the fiber optic assembly 100 or may be disposed external to the fiber optic assembly 100. In some example embodiments, the strain relief receiver 400 may be disposed proximate to, or immediately next to a respective cable port seal 200.

Figure 27B:
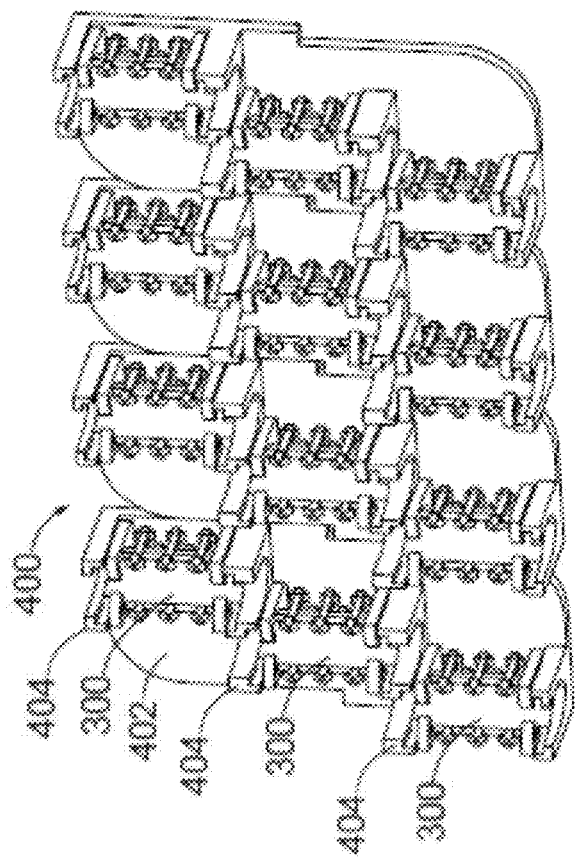
FIG. 27B illustrates an example strain relief receiver including a plurality of strain reliefs inserted therein according to an example embodiment.
Figure 27A:
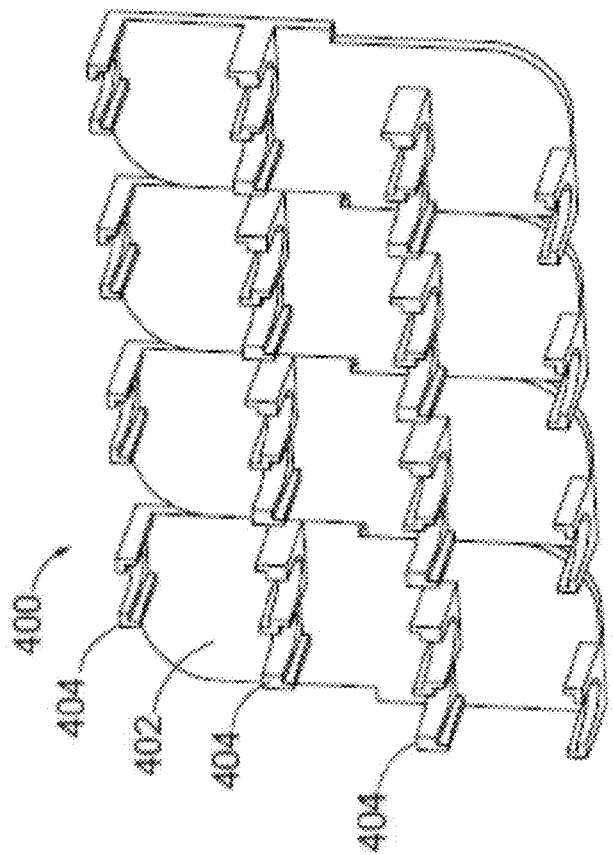
FIG. 27A illustrates an example strain relief receiver according to an example embodiment.
Figure 28:
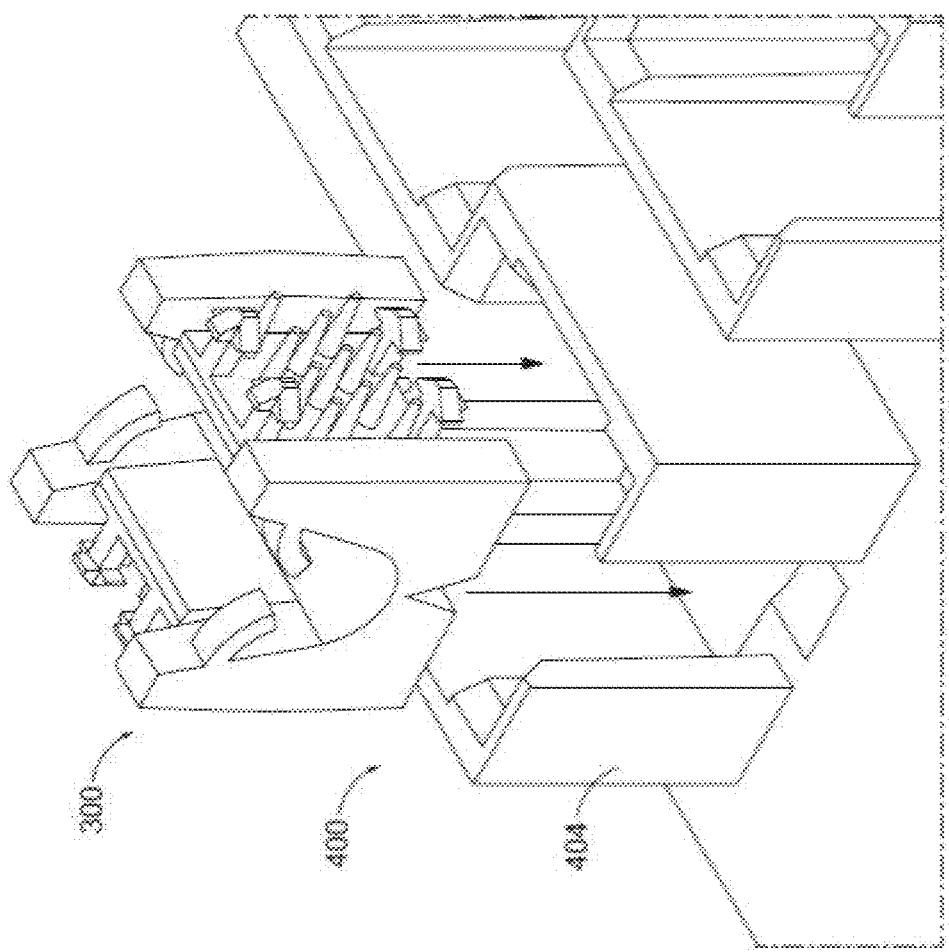
FIG. 28 illustrates an example insertion of a strain relief into a strain relief receiver according to an example embodiment.

The strain relief receiver 400 may include a backplane 402 configured to be mounted within the housing, such as on the base portion 102. The strain relief receiver 402 may include one or more strain relief receptacles 404 configured to receive individual strain reliefs 300. The strain relief receptacles 404 may have a complementary shape to the strain relief 300 and/or the end plates 312, 314 of the strain relief 300, such that an interference fit is established between a strain relief 300 and the strain relief receptacle 404, as shown in FIG. 28. Multiple strain relief receptacles 404 may be arranged next to each other, offset (as depicted in FIGS. 27A and 27B), staggered, or other suitable placement. A staggered or offset arrangement of the strain relief receptacles 404 may increase the accessible area for installation and removal of strain reliefs 300, thereby reducing the dexterity needed to perform an installation or removal function by a technician. In some example embodiments, the close proximity of the strain relief 300 to the backplane 402, when the strain relief 300 is installed into a strain relief receptacle 404, may increase the resistance to movement of the strength member of the fiber optic cable.

Figure 27C:
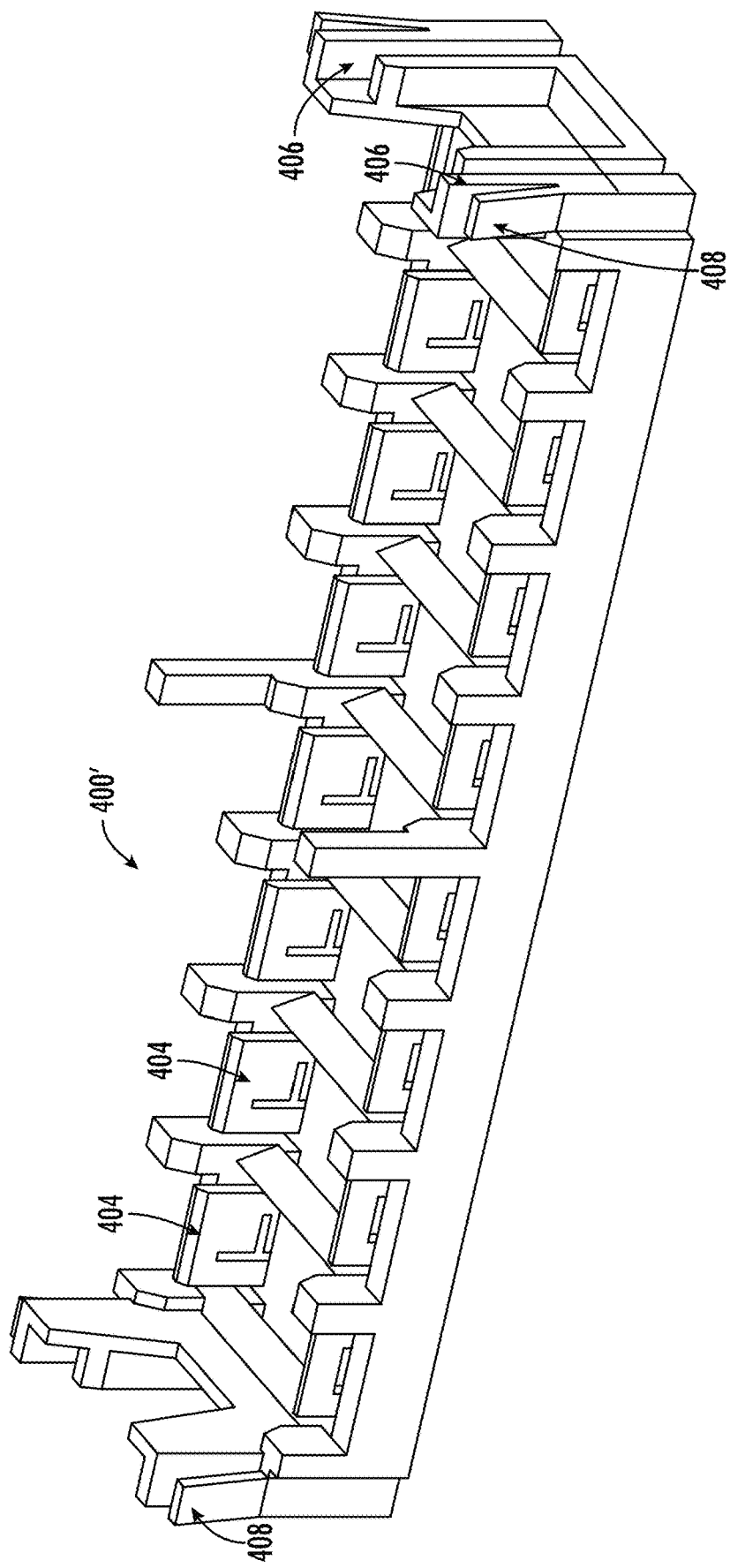
FIG. 27C illustrates an example strain relief receiver configured for side by side strain relief insertion according to an example embodiment.

In some example embodiments, a strain relief receiver 400' may include a plurality of strain relief receptacles 404 arranged side by side, as shown in FIG. 27C. Further, the strain relief receiver 400' may include one or more guide features 406 configured to engage one or more guide features 118 disposed on the cable port 112. For example, the guide features 406, 118 may include channels and/or rails that are complementary, as depicted in FIG. 29. In some embodiments, the strain relief receivers 400' may include one or more restraint features 408, such as tabs, protrusions, or detents, configured to resist movement of the strain relief receivers 400' out of, or away from, the cable port 112. For example, the restraint features 408 may be disposed on or proximate to the guide features 406, 118, such that when the guide features 406 of the strain relief receiver 400' engage the guide features 118 of the cable port 112, the restrain features resist removal thereof. As depicted in FIG. 29, the cable port 112 may be configured to accept a plurality of strain relief receivers 400', such as in a stacked arrangement. The stacked arrangement may enable easy expandability or build out of the fiber optic assembly 100 as additional fiber optic cables are added.

Figure 27D:
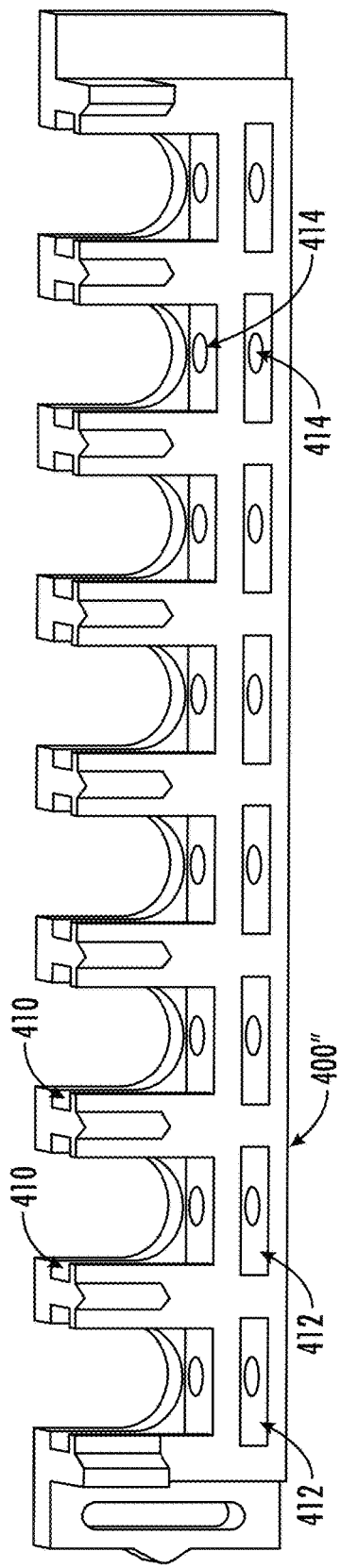
FIG. 27D illustrates an example strain relief receiver having a low profile according to an example embodiment.
Figure 27E:
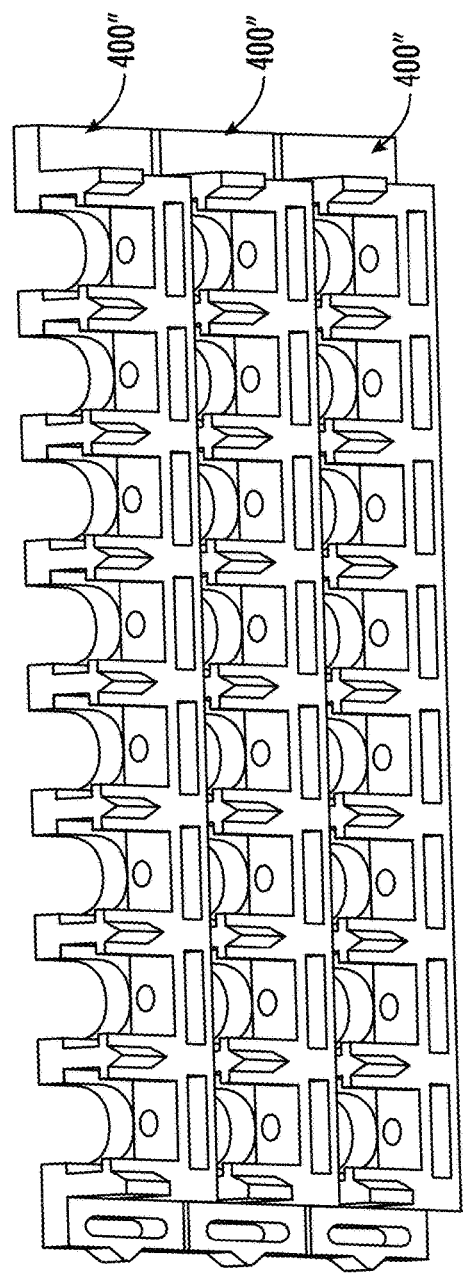
FIG. 27E illustrates an example stacking of a plurality of strain reliefs of FIG. 27D according to an example embodiment.

Turing to FIGS. 27D and 27E, a strain relief receiver 400" may be provided having a reduced profile. The strain relief 400" may include one or more channels 410 configured to receive a first end plate 312 or second end plate 314 of a strain relief 300. The first end plate 312 or second end plate 314 may be interference fit in the channel 410. Additionally or alternatively the first end plate 312, second end plate 314, and/or the channel 410 may include one ore more mounting features, such as detents or protrusions. The mounting features may resist removal of the strain relief 300 from the strain relief receiver 400". Similar to the strain relief 400', discussed in reference to FIG. 29, the strain reliefs 400", having the smaller profile, may also be stacked to enable easy expandability and/or build out of the fiber optic assembly 100.

In some example embodiments, the strain relief receiver 400" may include one or more sockets 412 configured to receive a mounting feature 324 (FIG. 45-55). The mounting feature 324 may be inserted into a socket 412 and may be retained therein by a friction or interference fit. Additionally or alternatively, the sockets 412 may include one or more holes or detents 414 corresponding to one or more projections 326 disposed on the mounting feature 324. When the mounting feature 324 is inserted into the sockets 412, the projections 326 may engage the detents 414. Engagement of the projections 326 and the detents 414 may resist removal of the strain relief 300 from the strain relief receiver 400". In some embodiments, the configuration may be reversed, such that the sockets 414 are disposed on the strain relief 300 and the mounting feature 324 is disposed on the strain relief receiver 400". In a further embodiment, the configuration may alternate, such that the strain relief receiver 400" includes both sockets 412 and mounting features 324 in an alternating pattern and strain reliefs having the corresponding mounting feature 324 or socket 412 are installed thereon.

Turning back to FIG. 23B, the strain relief 300 may include a notch 316 disposed in an edge of the first end plate 312 and/or second end plate 314. The notch 316 may disposed in an edge of the first end plate 312 or second end plate 314 opposite the cable slot 306. The notch 316 may enable the strength member of the fiber optic cable to transition from an interior of the sidewall 302 to the exterior of the sidewall 302, to be wrapped around the body 301. In some example embodiments, the notch 316 may be V-shaped with substantially planner sidewalls, may be V-shaped with arched sidewalls, may be rectangular, or any other suitable shape. In an example embodiment, the V-shape of the notch 316 may provide some resistance to movement of the strength member when passed therethrough.

Figure 30:
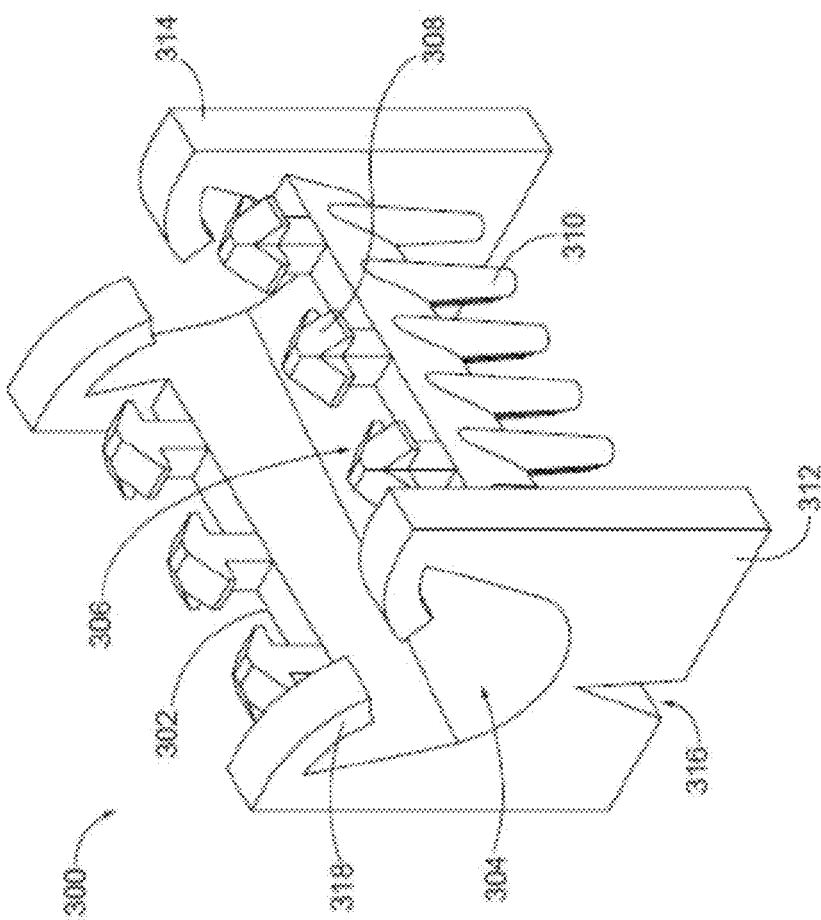
FIG. 30 illustrates a perspective view of an example strain relief according to an example embodiment.
Figure 32:
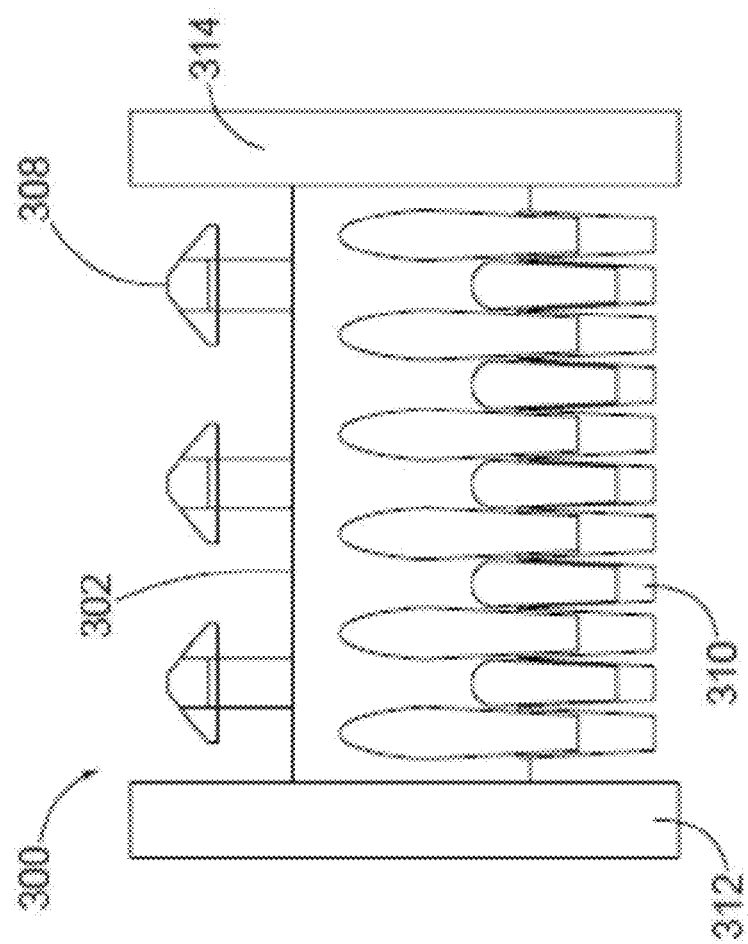
FIG. 32 illustrates an example side view of the strain relief of FIG. 30 according to an example embodiment.
Figure 31:
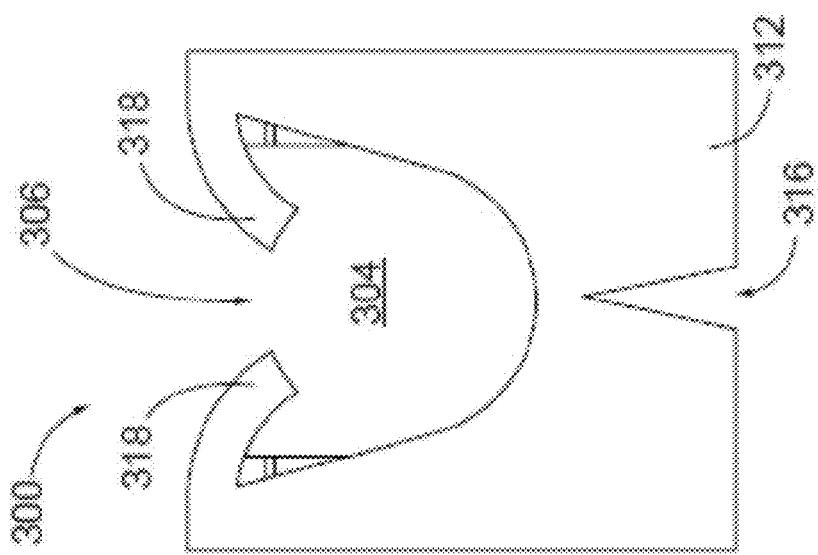
FIG. 31 illustrates an example front view of the strain relief of FIG. 30 according to an example embodiment.
Figure 34:
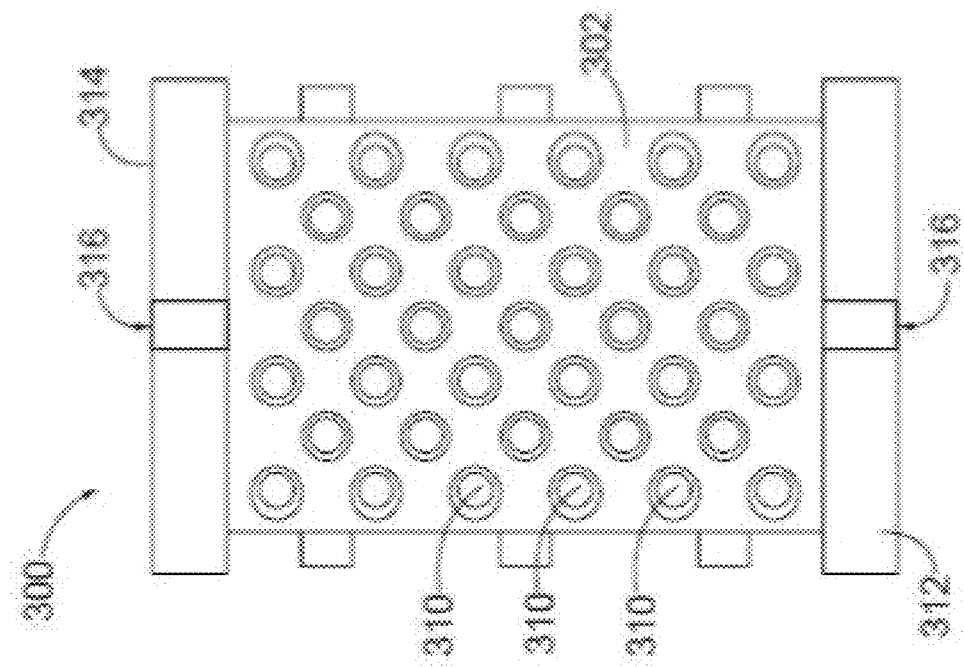
FIG. 34 illustrates an example bottom view of the strain relief of FIG. 30 according to an example embodiment.
Figure 33:
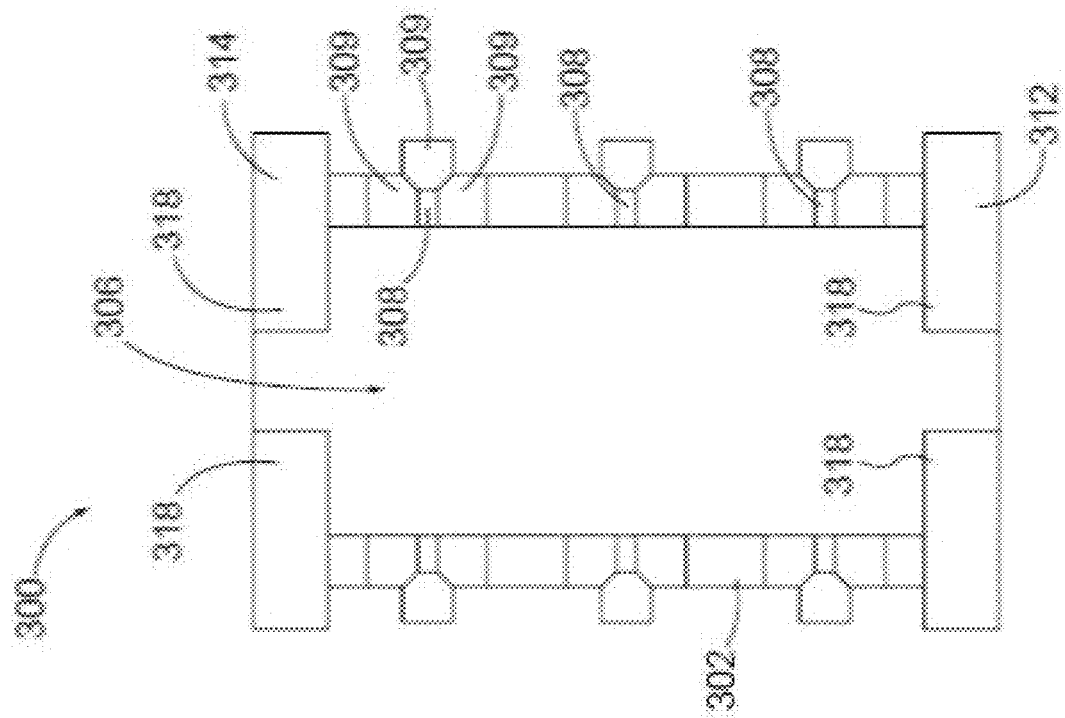
FIG. 33 illustrates an example top view of the strain relief of FIG. 30 according to an example embodiment.
Figure 35:
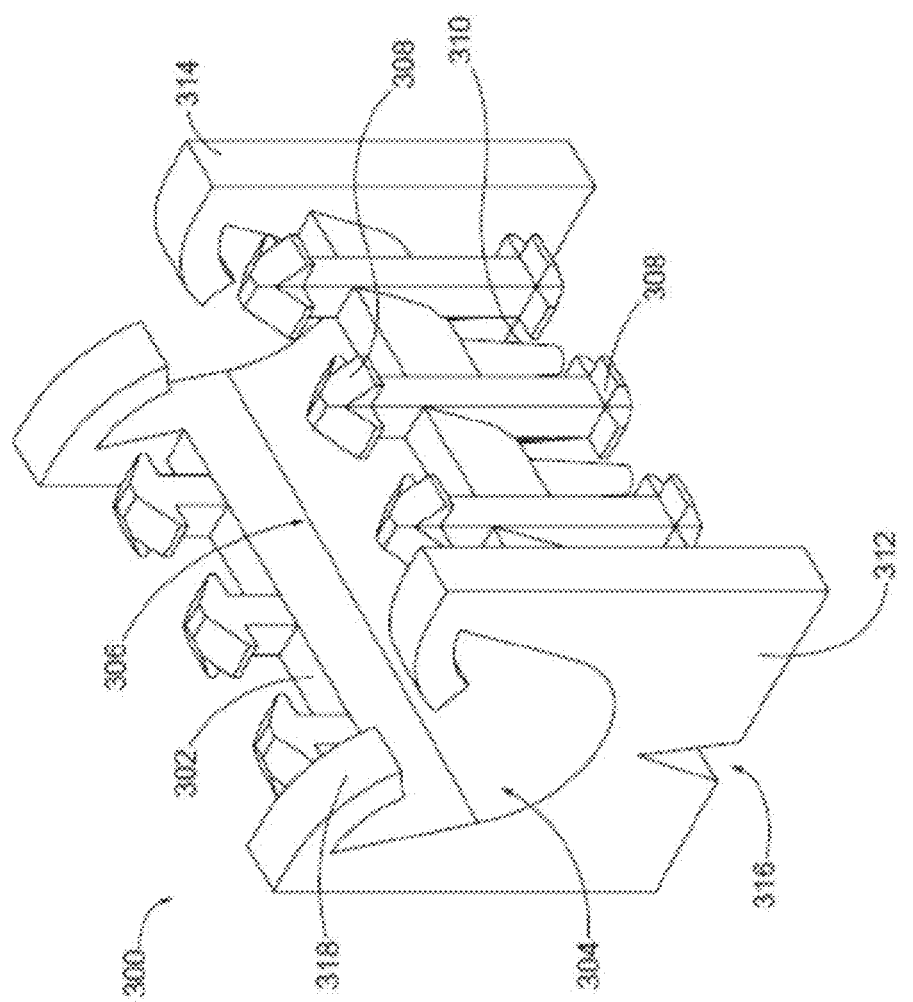
FIG. 35 illustrates a perspective view of a second example strain relief according to an example embodiment.
Figure 37:
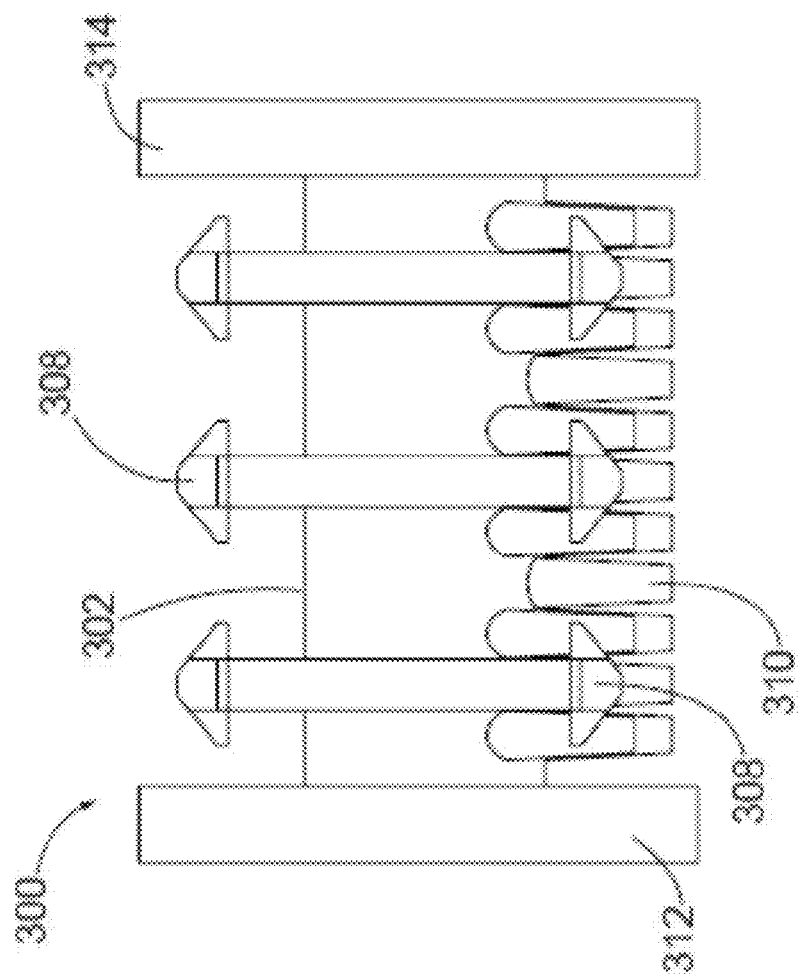
FIG. 37 illustrates an example side view of the strain relief of FIG. 35 according to an example embodiment.
Figure 36:
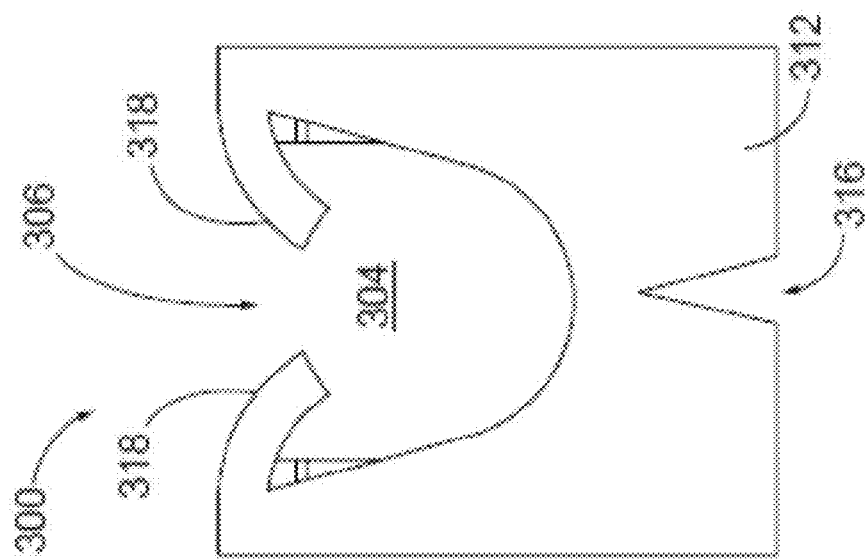
FIG. 36 illustrates an example front view of the strain relief of FIG. 35 according to an example embodiment.
Figure 39:
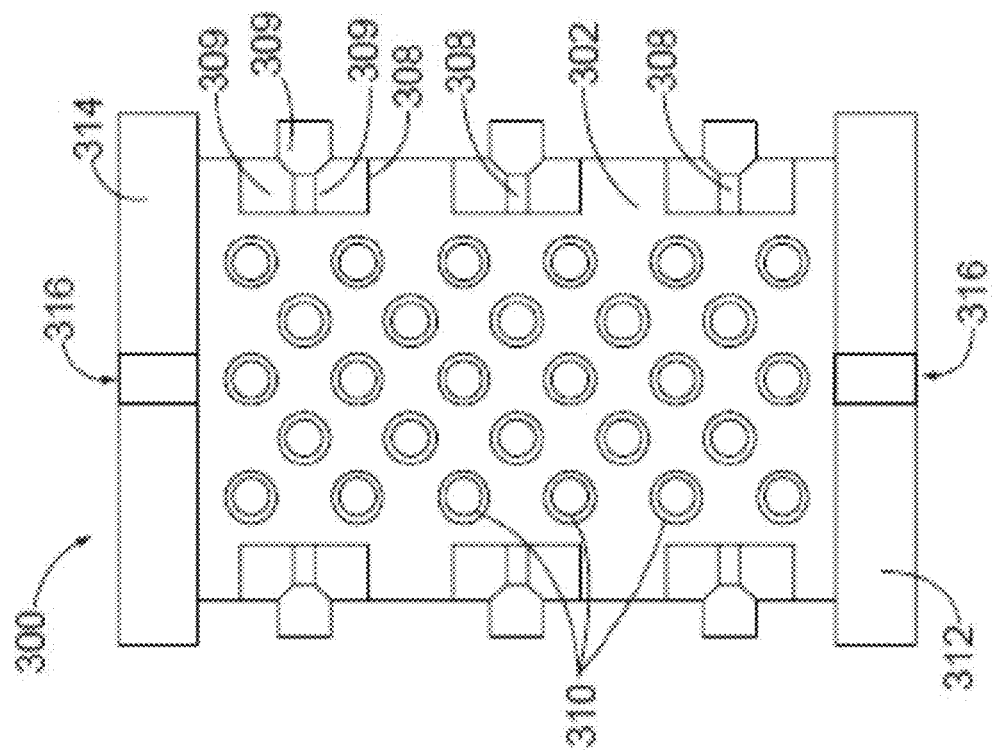
FIG. 39 illustrates an example bottom view of the strain relief of FIG. 35 according to an example embodiment.
Figure 38:
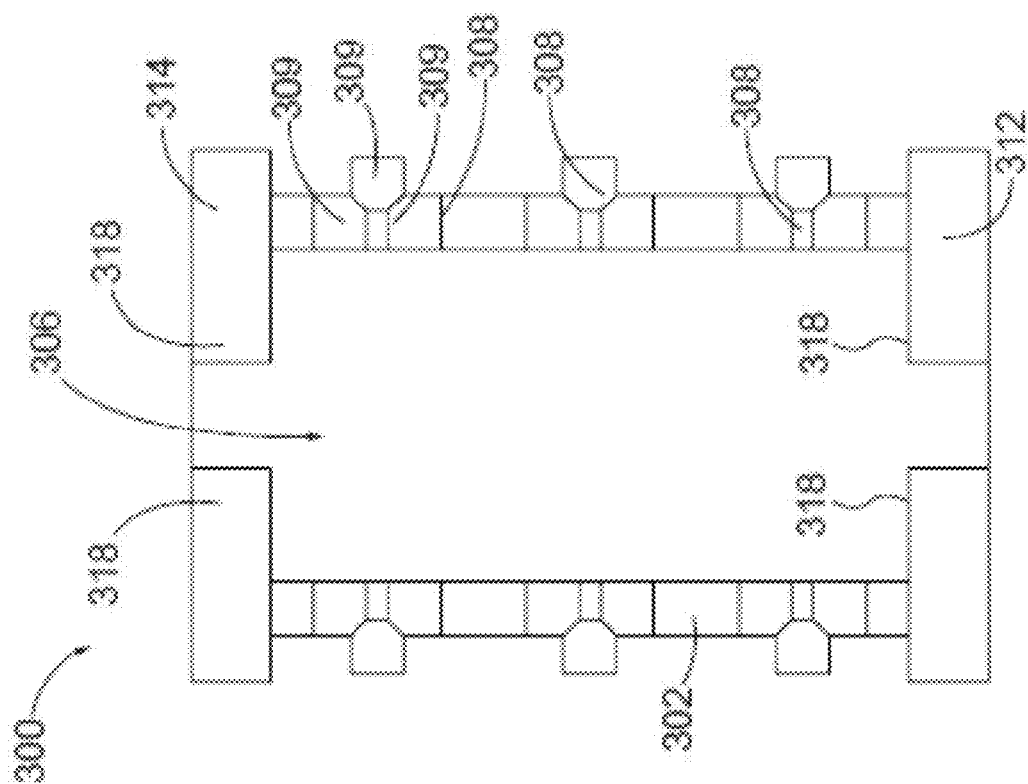
FIG. 38 illustrates an example top view of the strain relief of FIG. 35 according to an example embodiment.
Figure 40:
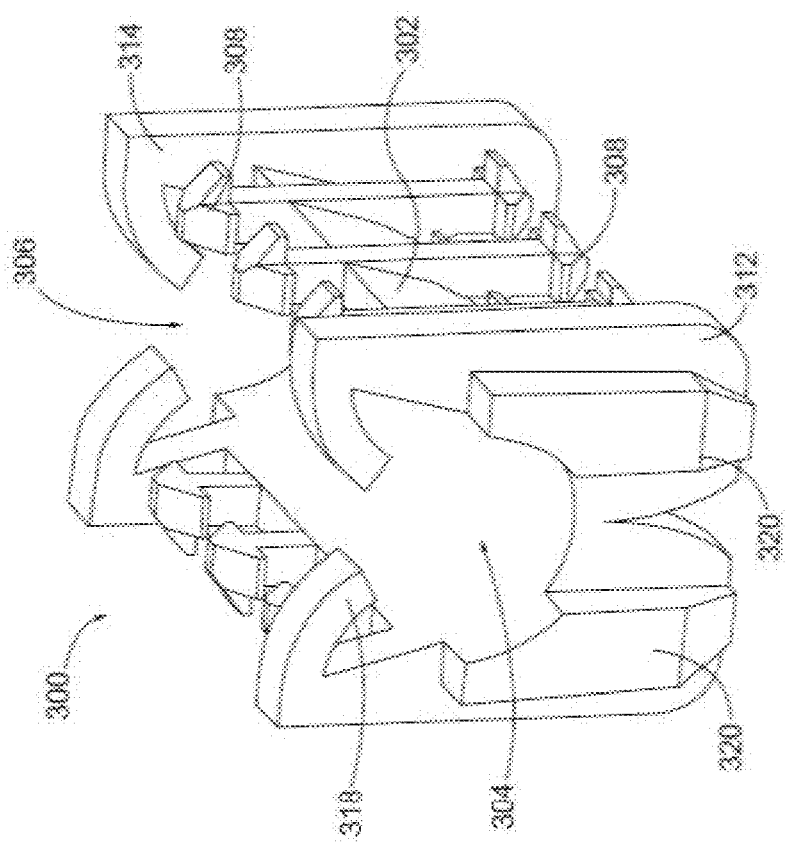
FIG. 40 illustrates a perspective view of a third example strain relief according to an example embodiment.
Figure 42:
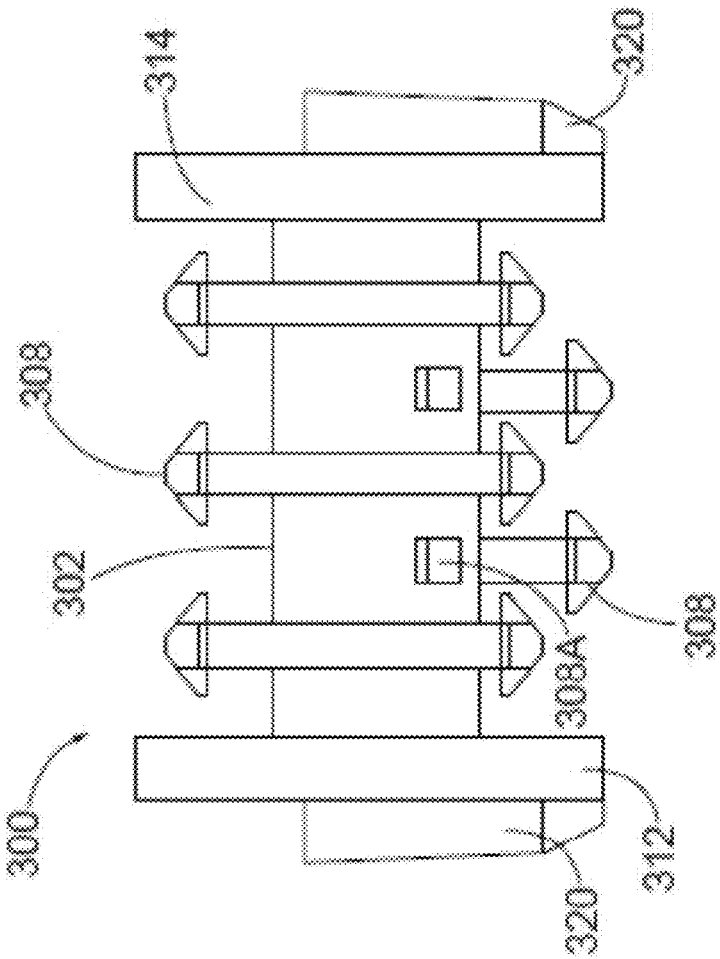
FIG. 42 illustrates an example side view of the strain relief of FIG. 40 according to an example embodiment.
Figure 41:
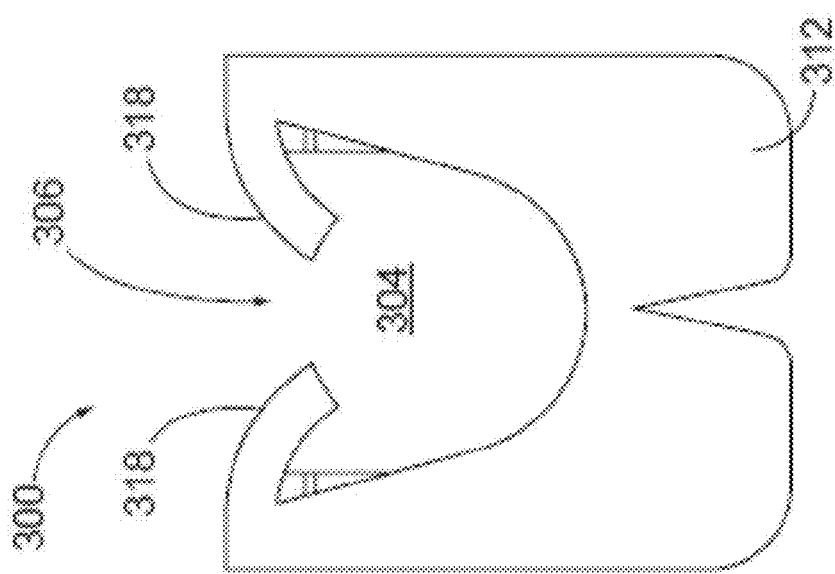
FIG. 41 illustrates an example front view of the strain relief of FIG. 40 according to an example embodiment.
Figure 44:
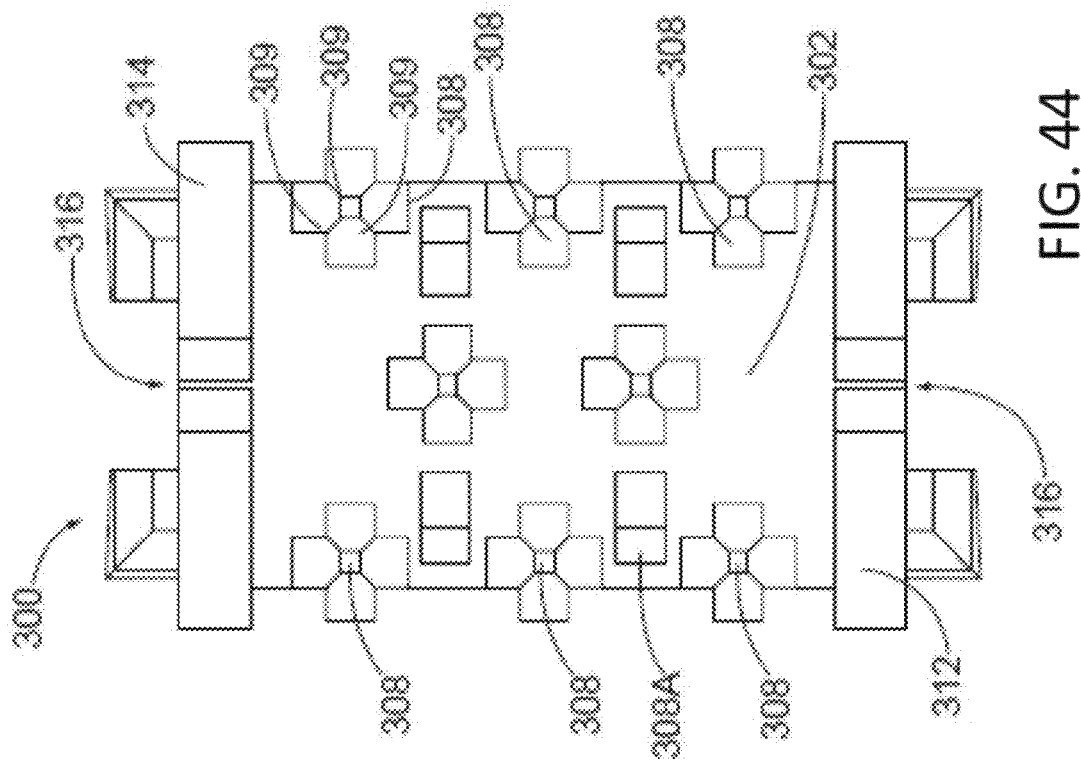
FIG. 44 illustrates an example bottom view of the strain relief of FIG. 40 according to an example embodiment.
Figure 43:
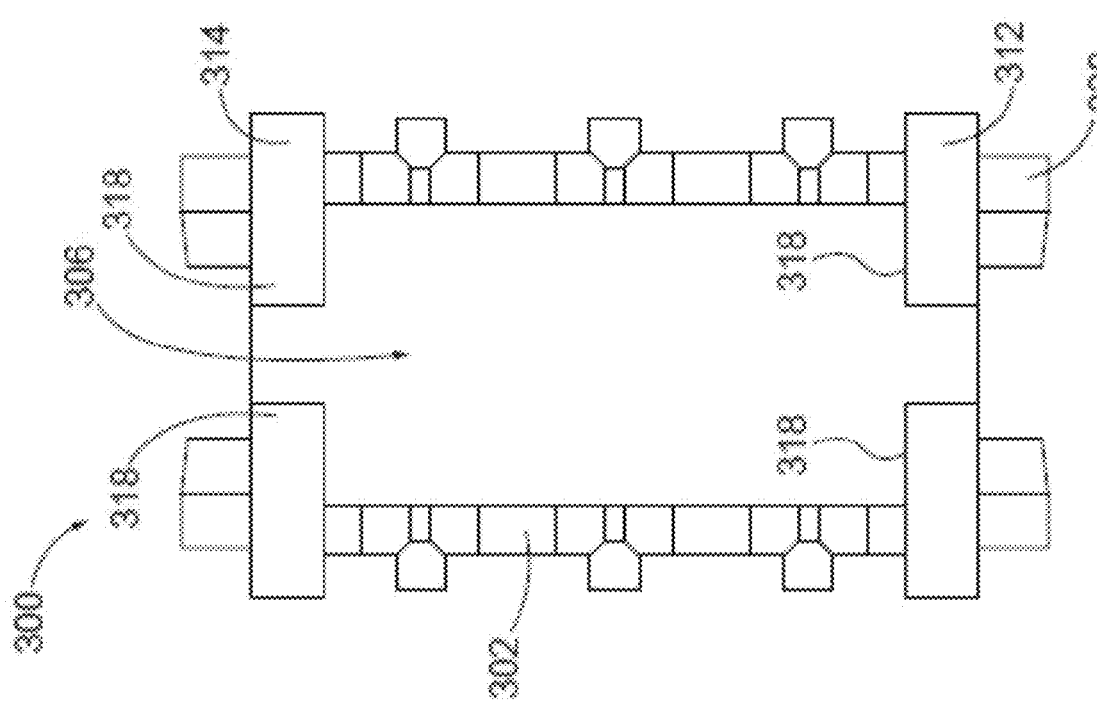
FIG. 43 illustrates an example top view of the strain relief of FIG. 40 according to an example embodiment.
Figure 45:
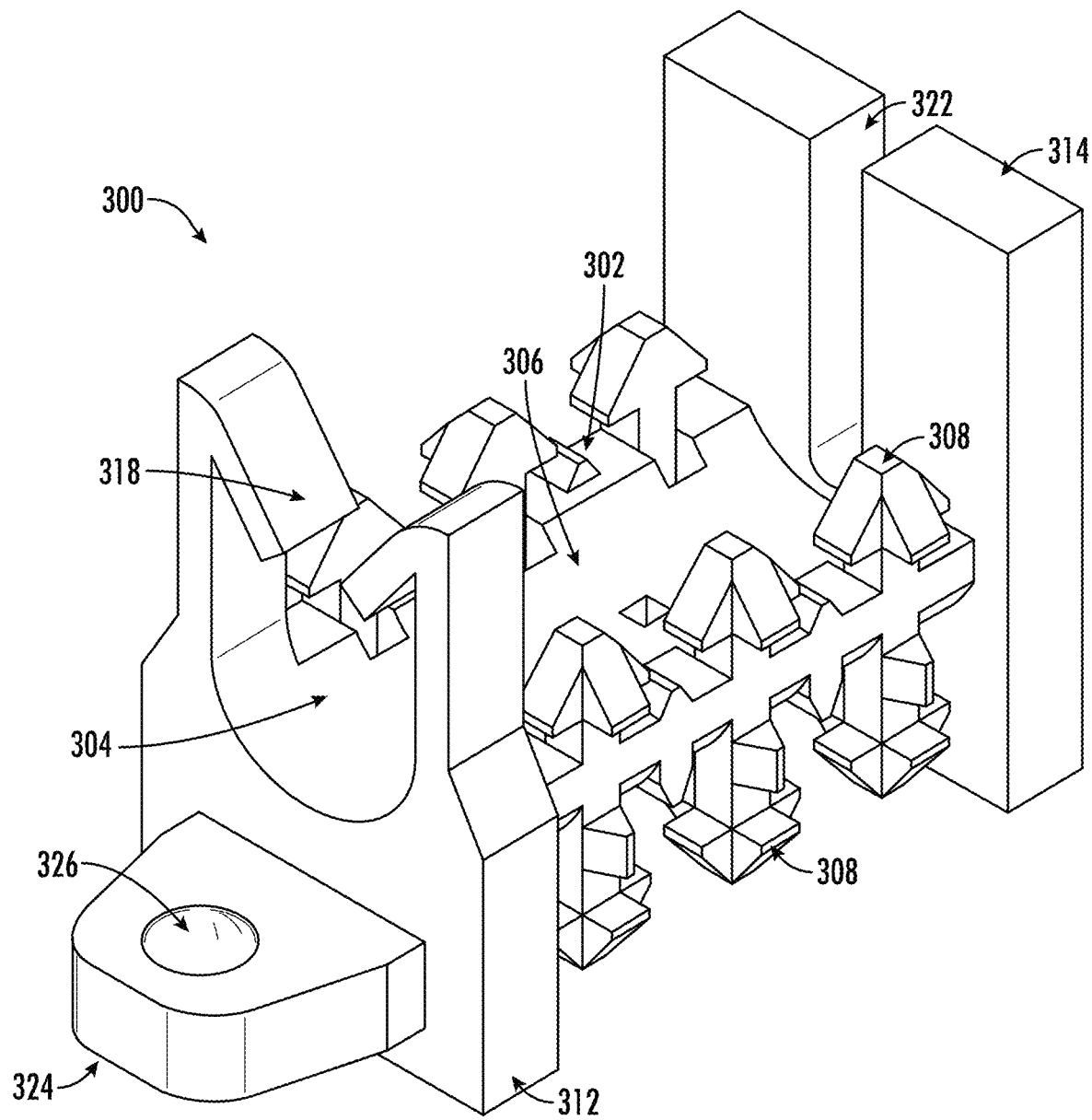
FIG. 45 illustrates a perspective view of a fourth example strain relief according to an example embodiment.
Figure 47:
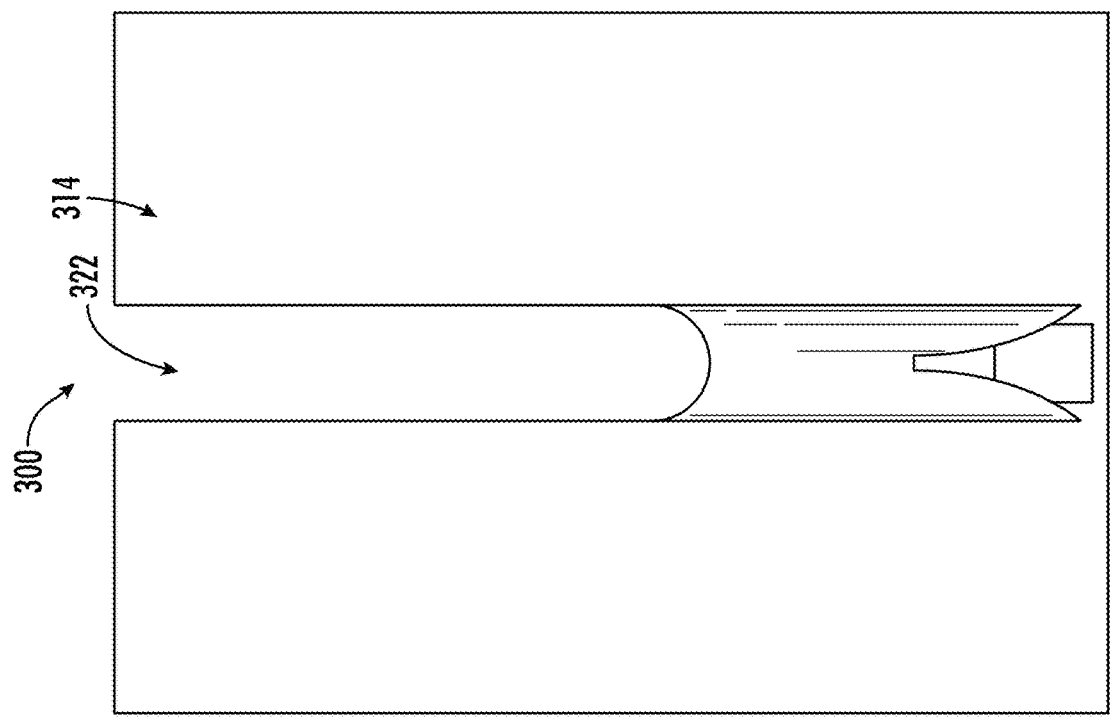
FIG. 47 illustrates an example rear view of the strain relief of FIG. 45 according to an example embodiment.
Figure 46:
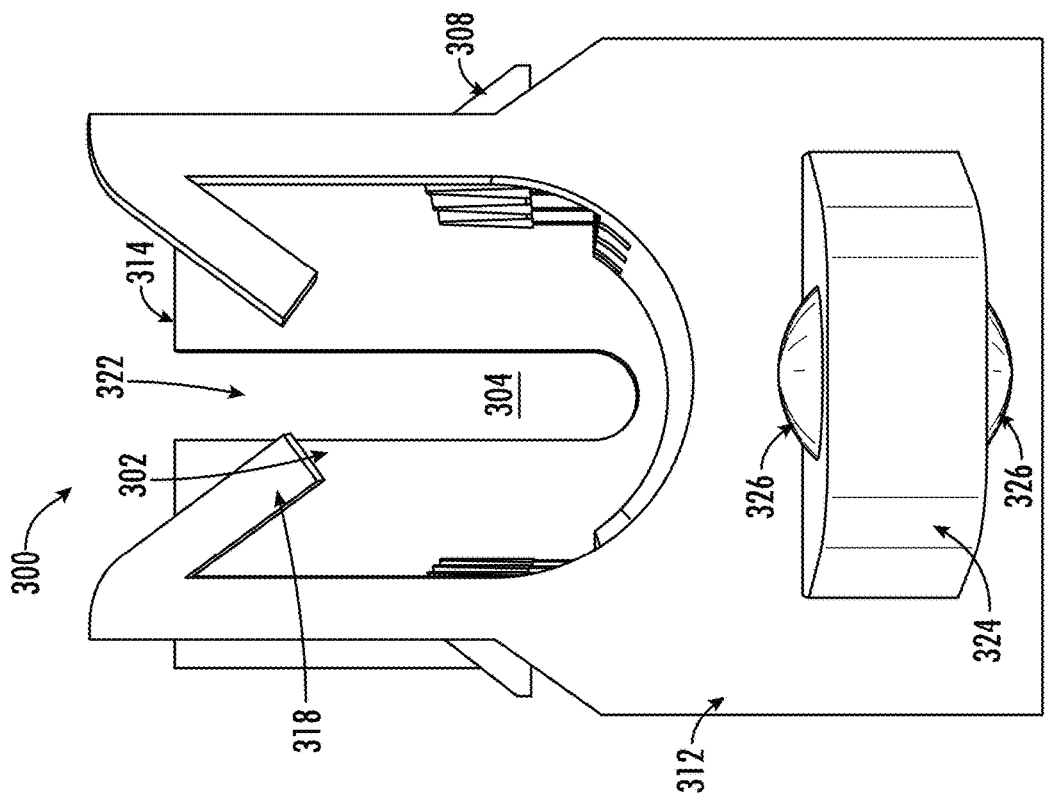
FIG. 46 illustrates an example front view of the strain relief of FIG. 45 according to an example embodiment.
Figure 50:
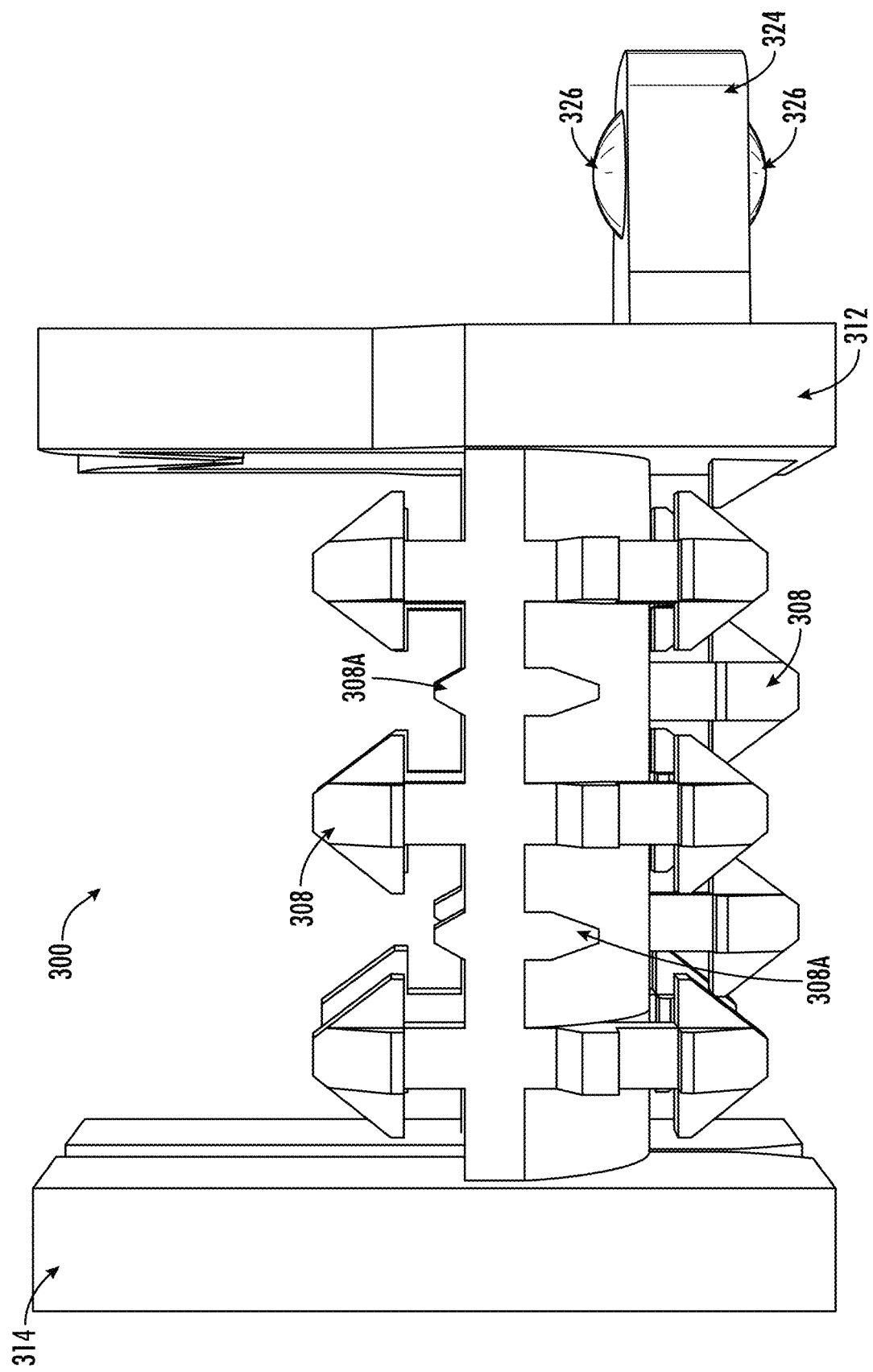
FIG. 50 illustrates an example side view of the strain relief of FIG. 45 according to an example embodiment.
Figure 51:
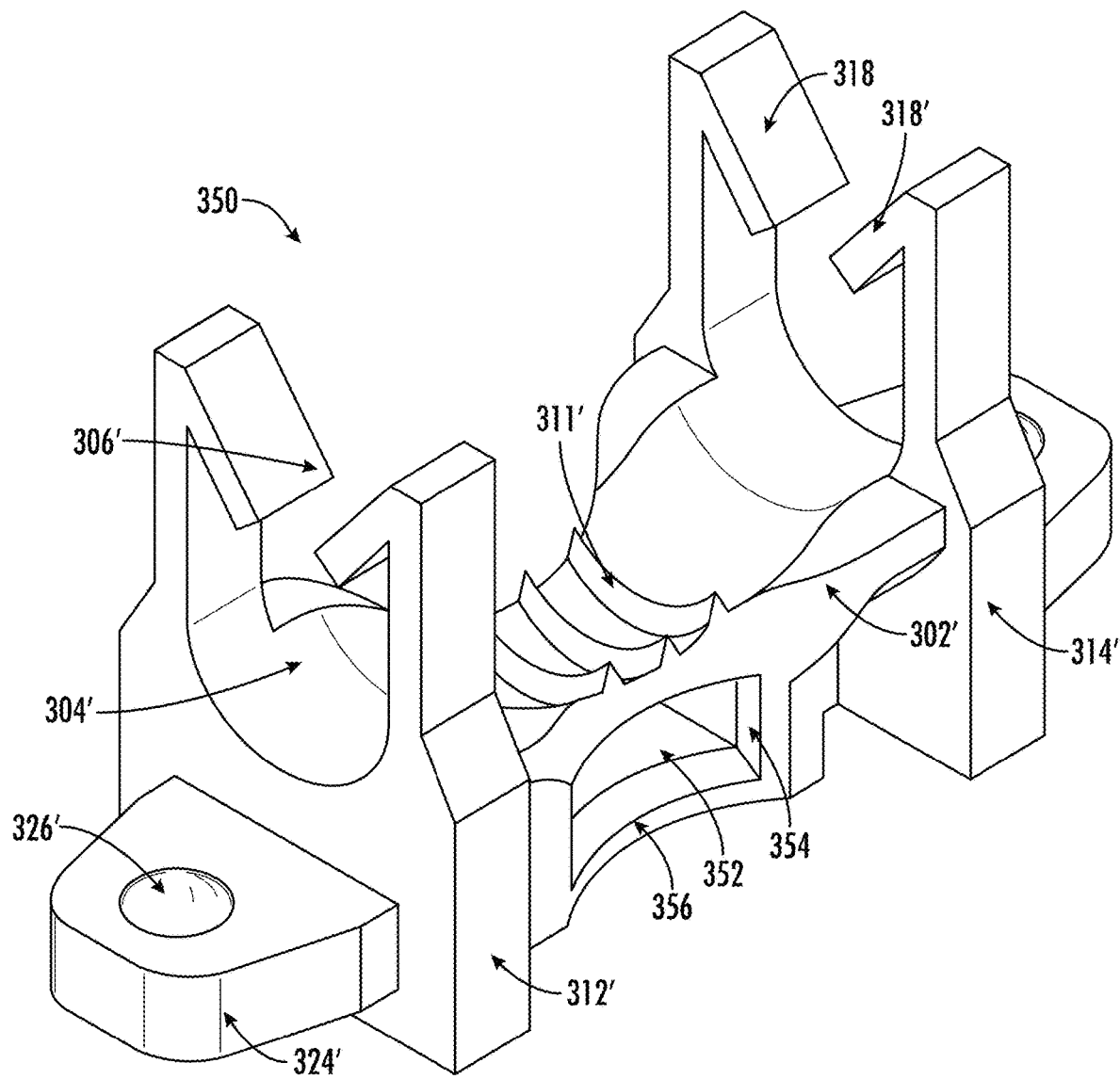
FIG. 51 illustrates a perspective view of a third example strain relief according to an example embodiment.
Figure 52:
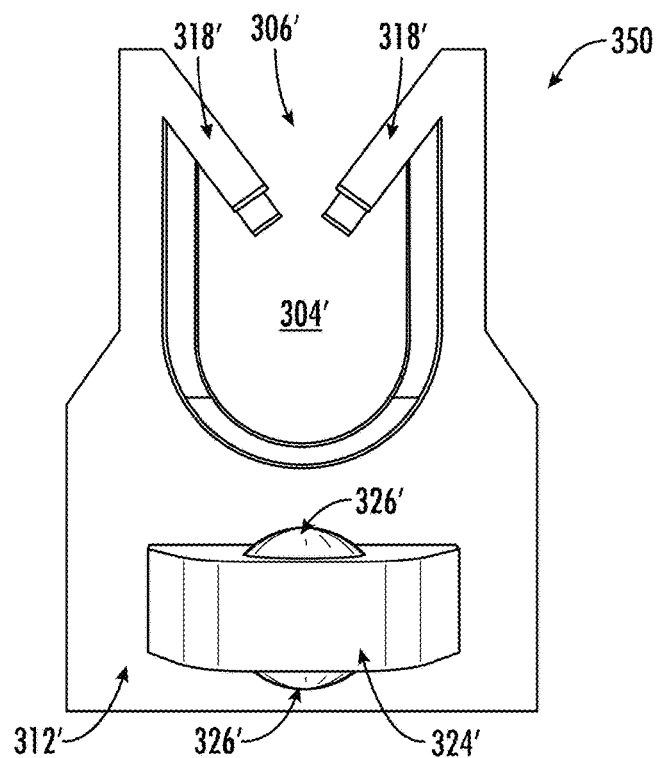
FIG. 52 illustrates an example front view of the strain relief of FIG. 51 according to an example embodiment.
Figure 53:
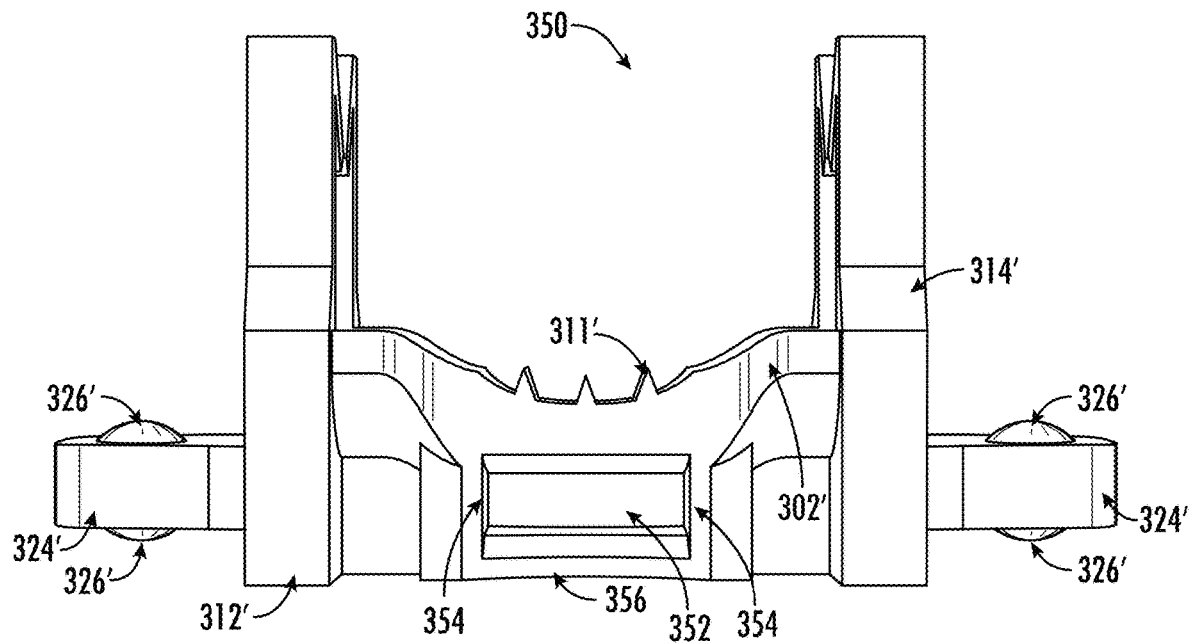
FIG. 53 illustrates an example side view of the strain relief of FIG. 51 according to an example embodiment.
Figure 54:
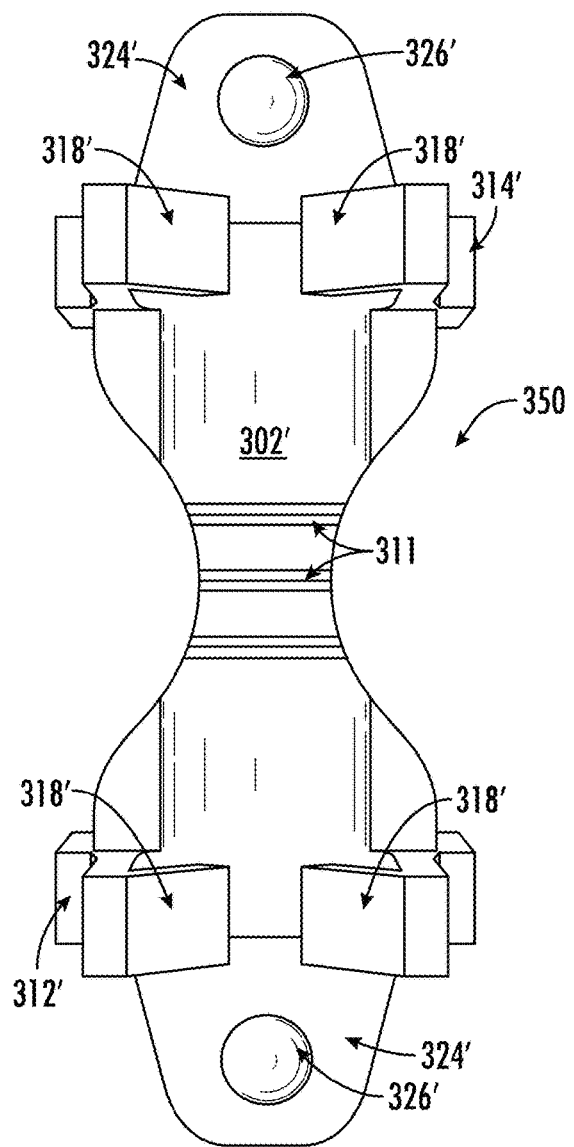
FIG. 54 illustrates an example top view of the strain relief of FIG. 51 according to an example embodiment.
Figure 55:
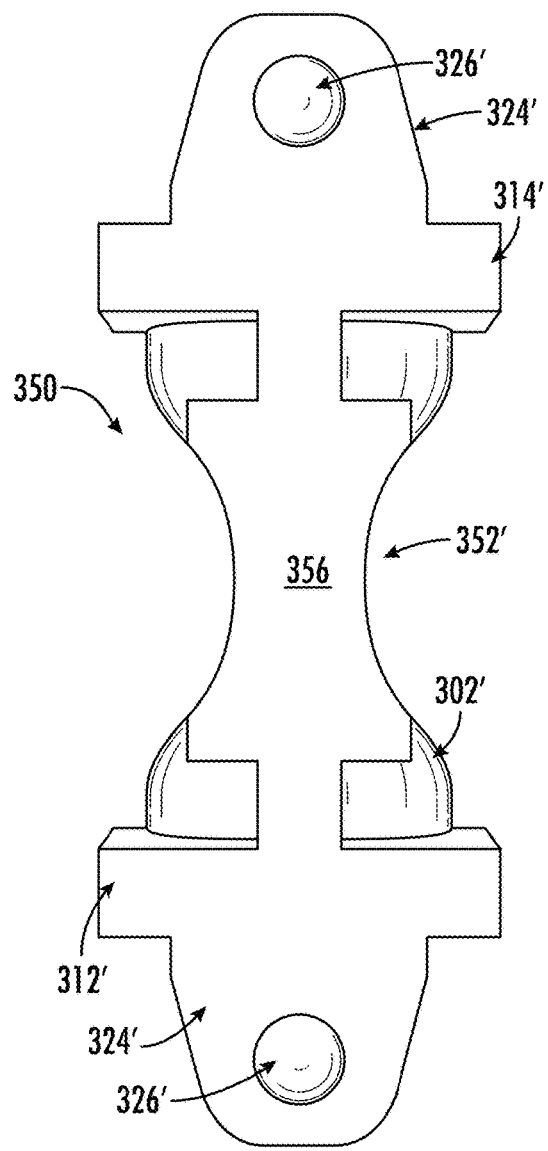
FIG. 55 illustrates an example bottom view of the strain relief of FIG. 51 according to an example embodiment.
Figure 56:
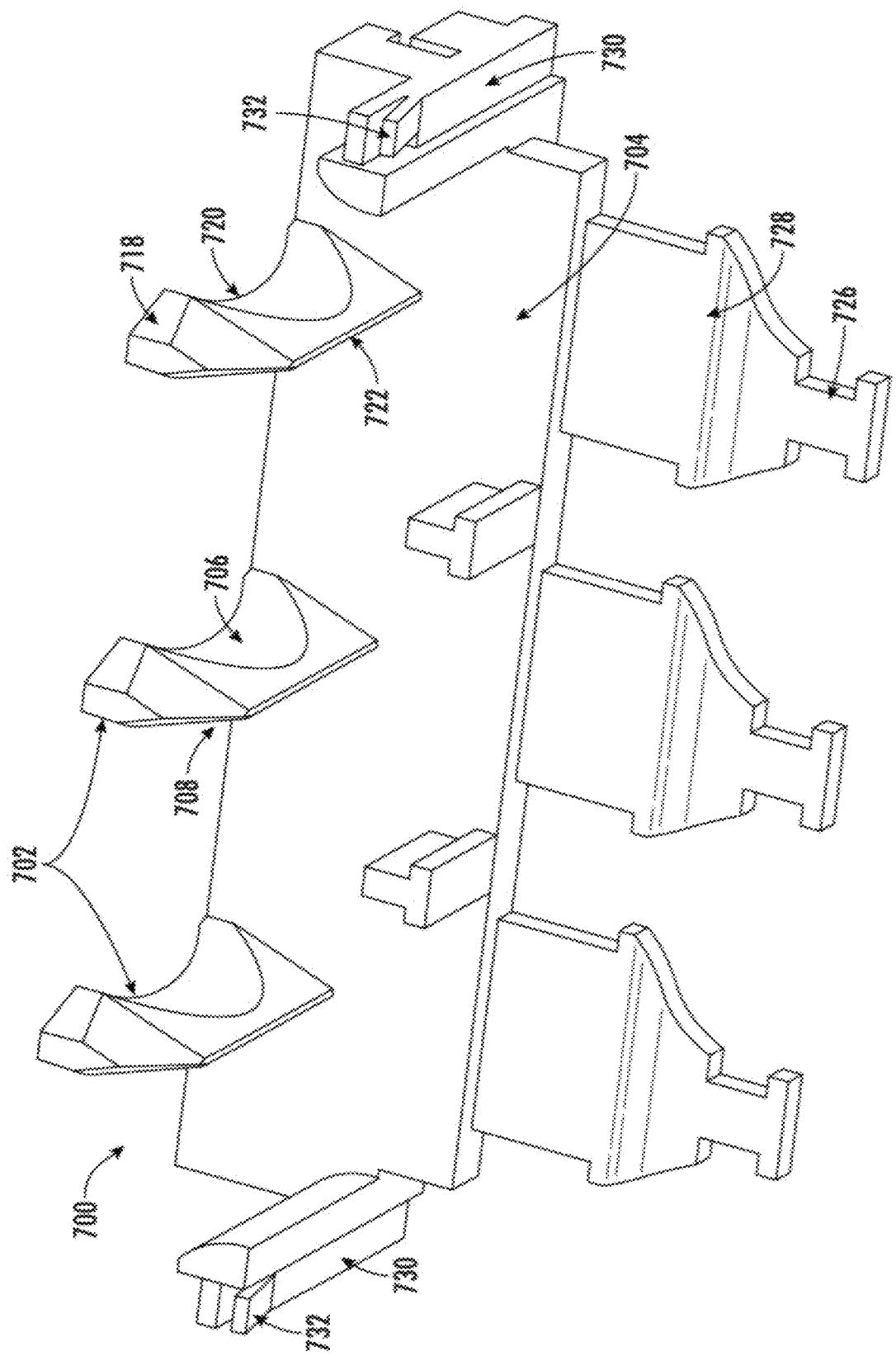
FIG. 56 illustrates a perspective view of an example cable bundle strain relief according to an example embodiment.

In an example embodiment, such as the strain relief 300 shown in FIG. 30, the strain relief 300 may include one or more cable guides 318. The cable guides 318 may be disposed in the cable slot 306 and configured to receive the cable in a first direction, e.g. into the cable passthrough 304, and resist the cable in a second direction, e.g. out of the cable passthrough 304. In an example embodiment, the cable guides 318 may include one or more protrusions extending from the first end plate 312, the second end plate 314, or the sidewall 302 into the cable slot 306. In some example embodiments, the cable guides 318 may be angled inward toward the cable passthrough 304.

Figure 24:
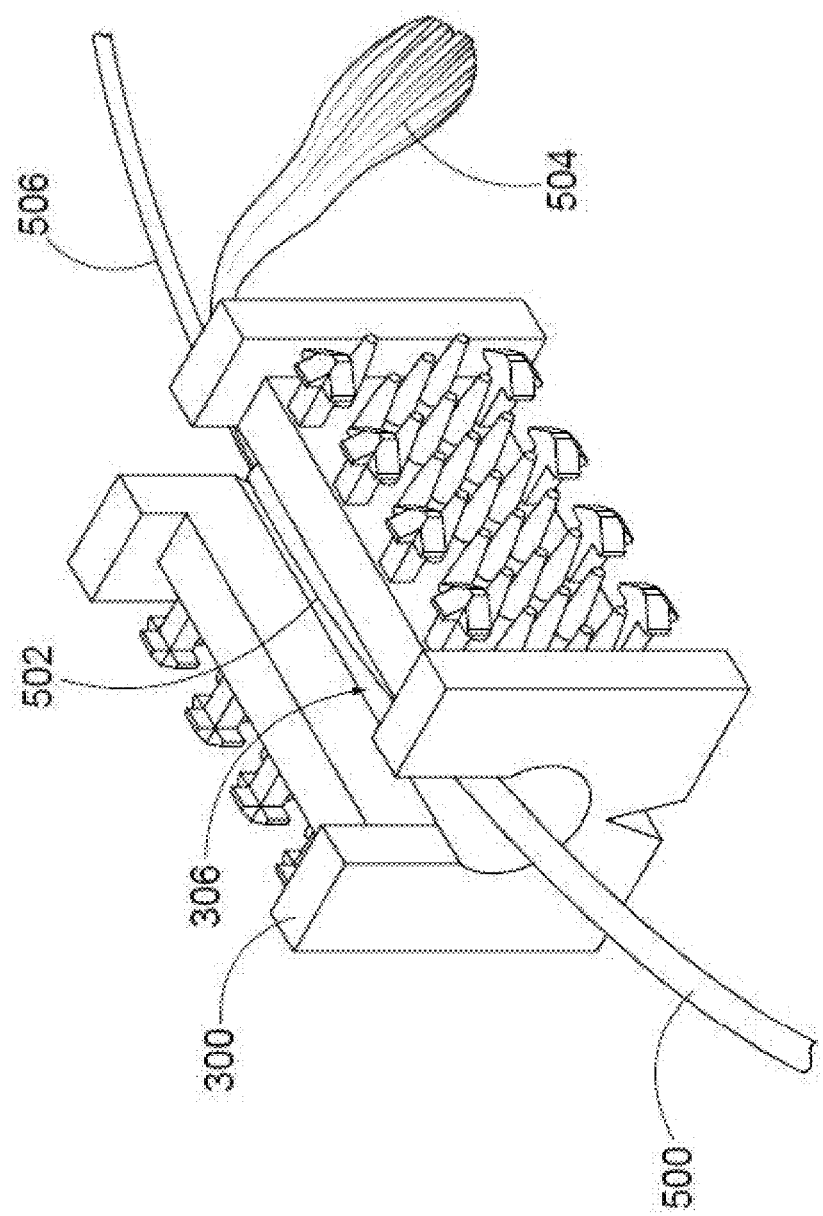
Figure 26:
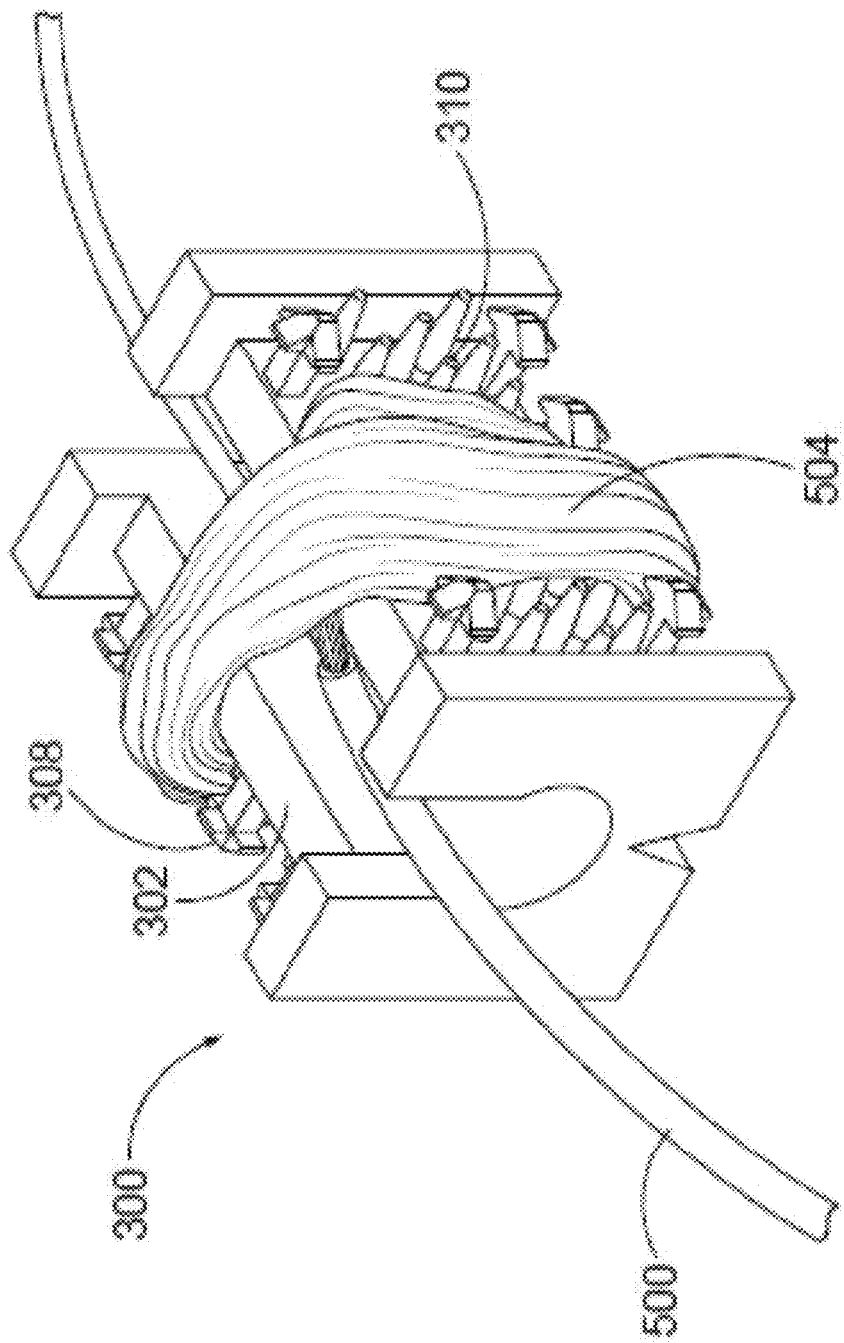

FIGS. 24-26 illustrate an example method of installing a strain relief 300 on to a fiber optic cable 500 according to an example embodiment. A technician may remove a cable jacket 502 from a portion of the fiber optic cable 500, thereby exposing the strength member 504 and the optical fiber 506. As shown in FIG. 24, the fiber optic cable 500 is inserted into the strain relief 300 through the cable slot 306. The end of the cable jacket 502 may be positioned at or near the end of the strain relief 300, as shown in FIG. 25A, or may be positioned substantially centered in the strain relief 300, as shown in FIG. 25B. In the embodiment, depicted in FIG. 25A the strength member 504 is passed through the notch 316 from the interior of the sidewall 302 to the exterior of the sidewall 302, where it may then be wrapped around the body 301 of the strain relief 300. In the embodiment shown in FIG. 25B the strength member 504 is passed through the cable slot 306 at a central position of the strain relief 300 from the interior of the sidewall 302 to an exterior of the sidewall 302, where it may then be wrapped around the body 301 of the strain relief 300. As shown in FIG. 26, the strength member 504 is wrapped around the body 301 of the strain relief 300 one or more times, until a terminal end of the strength member 504 is reached. Individual fibers of the strength member 504 are laced between the hooks 308 and pins 310 by the force of wrapping the strength member 504 around the body 301. The lacing of fiber of the strength member 504 between the hooks 308 and pins 310 causes the strength member 504 to be connected to the hooks 308 and pins 310 in a manner similar to a hook and loop fastener, thereby causing a resistance to movement of the strength member 504 about the body 301. Additionally, the outer wrappings of the strength member 504 apply a pressure to inner wrappings of the strength member 504 that further resist movement of the strength member 504 relative to the body 301. The strain relief 300 may be inserted into a strain relief receptacle 404, as discussed above in reference to FIG. 28. Since the strength member 504 is connected to the strain relief 300, axial torsion applied to the fiber optic cable 500 is transferred to the strength members 504 and to the strain relief 300, thereby limiting or eliminating axial torsion experienced by the optical fiber 506.

FIGS. 30-34 illustrate various views of an example strain relief 300 according to an example embodiment. The depicted strain relief 300 includes an arced sidewall 302, with a substantially rectangular first end plate 312 and second end plate 314. Two sets of three hooks 308 are disposed on an upper side of an exterior surface of the sidewall 302 adjacent to a cable slot 306. Each of the hooks 308 includes three barbs 309 arranged in a cross pattern with one barb 309 extending perpendicularly to two opposing barbs 309. Pins 310 are disposed on a lower side of the exterior surface of the sidewall 302. The strain relief 300 also included two sets of cable guides 318 disposed at each end of the cable slot 306 on the first end plate 312 and second end plate 314. Each of the cable guides 318 is curved inward toward the cable passthrough 304. The strain relief 300 also includes a V-shaped notch 316 disposed in the first end plate 312 and second end plate 314 on an edge opposite the cable slot 306.

FIGS. 35-39 illustrate various view of a second example strain relief 300 according to an example embodiment. The depicted strain relief 300 includes an arced sidewall 302, with a substantially rectangular first end plate 312 and second end plate 314. Two sets of three hooks 308 are disposed on an upper side of an exterior surface of the sidewall 302 adjacent to a cable slot 306. A second group of two sets of three hooks 308 are disposed on a lower side of an exterior surface of the sidewall 302 substantially opposite the first groups of hooks 308. Each of the hooks 308 includes three barbs 309 arranged in a cross pattern with one barb 309 extending perpendicularly to two opposing barbs 309. Pins 310 are disposed on a lower side of the exterior surface of the sidewall 302. The strain relief 300 also included two sets of cable guides 318 disposed at each end of the cable slot 306 on the first end plate 312 and second end plate 314. Each of the cable guides 318 is curved inward toward the cable passthrough 304. The strain relief 300 also includes a V-shaped notch 316 disposed in the first end plate 312 and second end plate 314 on an edge opposite the cable slot 306.

FIGS. 40-44 illustrate various views of a third example strain relief according to an example embodiment. The depicted strain relief 300 includes an arced sidewall 302, with a substantially rectangular first end plate 312 and second end plate 314, having rounded corners on a lower side opposite the cable slot 306. Two sets of three hooks 308 are disposed on an upper side of an exterior surface of the sidewall 302 adjacent to a cable slot 306. A second group of two sets of three hooks 308 are disposed on a lower side of an exterior surface of the sidewall 302 substantially opposite the first groups of hooks 308. A third group of hooks 308 includes two hooks 308 disposed between the second group of hooks 308 disposed on the lower side of the exterior surface of the sidewall 302. Additionally, a small hook 308A including a barb extending directly from the sidewall 302 is disposed between each pair of hooks 308 of the second group of hooks 308. The hooks 308 disposed adjacent to the cable slot 306 include three barbs 309 arranged in a cross pattern with one barb 309 extending perpendicularly to two opposing barbs 309. The hooks 308 disposed on the sidewall 302 opposite the cable slot 306 include four barbs 309 arranged in a cross pattern with two sets of opposing barbs 309 extending perpendicularly to each other. The strain relief 300 also includes two sets of cable guides 318 disposed at each end of the cable slot 306 on the first end plate 312 and second end plate 314. Each of the cable guides 318 is curved inward toward the cable passthrough 304. The strain relief 300 also includes a V-shaped notch 316 disposed in the first end plate 312 and second end plate 314 on an edge opposite the cable slot 306. The strain relief 300 also includes a set of alignment features 320 configured to assist in aligning the fiber optic cable strain relief in a strain relief receptacle 404, when the strain relief 300 is installed therein.

FIGS. 45-50 illustrate various views of a fourth example strain relief according to an example embodiment. The depicted strain relief 300 includes an arced sidewall 302, with a substantially rectangular first end plate 312 and second end plate 314. Two sets of three hooks 308 are disposed on an upper side of an exterior surface of the sidewall 302 adjacent to a cable slot 306. A second group of two sets of three hooks 308 are disposed on a lower side of an exterior surface of the sidewall 302 substantially opposite the first groups of hooks 308. A third group of hooks 308 includes two hooks 308 disposed between the second group of hooks 308 disposed on the lower side of the exterior surface of the sidewall 302. Additionally, a small hook 308A including a barb extending directly from the sidewall 302 is disposed between each pair of hooks 308 of the second group of hooks 308 and the hooks disposed on the upper side of the exterior surface of the sidewall 302. The hooks 308 disposed on the sidewall 302 opposite the cable slot 306 include four barbs 309 arranged in a cross pattern with two sets of opposing barbs 309 extending perpendicularly to each other. The strain relief 300 also includes a set of cable guides 318 disposed at an end of the cable slot 306 on the first end plate 312. Each of the cable guides 318 is curved inward toward the cable passthrough 304. The second end plate 314 includes a fiber slot 322 configured to enable the optical fiber of a fiber optic cable to pass therethrough. The second end plate 314 may serve as a cable stop, limiting the movement of the fiber optic cable through the second end plate 314. The strain relief 300 also includes a V-shaped notch 316 disposed in the second end plate 314 on an edge opposite the cable slot 306. The strain relief 300 also includes a mounting feature 324 disposed on the first end plate 312 and configured to be inserted into a socket 414 (FIGS. 27D and 27E) to retain the strain relief 300 in the strain relief receiver 400". The mounting feature 324 includes a first projection 326 on a top surface of the mounting feature 324 and a second projection 326 on a bottom surface of the mounting feature 324. The projections 326 correspond to detents 414 in the sockets 412, as described above. The strain relief 300 also includes a plurality of friction elements 311, such as bumps or spikes, disposed on the interior surface of the sidewall 302. The friction elements 311 may increase friction between a fiber optic cable and the strain relief 300, which may further resist movement of the fiber optic cable relative to the strain relief 300.

Turning to FIGS. 51-55, a cable tie strain relief 350 may be provided. The cable tie strain relief 350 may be configured to resist movement of a fiber optic cable when a cable tie is wrapped around a body of the cable tie strain relief 350. The cable tie strain relief 350 may share many of the features of the strain reliefs 300, discussed above, and be configured to be received by the strain relief receivers 400, 400', 400". More particularly, the cable tie strain relief 350 may include a body defining a sidewall 302', a cable pass through 304', and a cable slot 306', similar to the strain relief 300 discussed above. The cable tie strain relief 350 may also include a first end plate 312' and a second end plate 314', as well as a set of cable guides 318 disposed thereon. In some example embodiments, the cable tie strain relief may include friction elements 311', including without limitation bumps, ridges, spikes, or the like disposed on the interior surface of the sidewall 302'. The friction elements 311' may increase friction between a fiber optic cable and the cable tie strain relief 350, which may further resist movement of the fiber optic cable relative to the cable strain relief 350. The cable tie strain relief 350 also includes a mounting feature 324' disposed on the first end plate 312' and a second mounting feature 324' disposed on the second end plate 314'. The mounting features 324' are configured to be inserted into a socket 414 (FIGS. 27D and 27E) to retain the strain relief 350 in the strain relief receiver 400". The mounting features 324' includes a first projection 326' on a top surface of the mounting feature 324' and a second projection 326' on a bottom surface of the mounting feature 324'. The projections 326' correspond to detents 414 in the sockets 412, as described above.

The sidewall 302' of the cable tie strain relief 350 have a smaller width at or near the center of the body, and/or the sidewall 302' may not wrap as far around the cable pass through 304', as compared to the strain reliefs 300. The smaller geometry of the sidewall 302' may reduce or eliminate gaps formed between the cable tie and one of the fiber optic cable or the cable tie strain relief 350.

The cable tie strain relief 350 may include a cable tie feature 352 disposed on an exterior surface of the sidewall 302'. The cable tie feature 352 may be configured to resist movement of the fiber optic cable relative to the cable tie strain relief 350, which may enable the cable tie strain relief 350 to be attached outside of the fiber optic assembly 100 and subsequently mounted in a strain relief receiver 400, 400', 400". In an example embodiment, the cable tie feature 352 may include a plurality of raised portions 354 extending from the exterior surface of the sidewall 302'. The raised portions 354 may have guide surfaces that are substantially planar configured to resist movement of the cable tie relative to the body of the strain relief 350. The guide surfaces may extend generally perpendicular to the sidewall 302. In an example embodiment, the cable tie feature 352 includes two raised portions 354, each including a guide surface forming a cable tie channel therebetween. In some example embodiments, the cable tie feature 352 may also include a bridge portions 256 disposed between adjacent raised portions 354 forming a cable tie aperture. Although a cable tie is discussed in reference to the cable tie strain relief, other banding may also be utilized, such as twist ties, loop and hook fastener straps, or other suitable banding.

Figure 59:
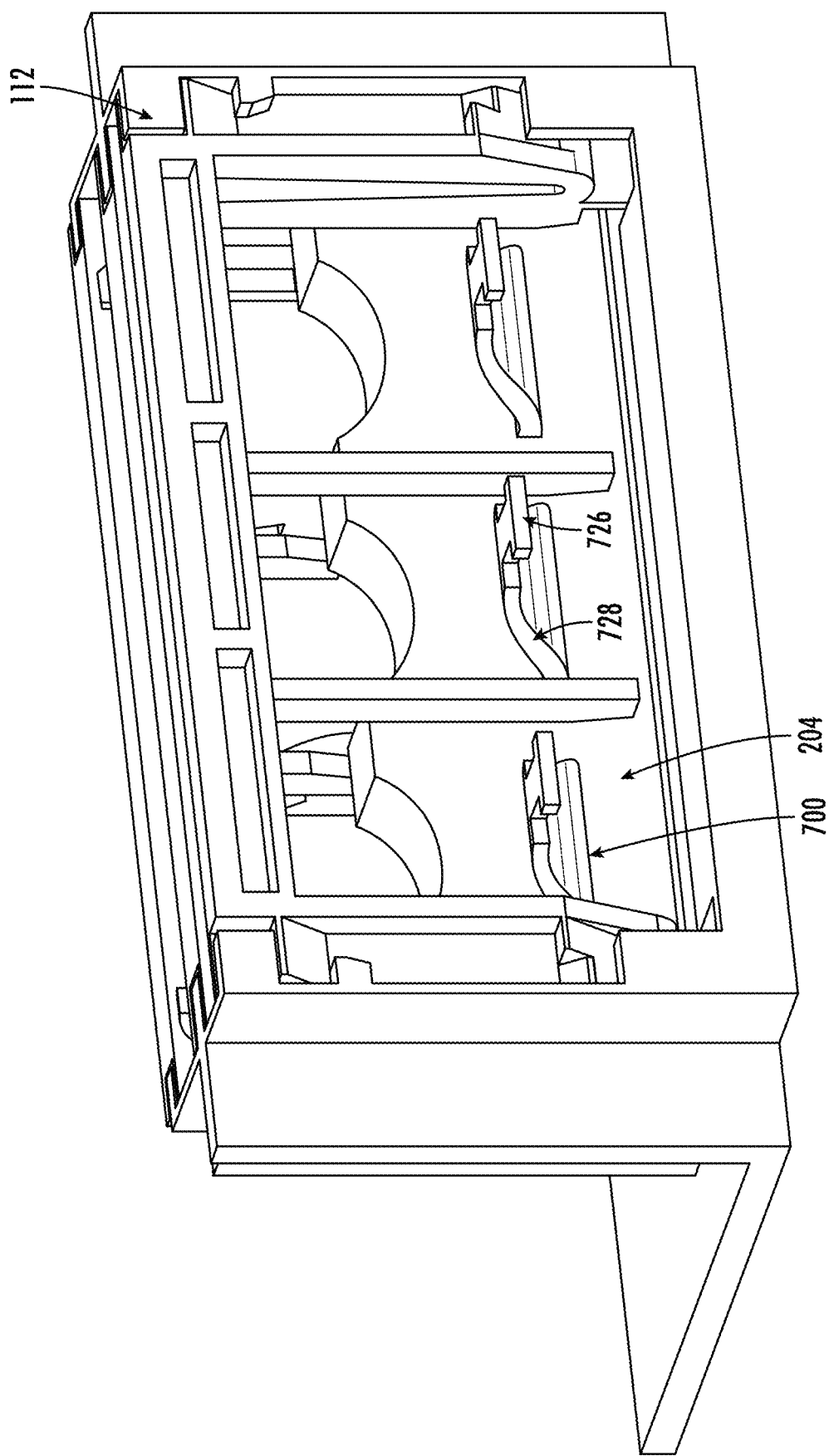
FIG. 59 illustrates a perspective view of the cable strain relief of FIG. 57 installed in a cable port according to an example embodiment.
Figure 60:
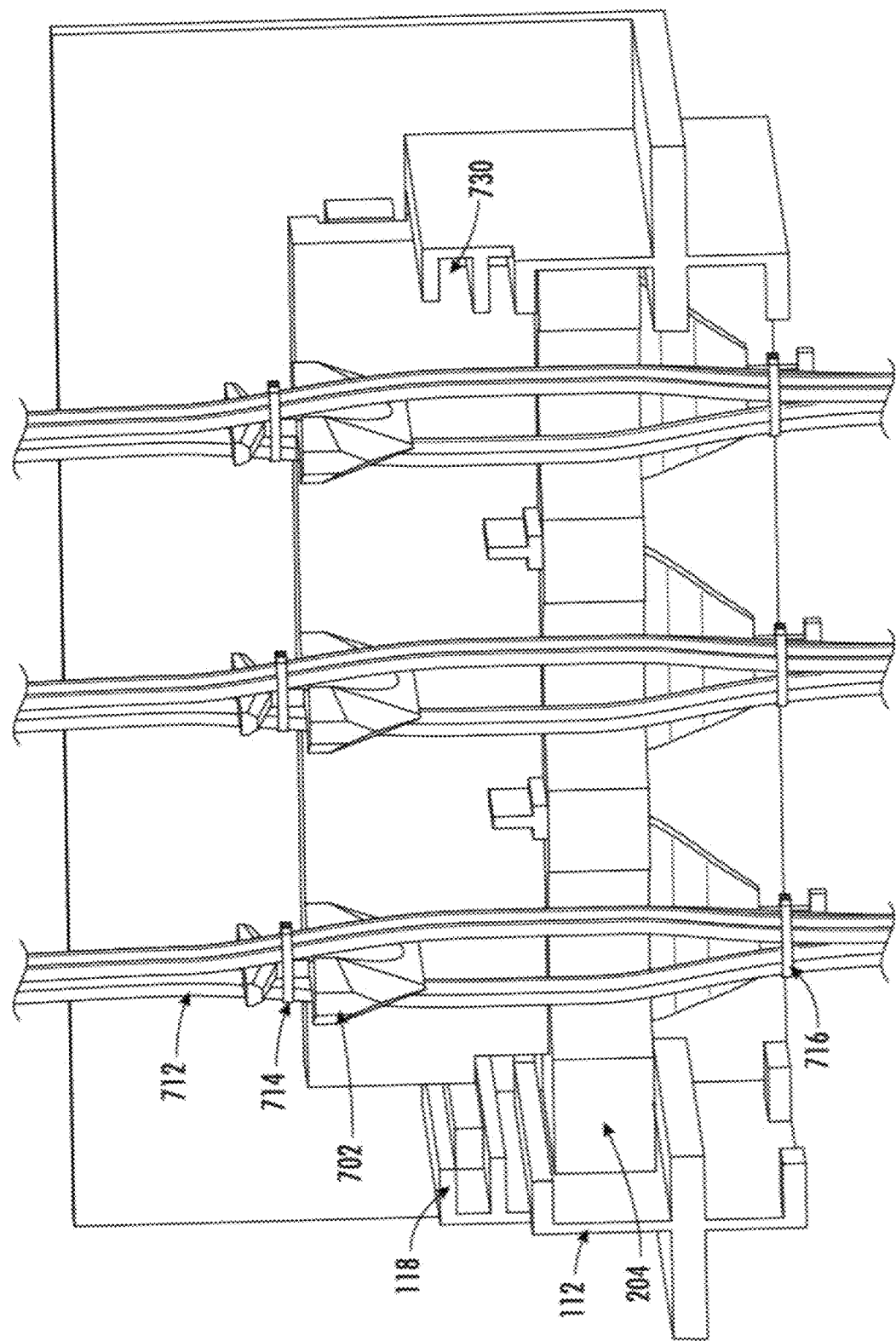
FIG. 60 illustrates a top view of the cable bundle strain relief and cable port of FIG. 59 according to an example embodiment.

Turning to FIGS. 56-60, a cable bundle strain relief 700 is provided. The cable bundle strain relief 700 may be configured to limit or prevent axial torsion of a plurality of fiber optic cables passing through a cable port 112. The cable bundle strain relief 700 may include one or more restraint projections 702 extending from a base 704. The restraint projections 702 may extend generally perpendicular to the base 704. As depicted in FIG. 60, a plurality of fiber optic cables, e.g. a cable bundle 712, may be banded at least a first location 714 and a second location 716, such as with cable ties, twist ties, hook and loop fastener straps, rubber bands, or other suitable banding. The cable bundle 712 may then be positioned on the cable bundle strain relief 700 between the first location 714 and the second location 716, such that a first portion of the plurality of cables is positioned at a first face 706 of the restraint projection 702 and a second portion of the plurality of cables is positioned at a second face 708 of the restraint projection 702. In other words, the restraint projection 702 is passed through a middle of the cable bundle 712 between the first band location 714 and the second band location 716. Axial torsion is limited by the interaction of the banded locations 714, 716 of the cable bundle 712 and the restraint projections 702. As the first location 714, or the second location 716, of the cable bundle 712 is pulled toward the toward the restraint projection 702, the first and second portions of the cable bundle will become increasingly constricted against the restraint projection 702, thereby limiting further movement of the cable bundle 712 relative to the cable bundle strain relief 700.

The restraint projection 702 may include a distal end 718 opposite the base 704. In some embodiments, the distal end 718 of the restraint projection 702 may be tapered or angled to reduce resistance to positioning the cable bundle 712 onto the restraint projection 702. The tapered distal end 718 may act similar to a wedge dividing the cable bundle 712 as the cable bundle is positioned on the restraint projection 702.

Figure 57:
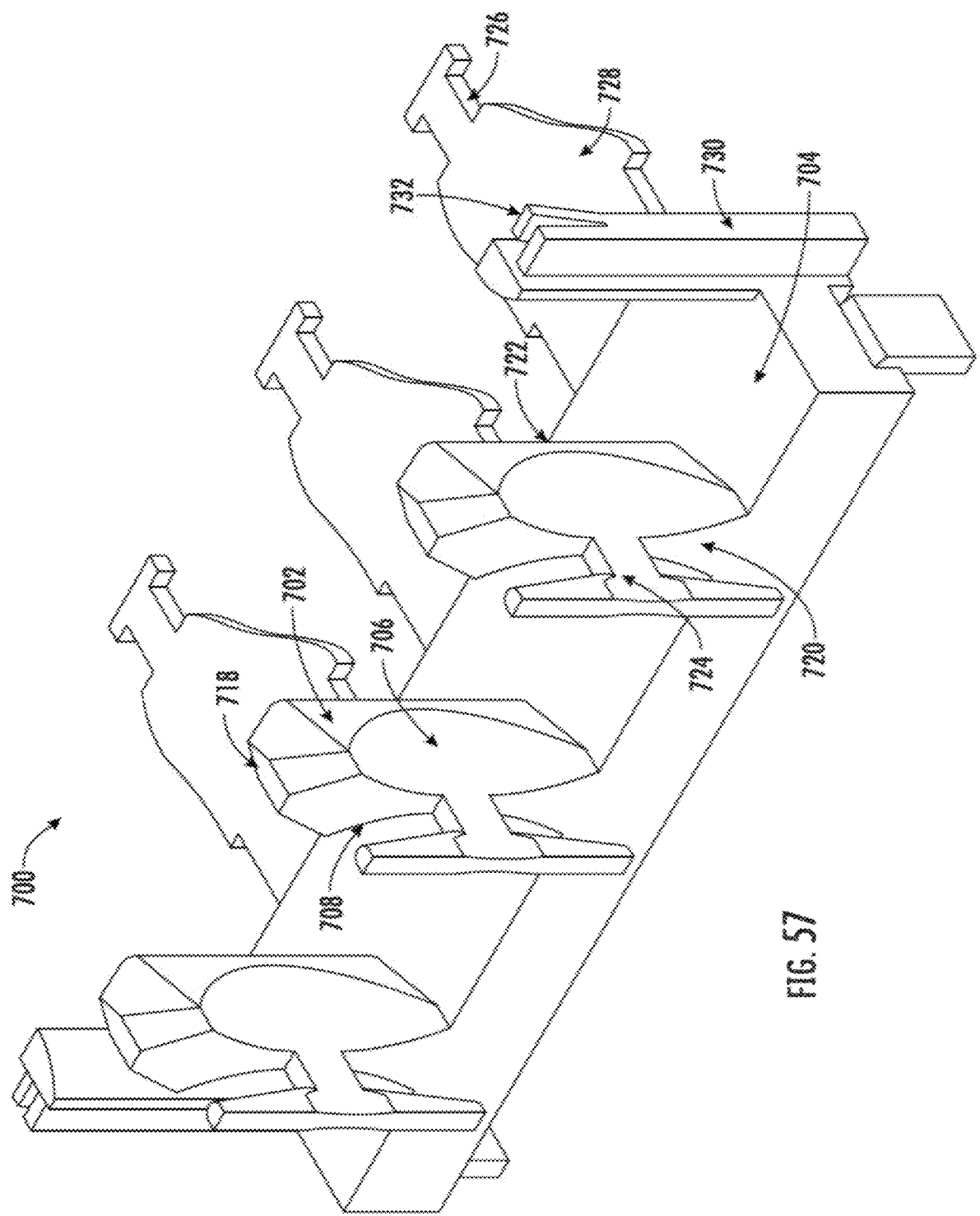
FIG. 57 illustrates a perspective view of a second example cable bundle strain relief according to an example embodiment.
Figure 58:
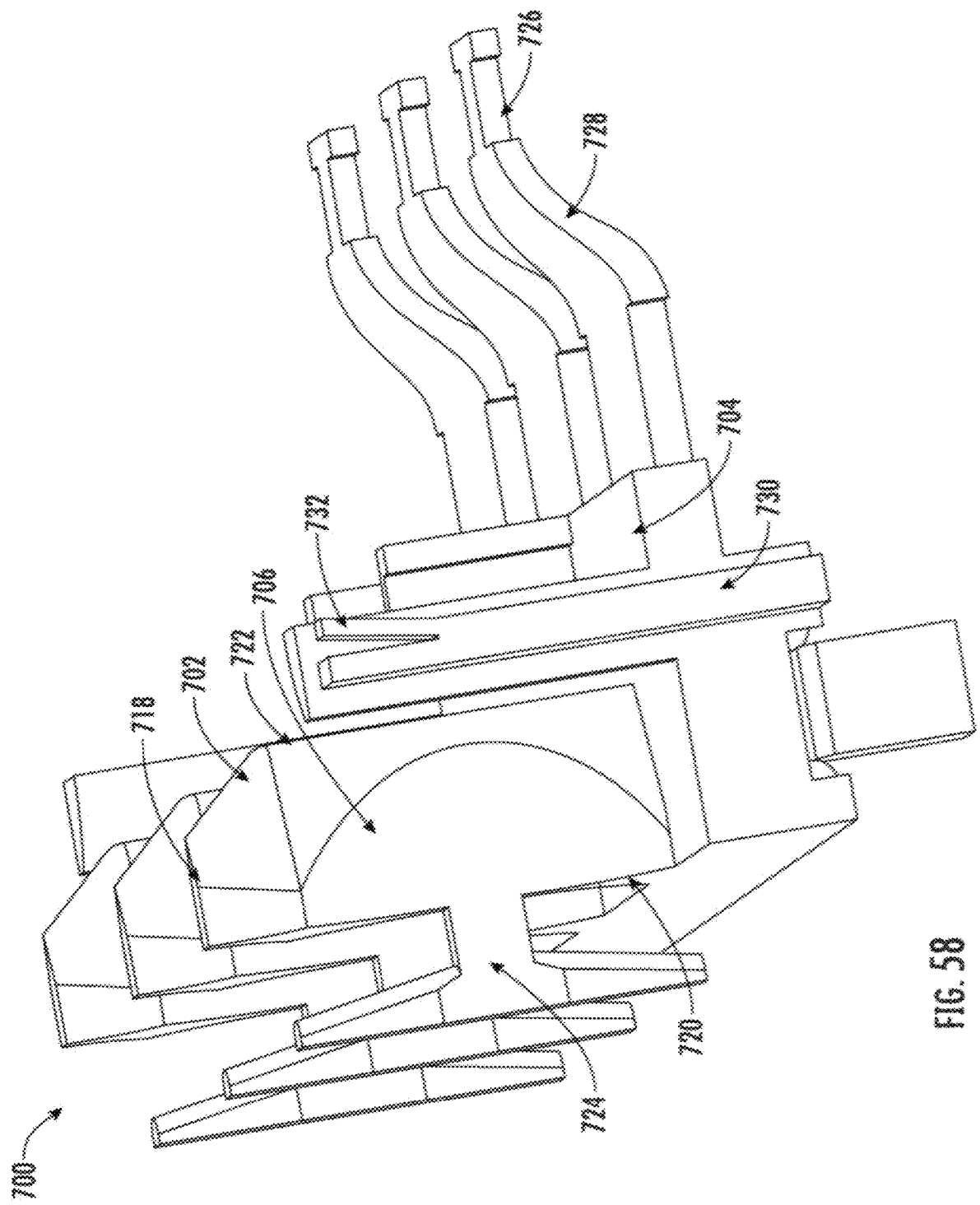
FIG. 58 illustrates a side view of the cable bundle strain relief of FIG. 57 according to an example embodiment.

In an example embodiment, the cable bands at the first location 714 and second location 716 may be disposed adjacent to the restraint projection 702. In some example embodiments, the cable bundle strain relief 700 may include one or more band projections configured to restrain a cable band at the first location 714 or a cable band at the second location 716 from moving relative to the restraint projection 702. The restraint projection 702 may include a leading edge 720 facing the internal volume of the fiber optic assembly 100 and a trailing edge 722 facing the housing of the fiber optic assembly 100. A band projection 724 may disposed at the leading edge 720 of the restraint projection 702. FIG. 57 depicts an example embodiment of a cable bundle strain relief 700 in which the band projection disposed at the leading edge 720 of the restraint projection is generally T-shaped. A band may be affixed about the cable bundle 712 and the band projection, such as after positioning the cable bundle 712 on the restraint projection 702. In some example embodiments, a band projection may also be disposed at the trailing edge 722 of the restraint projection 702. Additionally or alternatively, a band projection 726 may be disposed separate from, but proximate to, the trailing edge 722 of the restraint projection 702. In the embodiments, depicted in FIGS. 56-60, the cable bundle strain relief 700 includes an arm 728 extending from the base 704. The band projection 726 proximate to the trailing edge 722 is disposed at a distal end of the arm 728. The arm 728 may be configured to pass through the cable port 112, such that the band at the second location 714 is disposed outside of the fiber optic assembly 100. More particularly, the arm 728 may be configured to pass through a sealing component 204 disposed in the cable port 112, as depicted in FIGS. 59 and 60. As such, the sealing component 204 may include an aperture to enable passage of the arm 728 therethrough. The band projection 726 may have a generally T-shape configured to limit movement of the band relative to the restraint projection 702.

Similar to the strain relief receivers 400, 400', 400", the cable bundle strain relief 700 may include one or more guide features 730 configured to engage one or more guide features 118 disposed on the cable port 112 or housing of the fiber optic assembly. For example, the guide features 730, 118 may include channels and/or rails that are complementary, as depicted in FIG. 60. As such, the cable bundle strain relief 700 may be selectively installed and removed from the cable port 112 and/or the fiber optic assembly 100. In some embodiments, the cable bundle strain relief 700 may include one or more restraint features 732, such as tabs, protrusions, or detents, configured to resist movement of the cable bundle strain relief 700 out of, or away from, the cable port 112. For example, the restraint features 732 may be disposed on or proximate to the guide features 730, 118, such that when the guide features 730 of the cable bundle strain relief 700 engage the guide features 118 of the cable port 112, the restraint features 732 resist removal thereof.

Although embodiments discussed above are merely for illustrative purposes. One of ordinary skill would immediately appreciate that the features of any of the cable port seals and/or strain reliefs provided may be intermixed or omitted based on the application.

The cable strain reliefs, as described above, provide easy methods of attachment and retention of a fiber optic cable providing superior axial torsion strain relief with no tools. Further, the strain reliefs do not require the fiber optic cable to pass through any closed loop geometry. In one example strain relief, the strength member of the fiber optic cable, e.g. aramid yarn, is wrapped about the body of the strain relief and held in position by a plurality of hooks in a manner similar to a hook and loop fastener, e.g. Velcro. In a second example strain relief, the strain relief is attached to the fiber optic cable by a cable tie. The fiber optic cable may be installed into either the first or second type of strain relief with the strain relief outside of the fiber optic assembly and then installed into a strain relief receiver. The cable strain reliefs provide a one part solution with no additional or movable parts. As such, the cable strain relief requires significantly less manual dexterity than conventional methods, which may dramatically reduce installation complexity and time. Additionally, the diameter of the cable pass through is not significant to the operation of the cable strain relief, enabling a large range of cables diameters and types to utilize the strain relief.

With regard to the cable bundle strain relief, the cable bundle bands may be applied inside or external to the fiber optic assembly and simply positioned onto the restraint projection. The axial torsion is dispersed among the cables as the cables are moved toward the restraint projection, thereby limiting movement of the cable bundle relative to the cable bundle strain relief. The cable bundle strain relief provides a one part solution with no additional or movable parts. As such, the cable bundle strain relief requires significantly less manual dexterity than conventional methods, which may dramatically reduce installation complexity and time. Additionally, the strain relief does not include a cable pass through with an associated diameter, enabling a large range of cables diameters and types to utilize the cable bundle strain relief.

In an example embodiment, a fiber optic assembly is provided including a housing, a cable port configured for one or more fiber optic cables to pass from an exterior of the housing to an interior of the housing, and a cable port seal disposed in the cable port. The cable port seal includes a first sealing component formed of a deformable material, a first compression element and a second compression element configured to compress the first sealing component in a first direction, a second sealing component formed of the deformable material, and a cap configured to compress the first sealing component and the second sealing component in a second direction, the second direction being perpendicular to the first direction. The compression in the first direction and the compression in the second direction provides an environmental seal around a fiber optic cable, when the fiber optic cable is installed between the first sealing component and the second sealing component. In some example embodiments, the first compression element and the second compression element include one or more cable guide apertures. In an example embodiment, each of the one or more cable guide apertures include an opening configured to receive the cable in a first direction and resist removal of the cable in a second direction. In some example embodiments, the first compression element and the second compression element each include a locking feature configured to engage a corresponding capture feature disposed in the cable port, such that the capture feature resists movement of the first compression element and the second compression element out of the fiber optic port. In an example embodiment, the first compression element includes a first sidewall and the second compression element includes a second sidewall. Deflection of the first sidewall and the second sidewall toward each other causes the locking feature to disengage the capture feature. In some example embodiments, the cable port includes a U-shaped channel configured to receive the cable port seal. In an example embodiment, the capture feature is disposed in the U-shaped channel. In some example embodiments, the first compression element is substantially the same as the second compression element. In an example embodiment, the first compression element and the second compression element include corresponding connection features configured to couple the first compression element to the second compression element. In some example embodiments, the first sealing component includes a pocket aperture configured to receive the corresponding connector features therethrough. In an example embodiment, the first compression element and the second compression element each include a sidewall configured to compress the first sealing component in the first direction, a connection feature configured to couple the first compression element to the second compression element, and a pivot disposed between the sidewall and the connection feature. The pivot enables deflection of the sidewall. In some example embodiments, the sidewalls of the first compression element and the second compression element have a V-shaped geometry when coupled to each other. In an example embodiment, the cable port seal further includes a third sealing component formed of a deformable material and a third compression element and a fourth compression element configured to compress the third sealing component in the first direction. The cap is further configured to compress the first sealing component against the sealing component in a second direction, and the compression in the first direction and the compression in the second direction provides an environmental seal around a second fiber optic cable, when the second fiber optic cable is installed between the first sealing component and the third sealing component.

In an example embodiment, a fiber optic assembly is provided including a housing having an internal volume and a cable strain relief comprising a body defining 1) a sidewall, 2) a cable passthrough disposed in the body from a first end to a second end, and 3) a cable slot disposed through the sidewall enabling a fiber optic cable to be inserted into the cable passthrough therethrough. The strain relief may also include a plurality of hooks disposed on an exterior surface of the sidewall. The plurality of hooks are configured to resist movement of a strength member of the fiber optic cable, when the strength member is wrapped around the body. The fiber optic housing may also include a strain relief receiver configured to retain the cable strain relief in a mounted position in the fiber optic housing, when the cable strain relief is installed therein. In some example embodiments, the cable strain relief also includes a first end plate disposed at the first end of the body and a second end plate disposed at the second end of the body. The first end plate and second end plate are configured to be received by the strain relief receiver. In an example embodiment, a notch is disposed in an edge of the first end plate or second end plate. The notch enables the strength member to transition from an interior of the sidewall to the exterior of the sidewall. In some example embodiments, the notch is substantially V-shaped. In an example embodiment, the cable strain relief also includes a plurality of pins extending from the sidewall. The pins resist movement of the strength member toward either the first end or the second end. In some example embodiments, the cable strain relief further includes a cable retention member configured to resist movement of the fiber optic cable out of the cable slot. In an example embodiment, the sidewall is arc shaped. In some example embodiments, the sidewall is rectangular shaped. In an example embodiment, one or more of the plurality of hooks include a projection coupled to the sidewall at a first projection end and one or more barbs extending radially from the projection at a second projection end. In an example embodiment, the one or more barbs form a crossed pattern including at least one barb disposed substantially perpendicular to two opposing barbs. In some example embodiments, the strength member includes an aramid yarn layer of the fiber optic cable.

In some example embodiments, a cable seal and strain relief system is provided including both the cable strain relief and the cable port seal described above with the fiber optic housing. Additionally or alternatively, the cable strain relief and/or cable port seal, as described above, may be provided separately from each other and/or the fiber optic housing.

In another example embodiment, a fiber optic assembly is provided including a housing having an exterior and an internal volume, a cable port configured for a plurality of fiber optic cables to pass from the exterior of the housing to the internal volume of the housing, and a cable strain relief. The cable strain relief includes a base and a restraint projection extending from the base. The restraint projection includes a first face and an opposing second face, a leading edge facing the internal volume, and a trailing edge facing the exterior of the housing. The restraint projection is configured to receive the plurality of fiber optic cables banded at a first location and a second location, the first location disposed at the leading edge and the second location disposed at the trailing edge, such that a first portion of the plurality of fiber optic cables is disposed at the first face and a second portion of the plurality of fiber optic cables is disposed at the second face, and the restraint projection resists lateral movement of the plurality of fiber optic cables relative to the base.

In an example embodiment, the restraint projection further includes a band projection disposed at the leading edge. The band projection is configured to restrain a cable band from moving away from the leading edge. In some example embodiments, a distal end of the restraint projection is tapered. In an example embodiment, the first face or the second face is concave. In an example embodiment, the cable strain relief includes a band projection disposed proximate to the trailing edge and the band projection is configured to restrain a cable band from moving away from the trailing edge. In an example embodiment, the base includes an arm configured to extend through the cable port and the band projection is disposed at a distal end of the arm. In an example embodiment, the fiber optic assembly also includes a cable port seal and the arm passes through the cable port seal. In an example embodiment, the cable strain relief also includes a plurality of restrain projections. In an example embodiment, the cable strain relief includes a guide feature and the housing also includes a complementary guide feature. The guide feature and the complementary guide feature enable selective removal of the cable strain relief from the housing. In an example embodiment, the fiber optic assembly also includes a cable port seal disposed in the cable port. In an example embodiment, the cable strain relief is disposed in the interior of the housing. In an example embodiment, the cable strain relief is disposed adjacent to the cable port. In an example embodiment, the cable port is configured to receive the cable strain relief. In an example embodiment, the cable strain relief includes a guide feature and the cable port further includes a complementary guide feature. The guide feature and complementary guide feature enable selective removal of the cable strain relief from the cable port.

In a further example embodiment, a method for strain relieving a plurality of fiber optic cables at a fiber optic assembly is provided. The method includes passing the plurality of fiber optic cables through a cable port between an exterior of a housing of the fiber optic assembly and an interior of the housing, banding the plurality of fiber optic cables at a first location and a second location, and positioning the plurality of fiber optic cables on a cable strain relief. The cable strain relief including a base and a restraint projection extending from the base. The restraint projection includes a first face and an opposing second face, a leading edge facing the interior of the housing, and a trailing edge facing the exterior of the housing. The first location is disposed at the leading edge and the second location is disposed at the trailing edge, such that a first portion of the plurality of fiber optic cables is disposed at the first face and a second portion of the plurality of fiber optic cables is disposed at the second face the restraint projection resists lateral movement of the plurality of fiber optic cables relative to the base.

In an example embodiment, the restraint projection also includes a band projection disposed at the leading edge and the band projection is configured to restrain a cable band from moving away from the leading edge. In an example embodiment, a distal end of the restraint projection is tapered. In an example embodiment, the first face or the second face is concave. In an example embodiment, the cable strain relief includes a band projection disposed proximate to the trailing edge and the band projection is configured to restrain a cable band from moving away from the trailing edge. In an example embodiment, the base includes an arm configured to extend through the cable port and the band projection is disposed at a distal end of the arm.

In yet another embodiment, a fiber optic assembly is provided including a housing having an internal volume and a cable strain relief. The cable strain relief including a body defining 1) a sidewall, 2) a cable passthrough disposed in the body from a first end of the body to a second end of the body, and 3) a cable slot disposed through the sidewall enabling a fiber optic cable to be inserted into the cable passthrough and a cable tie feature disposed on an exterior surface of the sidewall. The cable tie feature is configured to resist movement of a cable tie relative to the body, when the cable tie is wrapped around the body and the fiber optic cable. The fiber optic assembly also includes a strain relief receiver configured to retain the cable strain relief in a mounted position relative to the housing, when the cable strain relief is installed on the housing.

In an example embodiment, the cable tie feature includes a through aperture. In some example embodiments, the cable tie feature includes a plurality of raised portions of the exterior surface of the sidewall. In an example embodiment, the cable strain relief also includes a first end plate disposed at the first end of the body and a second end plate disposed at the second end of the body. The first end plate and the second end plate are configured to be received by the strain relief receiver. In some example embodiments, the cable strain relief also includes a cable retention member configured to resist movement of the fiber optic cable out of the cable slot. In an example embodiment, the strain relief receiver is configured to retain a plurality of cable strain reliefs. In some example embodiments, the cable strain relief also includes a retention feature and the strain relief receiver also includes a complementary retention feature. In an example embodiment, the retention feature and the complementary retention feature include a snap-fit. In some example embodiments, the strain relief receiver includes a slide feature and the housing also includes a complementary slide feature. The slide feature and the complementary slide feature enable selective removal of the strain relief receiver from the housing. In an example embodiment, the fiber optic assembly also includes a cable port configured for one or more fiber optic cables to pass from an exterior of the housing to an interior of the housing and a cable port seal disposed in the cable port. In some example embodiments, the strain relief receiver is disposed in the interior of the housing. In an example embodiment, the strain relief receiver is disposed adjacent to the cable port. In some example embodiments, the cable port is configured to receive the strain relief receiver. In an example embodiment, the cable port is configured to receive a plurality of strain relief receivers. In some example embodiments, the cable port is configured to receive the plurality of strain relief receivers in a stacked configuration. In an example embodiment, the strain relief receiver includes a slide feature and the cable port includes a complementary slide feature. The slide feature and the complementary slide feature enable selective removal of the strain relief receiver from the cable port.

In still further embodiments, a cable strain relief is provided including a body defining 1) a sidewall, 2) a cable passthrough disposed in the body from a first end of the body to a second end of the body, and 3) a cable slot disposed through the sidewall enabling a fiber optic cable to be inserted into the cable passthrough and a cable tie feature disposed on an exterior surface of the sidewall. The cable tie feature is configured to resist movement of a cable tie relative to the body, when the cable tie is wrapped around the body and the fiber optic cable.

In an example embodiment, the cable tie feature includes a through aperture. In some example embodiments, the cable tie feature includes a plurality of raised portions of the exterior surface of the sidewall. In an example embodiment, the cable strain relief also includes a first end plate disposed at the first end of the body and a second end plate disposed at the second end of the body. The first end plate and the second end plate are configured to be received by a strain relief receiver. In some example embodiments, the cable strain relief also includes a cable retention member configured to resist movement of the fiber optic cable out of the cable slot.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A fiber optic assembly comprising:
   a housing;
   a cable port configured for one or more fiber optic cables to pass from an exterior of the housing to an interior of the housing; and
   a cable port seal disposed in the cable port, the cable port seal comprising:
      a first sealing component;
      a first compression element and a second compression element engaged with each other and configured to compress the first sealing component in a first direction;
      a second sealing component; and
      a cap arranged so that the second sealing component is positioned between the cap and the first sealing component, wherein the cap configured to compress the first sealing component and the second sealing component in a second direction, the second direction being perpendicular to the first direction,
      wherein the compression in the first direction and the compression in the second direction provides an environmental seal around a fiber optic cable, when the fiber optic cable is installed between the first sealing component and the second sealing component;
      wherein the first compression element and the second compression element comprise corresponding connection features configured to couple the first compression element and the second compression element together.

2. The fiber optic assembly of claim 1, wherein the first compression element and the second compression element each comprise one or more cable guide apertures.

3. The fiber optic assembly of claim 2, wherein each of the one or more cable guide apertures comprise an opening configured to receive a fiber optic cable in a receiving direction and resist removal of the fiber optic cable in a direction opposite the receiving direction.

4. The fiber optic assembly of claim 1, wherein the first compression element and the second compression element each comprises a locking feature configured to engage a corresponding capture feature disposed in the cable port, such that the capture feature resists movement of the first compression element and the second compression element out of the cable port.

5. The fiber optic assembly of claim 4, wherein the first compression element comprises a first sidewall and the second compression element comprises a second sidewall, wherein movement of the first sidewall and the second sidewall toward each other causes the locking feature to disengage the capture feature.

6. The fiber optic assembly of claim 4, wherein the cable port comprises a U-shaped channel in the housing configured to receive the cable port seal.

7. The fiber optic assembly of claim 6, wherein the capture feature is disposed in the U-shaped channel.

8. The fiber optic assembly of claim 1, wherein the first compression element is substantially the same shape as the second compression element.

9. The fiber optic assembly of claim 1, wherein the first sealing component comprises a pocket aperture configured to receive the corresponding connection features of the first compression element and the second compression element therethrough.

10. The fiber optic assembly of claim 1, wherein the first compression element and the second compression element each comprise:
 a sidewall configured to compress the first sealing component in the first direction;
 a connection feature configured to couple the first compression element and the second compression element together; and
 a pivot disposed between the sidewall and the connection feature, wherein the pivot enables deflection of the sidewall.

11. The fiber optic assembly of claim 10, wherein the sidewalls of the first compression element and the second compression element provide the cable port seal with a V-shaped geometry when coupled to each other.

12. The fiber optic assembly of claim 11, wherein the cable port seal further comprises:
 a third sealing component configured to be positioned between the first sealing component and the second sealing component; and
 a third compression element and a fourth compression element configured to compress the third sealing component in the first direction;
 wherein the cap is further configured to compress the first sealing component against the third sealing component in a second direction, and wherein the compression in the first direction and the compression in the second direction provides an environmental seal around a second fiber optic cable, when the second fiber optic cable is installed between the first sealing component and the third sealing component.

13. The fiber optic assembly of claim 1, wherein the first sealing component or second sealing component is formed from a foam rubber.

14. A cable port seal for a fiber optic cable port, the cable port seal comprising:
 a first sealing component formed of a deformable material;
 a first compression element and a second compression element engaged with each other and configured to compress the first sealing component in a first direction;
 a second sealing component formed of the deformable material; and
 a cap arranged so that the second sealing component is positioned between the cap and the first sealing component, wherein the cap configured to compress the first sealing component and the second sealing component in a second direction, the second direction being perpendicular to the first direction,
 wherein the compression in the first direction and the compression in the second direction provides an environmental seal around a fiber optic cable, when the fiber optic cable is installed between the first sealing component and the second sealing component;
 wherein the first compression element and the second compression element comprise corresponding connection features configured to couple the first compression element and the second compression element together.

15. The cable port seal of claim 14, wherein the first compression element and the second compression element each comprise one or more cable guide apertures,
 wherein each of the one or more cable guide apertures comprise an opening configured to receive a fiber optic cable in the first direction and resist removal of the fiber optic cable in the second direction.

16. The cable port seal of claim 14, wherein the first compression element and the second compression element each comprise a locking feature configured to engage a corresponding capture feature disposed in the cable port, such that the capture feature resists movement of the first compression element and the second compression element out of the fiber optic cable port.

17. The cable port seal of claim 16, wherein the first compression element comprises a first sidewall and the second compression element comprises a second sidewall, wherein movement of the first sidewall and the second sidewall toward each other causes the locking feature to disengage the capture feature.

18. The cable port seal of claim 14, wherein the first compression element and the second compression element comprise corresponding connection features configured to couple the first compression element and the second compression element together, and
 wherein the first sealing component comprises a pocket aperture configured to receive the corresponding connection features of the first compression element and the second compression element therethrough.

19. The cable port seal of claim 14, wherein the first compression element and the second compression element each comprise:
 a sidewall configured to compress the first sealing component in the first direction;
 a connection feature configured to couple the first compression element and the second compression element together; and
 a pivot disposed between the sidewall and the connection feature, wherein the pivot enables deflection of the sidewall,
 wherein the sidewalls of the first compression element and the second compression element have a V-shaped geometry when coupled to each other.

20. The cable port seal of claim 14, further comprising:
a third sealing component formed of a deformable material and configured to be positioned between the first sealing component and the second sealing component; and
a third compression element and a fourth compression element configured to compress the third sealing component in the first direction;
wherein the cap is further configured to compress the first sealing component against the third sealing component in a second direction, and wherein the compression in the first direction and the compression in the second direction provides an environmental seal around a second fiber optic cable, when the second fiber optic cable is installed between the first sealing component and the third sealing component.

21. A fiber optic assembly comprising:
a housing;
a cable port in the housing;
a fiber optic cable passing through the cable port from an exterior of the housing to an interior of the housing; and
a cable port seal disposed in the cable port and forming an environmental seal around the fiber optic cable, the cable port seal comprising:
a first sealing component;
a first compression element and a second compression element engaged with each other and compressing the first sealing component in a first direction;
wherein the first compression element and the second compression element comprise corresponding connection features configured to couple the first compression element and the second compression element together;
a second sealing component; and
a cap arranged so that the second sealing component is positioned between the cap and the first sealing component, wherein the cap compressing the first sealing component and the second sealing component in a second direction, the second direction being perpendicular to the first direction.

22. A cable port seal for a fiber optic cable port, the cable port seal comprising:
a sealing component formed of a deformable material;
a first compression element and a second compression element engaged with each other and configured to compress the first sealing component in a first direction;
wherein the first compression element and the second compression element comprise corresponding connection features configured to couple the first compression element and the second compression element together; and
a connection feature disposed between the first compression element and the second commission element and configured to compress the sealing component a second direction, the second direction being perpendicular to the first direction,
wherein the compression in the first direction and the compression in the second direction provides an environmental seal around a fiber optic cable, when the fiber optic cable is installed through the sealing component.

* * * * *